US012753091B2

(12) United States Patent
Moon et al.

(10) Patent No.: US 12,753,091 B2
(45) Date of Patent: Oct. 6, 2026

(54) COMPOSITE FILTER AND WATER PURIFIER INCLUDING SAME

(71) Applicant: COWAY CO., LTD., Gongju-si (KR)

(72) Inventors: Tae Hun Moon, Gongju-si (KR); Sung Han Yun, Gongju-si (KR); Geun Sang Ryu, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 324 days.

(21) Appl. No.: 18/707,300

(22) PCT Filed: Jul. 21, 2022

(86) PCT No.: PCT/KR2022/010715
§ 371 (c)(1),
(2) Date: May 3, 2024

(87) PCT Pub. No.: WO2023/085548
PCT Pub. Date: May 19, 2023

(65) Prior Publication Data

US 2026/0152414 A1 Jun. 4, 2026

(30) Foreign Application Priority Data

| | | |
|---|---|---|
| Nov. 9, 2021 | (KR) | 10-2021-0153029 |
| Nov. 17, 2021 | (KR) | 10-2021-0158778 |
| Nov. 19, 2021 | (KR) | 10-2021-0160466 |

(51) Int. Cl.
*C02F 1/00* (2023.01)

(52) U.S. Cl.
CPC ........ *C02F 1/001* (2013.01); *C02F 2201/003* (2013.01); *C02F 2303/16* (2013.01)

(58) Field of Classification Search
CPC . C02F 1/001; C02F 2201/003; C02F 2303/16
See application file for complete search history.

(56) References Cited

U.S. PATENT DOCUMENTS

2019/0127255 A1 5/2019 Zhang et al.

FOREIGN PATENT DOCUMENTS

CN 102728133 A 10/2012
CN 208320165 U 1/2019
(Continued)

OTHER PUBLICATIONS

Zhu, Ze-chun et al—CN111186921A FIT translation—May 22, 2020 (Year: 2020).*

(Continued)

*Primary Examiner* — Bradley R Spies
(74) *Attorney, Agent, or Firm* — Oblon, McClelland, Maier & Neustadt, L.L.P.

(57) ABSTRACT

A composite filter and a water purifier including the same, in which the discharging of washing water and the input of raw water and the output of purified water are possible, and filter members are integrated to form a composite filter. A head member of a housing part is provided with first and second partition walls to form independent flow paths in which the raw water, the purified water and the washing water do not mix. Passages through which the raw water, the purified water and the washing water flow are concentrated on the upper side of the composite filter. A second filter member is disposed in a filtering unit so as to surround a first filter member by first, second and third upper cap members, and thus, the composite filter can be manufactured by utilizing a pre-manufactured first filter member such that manufacturability is enhanced.

20 Claims, 24 Drawing Sheets

(56) References Cited

FOREIGN PATENT DOCUMENTS

| | | | |
|---|---|---|---|
| CN | 110040860 | A | 7/2019 |
| CN | 210001672 | U | 1/2020 |
| CN | 111137995 | A | 5/2020 |
| CN | 111186921 | A | 5/2020 |
| CN | 117500576 | A | 2/2024 |
| JP | 7-60256 | A | 3/1995 |
| JP | 2007-98360 | A | 4/2007 |
| KR | 10-2004-0060891 | A | 7/2004 |
| KR | 10-2010-0133123 | A | 12/2010 |
| KR | 10-2012-0054919 | A | 5/2012 |
| KR | 10-2014-0028585 | A | 3/2014 |
| KR | 10-2015-0025526 | A | 3/2015 |
| KR | 10-2015-0067664 | A | 6/2015 |
| KR | 10-2021-0060973 | A | 5/2021 |

OTHER PUBLICATIONS

Na, Qin-fu et al—CN208320165U FIT translation—Jan. 4, 2019 (Year: 2019).*

International Search Report issued Nov. 1, 2022 in PCT/KR2022/010715, filed on Jul. 21, 2022, 2 pages.

Office Action issued in CN Patent Application No. 202280073487.9 on May 20, 2026, (with English translation).

* cited by examiner

200 : 210, 220, 230, 240, 250, 260, 270

COMPOSITE FILTER AND WATER PURIFIER INCLUDING SAME

CROSS-REFERENCE TO RELATED APPLICATION

This application claims priority to and the benefit of Korean Patent Application No. 10-2021-0153029, filed on Nov. 9, 2021, Korean Patent Application No. 10-2021-0158778, filed on Nov. 17, 2021, and Korean Patent Application No. 10-2021-0160466, filed on Nov. 19, 2021, the disclosures of which are incorporated herein by reference in its entirety.

TECHNICAL FIELD

The present invention relates to a composite filter and a water purifier including the same, wherein the discharging of washing water as well as the input of raw water and the output of purified water are possible, and thus, filter members are integrated to form a composite filter such that user convenience is enhanced. A head member of a housing part is provided with first and second partition walls to form independent flow paths in which the raw water, the purified water and the washing water do not mix, and thus, passages through which the raw water, the purified water and the washing water flow are concentrated on the upper side of the composite filter such that a degree of freedom in designing the layout of other parts is improved. Manufacturability is enhanced by configuring to manufacture a composite filter by utilizing a pre-manufactured first filter member.

BACKGROUND ART

In general, water purifiers are devices that filter obtained raw water into purified water that a user can drink and provide the same to the user. These water purifiers are used by combining several filters for raw water filtration, and when each filter is used in combination, the internal layout of a water purifier becomes complicated, and the volume occupied by the filter inside increases, and thus, there has been a problem in that the volume of the entire water purifier increases. Therefore, in order to solve this problem, a composite filter in which each filter is integrated is often used.

The water purifying device disclosed in Korean Patent Application Laid-Open No. 10-2012-0054919 by LG Electronics Co., Ltd. includes a composite filter. The composite filter includes a first filter unit and a second filter unit, and each filter unit is selected from known filters such as an activated carbon filter, a sediment filter, a ceramic filter, an ultrafiltration filter and the like. However, such a composite filter has a problem in that the raw water input and the purified water output are separated into the upper and lower parts of a filter housing, thereby complicating the internal layout of the water purifier. In addition, since such a composite filter is not provided with a configuration for washing the filter, there is a problem in that the replacement cycle of the composite filter is accelerated.

Korean Patent Application Laid-Open No. 10-2015-0067664 by Coway Co., Ltd. discloses a water purifying filter. Such a water purifying filter includes a first filtering member including a non-woven fabric composite layer and a carbon filtering unit including granular activated carbon. However, since such a composite filter does not have a flow path through which washing water flows, there is a problem in that the replacement cycle of the composite filter is shortened, and thus, the operating cost of the water purifier increases.

The water purifier disclosed in Korean Patent Application Laid-Open No. 10-2010-0133123 by Coway Co., Ltd. includes a water purifying filter which is capable of backwashing. Such a water purifier discloses a backwashing unit for washing a water purifying filter using residual water present in the filtering unit and washing water stored in a washing water storage tank connected to the filtering unit. However, there is a problem in that the size of the entire water purifier is increased, because the backwashing unit is provided separately from the water purifying filter.

DISCLOSURE

Technical Problem

In order to solve the above problems, in the composite filter according to an exemplary embodiment of the present invention, since the discharging of washing water as well as the input of raw water and the output of purified water are possible, filter members are integrated to configure a composite filter such that user convenience is enhanced. In addition, since a head member of a housing part is provided with first and second partition walls to form independent flow paths in which the raw water, the purified water and the washing water do not mix, passages through which the raw water, the purified water and the washing water flow are concentrated on the upper side of the composite filter such that a degree of freedom in designing the layout of other parts is improved. In addition, since a second filter member is arranged to surround a first filter member through first, second and third upper cap members in a filtering unit, it is configured to manufacture a composite filter by utilizing a pre-manufactured first filter member, and thus, it has an object to enhance manufacturability.

In the composite filter according to an exemplary embodiment of the present invention, the filtering unit is provided with a lower cap member which is coupled to a lower side of the second filter member to improve structural stability, and a flow path through which the first purified water moves to the second filter member is formed such that the second purified water that is finally discharged moves to the upper direction, and thus, it has an object to enhance the manufacturability of a composite filter.

In the composite filter according to an exemplary embodiment of the present invention, a plurality of discharge holes are formed on the side surface of the first filter member, and since the washing water that has washed the first filter member is moved to a washing water discharge port via a first discharge passage formed between the first filter member and the body member through a plurality of discharge holes, the washing water is not mixed with raw water or purified water and moves through an independent flow path, and thus, it has an object to improve user satisfaction by improving the water quality of purified water.

In the composite filter according to an exemplary embodiment of the present invention, since a first O-ring is formed between the first filter member and the first upper cap member to prevent the washing water from being re-introduced into the first filter member, the washing water is stably discharged, and thus, it has an object to increase the usage period of the first filter member by stably discharging the washing water to the outside.

In the composite filter according to an exemplary embodiment of the present invention, since a second O-ring is formed between the second filter member and the body member to prevent the first purified water from moving to the second discharge passage, the first purified water is stably moved to the second filter member, and thus, it has an object to improve the operation reliability of a composite filter.

In the composite filter according to an exemplary embodiment of the present invention, since a first spacer is formed between the body member and the first upper cap member, the washing water is smoothly moved between the body member and the first upper cap member, and thus, it has an object to improve the operational reliability of a composite filter.

In the composite filter according to an exemplary embodiment of the present invention, since a second spacer is formed between the second upper cap member and the third upper cap member, the purified water is smoothly moved between the second upper cap member and the third upper cap member, and thus, it has an object to improve the operation reliability of a composite filter.

In the composite filter according to an exemplary embodiment of the present invention, since raw water flows into the first filter member through a first upward guide, passages in which the raw water, purified water and washing water flow are concentrated in the upper part of the composite filter, while the raw water is not mixed with the purified water or washing water, and thus, it has an object to improve the operation reliability of a composite filter.

In the composite filter according to an exemplary embodiment of the present invention, since a first partition wall is disposed to extend in the axial direction along the first upward guide, it effectively prevents incoming raw water from mixing with the discharged washing water, and thus, it has an object to improve user satisfaction through the improvement of the water quality of purified water that is finally discharged.

In the composite filter according to an exemplary embodiment of the present invention, since the washing water that has passed through the first filter member is discharged to the outside through a second upward guide, the washing water is stably discharged, and thus, it has an object to improve the operational stability of a composite filter.

In the composite filter according to an exemplary embodiment of the present invention, since a second partition wall is disposed to extend in the axial direction along the second upward guide, it effectively prevents the purified water that is discharged from mixing with the discharged washing water, and thus, it has an object to improve user satisfaction through the improvement of the water quality of purified water.

In the water purifier according to an exemplary embodiment of the present invention, since the raw water and the washing water are selectively supplied to the composite filter, the composite filter is washed by the washing water while the finally discharged purified water and washing water are not mixed, and thus, it has an object to improve user satisfaction by increasing the product lifespan of a composite filter.

In the water purifier according to an exemplary embodiment of the present invention, since a washing module uses the raw water supplied from the raw water supply unit as washing water, a separate fluid supply for use as washing water in the washing module is not required, and thus, it has an object to improve the manufacturability of a water purifier.

In the water purifier according to an exemplary embodiment of the present invention, since the washing module users purified water as washing water, it has an object to improve the washing efficiency of a composite filter.

In order to solve the above problems, in the composite filter according to another exemplary embodiment of the present invention, since the discharging of washing water as well as the input of raw water and the output of purified water are possible, filter members are integrated to configure a composite filter such that user convenience is enhanced. In addition, since a head member of a housing part is provided with first and second partition walls to form independent flow paths in which the raw water, the purified water and the washing water do not mix, passages through which the raw water, the purified water and the washing water flow are concentrated on the upper part of the composite filter such that a degree of freedom in designing the layout of other parts is improved. In addition, since first to fifth upper cap members are disposed on the upper part of the first filter member and the second filter member in a filtering unit, it is configured to manufacture a composite filter by utilizing a previously manufactured first filter member, and thus, it has an object to enhance manufacturability.

In the composite filter according to another exemplary embodiment of the present invention, the filtering unit is provided with a lower cap member that is coupled to the lower side of the second filter member to enhance structural stability, and since a flow path through which the first purified water moves to the second filter member is formed such that the finally discharged second purified water moves upward, it has an object to enhance the manufacturability of a composite filter.

In the composite filter according to another exemplary embodiment of the present invention, since the first purified water that has passed through the first filter member flows into the second filter member through a first upward guide, even if the second filter member is disposed to be stacked on the upper part of the first filter member, passages through which the raw water, purified water and washing water flow are concentrated on the upper part of the composite filter, and thus, it has an object to improve the use convenience of a composite filter.

In the composite filter according to another exemplary embodiment of the present invention, since the washing water that has passed through the first filter member is moved through a second upward guide, the washing water is not mixed with purified water, and thus, it has an object to improve the operation reliability of a composite filter.

In the composite filter according to another exemplary embodiment of the present invention, since the upper cap guide of the third upper cap member is coupled to the second filter member, the second filter member is stably disposed on the upper part of the first filter member to stably secure a passage in which the second purified water is moved, and thus, it has an object to improve the operational reliability of a composite filter.

In the composite filter according to another exemplary embodiment of the present invention, since the purified water that has passed through the second filter member is moved through a fourth upward guide, the purified water is not mixed with the washing water, and thus, it has an object to improve the operation reliability of a composite filter.

In the composite filter according to another exemplary embodiment of the present invention, since the washing water that has passed through the first filter member is discharged to the outside through a fifth upward guide, the washing water is not mixed with the raw water, and thus, it has an object to improve the operation reliability of a composite filter.

In the composite filter according to another exemplary embodiment of the present invention, a plurality of discharge holes are formed on the side surface of the first filter member, and since the washing water that has washed the first filter member is moved to a washing water discharge port via a first discharge passage formed between the first filter member and the second upper cap member through a plurality of discharge holes, the washing water is moved through an independent flow path without being mixed with raw water or purified water, and thus, it has an object to improve user satisfaction through the improvement of the water quality of purified water.

In the composite filter according to another exemplary embodiment of the present invention, since a first O-ring is formed between the second upper cap member and the first filter member to prevent the washing water from being re-introduced into the first filter member, the washing water is stably discharged to the outside, and thus, it has an object to increase the usage period of the first filter member.

In the composite filter according to another exemplary embodiment of the present invention, since a second O-ring is formed between the second upper cap member and the fifth upper cap member to prevent the washing water from being re-introduced into the first filter member, it prevents the washing water from mixing with raw water, and thus, it has an object to improve the operational reliability of a composite filter.

In the composite filter according to another exemplary embodiment of the present invention, since a third O-ring that prevents the second purified water that is filtered by the second filter member from moving to the second discharge passage is formed between the second upper cap member and the lower cap member, it prevents the second purified water from mixing with the washing water, and thus, it has an object to improve the operational reliability of a composite filter.

In the composite filter according to another exemplary embodiment of the present invention, since a fourth O-ring is formed between the first upper cap member and the second upper cap member to prevent the second purified water from flowing into the first discharge passage, it prevents the second purified water from mixing with the washing water, and thus, it has an object to improve the operational reliability of a composite filter.

In the composite filter according to another exemplary embodiment of the present invention, since a fifth O-ring is formed between the lower cap member and the fourth upper cap member to prevent inflow into the second discharge passage, it prevents the second purified water from mixing with the washing water, and thus, it has an object to improve the operation reliability of a composite filter.

In the composite filter according to another exemplary embodiment of the present invention, since a first spacer is formed between the fourth upper cap member and the fifth upper cap member, the washing water is smoothly moved upward through a gap between the fourth upper cap member and the fifth upper cap member, and thus, it has an object to improve the operation reliability of a composite filter.

In the composite filter according to another exemplary embodiment of the present invention, since a second spacer is formed between the fifth upper cap member and the case member, the raw water is smoothly moved downward through a gap between the fifth upper cap member and the case member such that while the first filter member and the second filter member have a stacked structure, passages through which the raw water, purified water and washing water flow are concentrated at the upper part of the composite filter, and thus, it has an object to improve user convenience of a composite filter.

In the water purifier according to another exemplary embodiment of the present invention, since the raw water and the washing water are selectively supplied to the composite filter, the composite filter is washed by the washing water without mixing the purified water finally that is discharged with the washing water such that it extends the product lifespan of the composite filter, and thus, it has an object to increase user satisfaction.

In the water purifier according to another exemplary embodiment of the present invention, since the washing module uses raw water supplied from the raw water supply unit as washing water, a separate fluid supply for use as washing water in the washing module is not required, and thus, it has an object to improve the manufacturability of a water purifier.

In the water purifier according to another exemplary embodiment of the present invention, since the washing module uses purified water as the washing water, it has an object to improve the washing efficiency of a composite filter.

In order to solve the above problems, in the composite filter according to still another exemplary embodiment of the present invention, since the discharging of washing water as well as the input of raw water and the output of purified water are possible, filter members are integrated to configure a composite filter such that user convenience is enhanced. In addition, since a head member of a housing part is provided with first and second partition walls to form independent flow paths in which the raw water, the purified water and the washing water do not mix, passages through which the raw water, the purified water and the washing water flow are concentrated on the upper part of the composite filter such that a degree of freedom in designing the layout of other parts is improved. In addition, since the filtering unit uses a first body member, a first upper cap member, a second upper cap member, a first lower cap member and a third upper cap member such that the first filter member and the second filter member are arranged in a stacked structure, it is configured to manufacture a composite filter by utilizing a previously manufactured first filter member, and thus, it has an object to enhance manufacturability.

In the composite filter according to still another exemplary embodiment of the present invention, the filtering unit is provided with a second lower cap member that is coupled to the lower side of the second filter member to improve structural stability, and a flow path through which the first purified water moves to the second filter member is formed such that the finally discharged second purified water moves upward, and thus, it has an object to improve the manufacturability of a composite filter.

In the composite filter according to still another exemplary embodiment of the present invention, since raw water flows into the first filter member through the first upward guide, the passages through which the raw water, purified water and washing water flow are concentrated on the upper part of the composite filter, while the raw water is not mixed with the purified water or washing water, and thus, it has an object to improve the operational reliability of a composite filter.

In the composite filter according to still another exemplary embodiment of the present invention, since the washing water that has passed through the first filter member is discharged to the outside through the second upward guide, the washing water is stably discharged, and thus, it has an object to improve the operational stability of a composite filter.

In the composite filter according to still another exemplary embodiment of the present invention, since the first purified water that has passed through the first filter member is moved to the lower side of the second filter member through the first lower cap guide, the first purified water is smoothly moved to the second filter member even if the first filter member and the second filter member have a stacked structure, and thus, it has an object to improve the operational reliability of a composite filter.

In the composite filter according to still another exemplary embodiment of the present invention, since the upper cap guide of the third upper cap member is coupled to the second filter member, the passage through which the second purified water moves between the first filter member and the second filter member is stably secured, and thus, it has an object to improve the operational stability of a composite filter.

In the composite filter according to still another exemplary embodiment of the present invention, since a plurality of discharge holes are formed on the side surface of the first filter member and the washing water that has washed the first filter member is moved to the washing water discharge port via the first discharge passage formed between the first filter member and the first body member through a plurality of discharge holes, the washing water is not mixed with raw water or purified water and moves through an independent flow path, and thus, it has an object to improve user satisfaction through the improvement of the water quality of purified water.

In the composite filter according to still another exemplary embodiment of the present invention, since a first O-ring is formed between the first upper cap member and the first filter member to prevent the washing water from being re-introduced into the first filter member, the washing water is stably discharged to the outside, and thus, it has an object to increase the usage period of the first filter member.

In the composite filter according to still another exemplary embodiment of the present invention, since a second O-ring is formed between the second upper cap member and the first body member to prevent the washing water from mixing with the second purified water, it has an object to improve the operational reliability of a composite filter.

In the composite filter according to still another exemplary embodiment of the present invention, since a third O-ring is formed between the first filter member and the first lower cap member to prevent the washing water from flowing into the second filter member, it prevents the washing water from mixing with the first purified water, and thus, it has an object to improve the satisfaction of users through securing the quality of purified water.

In the composite filter according to still another exemplary embodiment of the present invention, since a fourth O-ring is formed between the first body member and the first lower cap member to prevent the washing water from mixing with the second purified water, it has an object to improve the operation reliability of a composite filter.

In the composite filter according to still another exemplary embodiment of the present invention, since a fifth O-ring is formed between the second body member and the third upper cap member to prevent the second purified water from being re-introduced into the second filter member, the second purified water is smoothly moved upward, and thus, it has an object to improve the operational reliability of a composite filter.

In the composite filter according to still another exemplary embodiment of the present invention, since a first spacer is formed between the first upper cap member and the first body member, the washing water is smoothly moved upward through a gap between the first upper cap member and the second upper cap member, and thus, it has an object to improve the operation reliability of a composite filter.

In the composite filter according to still another exemplary embodiment of the present invention, since a second spacer is formed between the second upper cap member and the case member, the purified water is smoothly moved between the second upper cap member and the case member. and thus, it has an object to improve the operational reliability of a composite filter.

In the water purifier according to still another exemplary embodiment of the present invention, since the raw water and washing water are selectively supplied to the composite filter, the composite filter is washed by the washing water without mixing the final discharged purified water and the washing water, and thus, it has an object to improve user satisfaction by increasing the product lifespan of the composite filter.

In the water purifier according to still another exemplary embodiment of the present invention, since the washing module uses raw water supplied from the raw water supply unit as washing water, a separate fluid supply for use as washing water in the washing module is not required, and thus, it has an object to improve the manufacturability of a water purifier.

In the water purifier according to still another exemplary embodiment of the present invention, since the washing module uses purified water as the washing water, it has an object to improve the washing efficiency of a composite filter.

The problems of the present invention are not limited to the problems that are mentioned above, and other problems that are not mentioned will be clearly understood by those skilled in the art from the description below.

Technical Solution

In order to achieve the above objects, the composite filter according to an exemplary embodiment of the present invention may include a housing part which is provided with a raw water inlet port through which raw water is introduced, a purified water outlet port through which filtered purified water is discharged, and a washing water discharge port through which washing water is discharged; and a filtering unit which is provided with a first filter member that filters the raw water to produce first purified water, and a second filter member that filters the first purified water to produce second purified water and is disposed to surround the first filter member, wherein the housing part includes a head member which is provided with a first partition wall that prevents the raw water and the washing water from mixing, and a second partition wall that prevents the second purified water and the washing water from mixing; and a case member which extends from the head member and has the filtering unit disposed therein, and wherein the filtering unit includes a body member which is disposed between the first filter member and the second filter member; a first upper cap member wherein the first filter member that is disposed inside the body member is disposed below; a second upper cap member wherein the first upper cap member is disposed below; and a third upper cap member wherein the second filter member disposed outside the body member is disposed below, and the third upper cap member is disposed above the second upper cap member.

In the composite filter according to an exemplary embodiment of the present invention, after washing the first filter member, the washing water is moved to the washing water discharge port via a first discharge passage formed between the first filter member and the body member.

In the composite filter according to an exemplary embodiment of the present invention, the filtering unit may further include a lower cap member which is coupled to a lower side of the second filter member.

In the composite filter according to an exemplary embodiment of the present invention, the lower cap member may include a support guide which is disposed to extend upward to be coupled to the second filter member.

In the composite filter according to an exemplary embodiment of the present invention, a plurality of discharge holes communicating with the first discharge passage may be formed on a side surface of the first filter member, and the washing water that has washed the first filter member is moved to the first discharge passage through the plurality of discharge holes.

In the composite filter according to an exemplary embodiment of the present invention, a second discharge passage communicating with the first discharge passage may be formed between the first upper cap member and the second upper cap member, and the second discharge passage may communicate with the washing water discharge port.

In the composite filter according to an exemplary embodiment of the present invention, a first O-ring may be formed between the first filter member and the first upper cap member to prevent the washing water from being re-introduced into the first filter member.

In the composite filter according to an exemplary embodiment of the present invention, a second O-ring may be formed between the second upper cap member and the body member to prevent the second purified water filtered by the second filter member from moving to the second discharge passage.

In the composite filter according to an exemplary embodiment of the present invention, a third O-ring may be formed between the third upper cap member and the case member to prevent the second purified water filtered by the second filter member from being re-introduced into the second filter member.

In the composite filter according to an exemplary embodiment of the present invention, a first spacer may be formed between the body member and the first upper cap member to be spaced apart from each other at a certain interval.

In the composite filter according to an exemplary embodiment of the present invention, a second spacer may be formed between the second upper cap member and the third upper cap member to be spaced apart from each other at a certain interval.

In the composite filter according to an exemplary embodiment of the present invention, the first upper cap member may include a first upward guide which is disposed to extend upward such that the raw water flows into the first filter member.

In the composite filter according to an exemplary embodiment of the present invention, the first partition wall may be disposed to extend in the axial direction along the first upward guide.

In the composite filter according to an exemplary embodiment of the present invention, the second upper cap member may include a second upward guide which is disposed to extend upward such that the washing water that has passed through the first filter member is discharged to the outside.

In the composite filter according to an exemplary embodiment of the present invention, the second partition wall may be disposed to extend in the axial direction along the second upward guide.

The water purifier according to an exemplary embodiment of the present invention may include a raw water supply unit which controls the supply of raw water; a composite water for receiving raw water from the raw water supply unit and filtering; a purified water discharge unit which controls the discharge of purified water filtered by the composite filter; and a washing module which is provided between the raw water supply unit and the composite filter, and controls the supply of washing water to the composite filter, wherein the raw water and the washing water are selectively supplied to the composite filter.

In the water purifier according to an exemplary embodiment of the present invention, the composite filter may include a filtering unit which is provided with a first filter member that filters the raw water to produce first purified water, and a second filter member that filters the first purified water to produce second purified water and is disposed to surround the first filter member, wherein the filtering unit includes a body member which is disposed between the first filter member and the second filter member; a first upper cap member wherein the first filter member that is disposed inside the body member is disposed below; a second upper cap member wherein the first upper cap member is disposed below; and a third upper cap member wherein the second filter member disposed outside the body member is disposed below, and the third upper cap member is disposed above the second upper cap member.

In the water purifier according to an exemplary embodiment of the present invention, the composite filter further includes a housing part which is provided with a raw water inlet port through which raw water is introduced, a purified water outlet port through which filtered purified water is discharged, and a washing water discharge port through which washing water is discharged, wherein the housing part includes a head member which is provided with a first partition wall that prevents the raw water and the washing water from mixing, and a second partition wall that prevents the second purified water and the washing water from mixing; and a case member which extends from the head member and has the filtering unit disposed therein.

In the water purifier according to an exemplary embodiment of the present invention, the washing module is characterized in that the composite filter is washed by using raw water supplied from the raw water supply unit.

The water purifier according to an exemplary embodiment of the present invention may further include a purified water storage tank which is connected to the purified water discharge unit and is supplied with purified water filtered by the composite filter, wherein the washing module washes the composite filter by using purified water supplied from the purified water storage tank.

The composite filter according to another exemplary embodiment of the present invention may include a housing part which is provided with a raw water inlet port through which raw water is introduced, a purified water outlet port through which filtered purified water is discharged, and a washing water discharge port through which washing water is discharged; and a filtering unit which is provided with a first filter member that filters the raw water to produce first purified water, and a second filter member that filters the first purified water to produce second purified water and is stacked on top of the first filter member, wherein the housing part includes a head member which is provided with a first partition wall that prevents the second purified water and the washing water from mixing, and a second partition wall that prevents the raw water and the washing water from mixing; and a case member which extends from the head member and has the filtering unit disposed therein, and wherein the filtering unit includes a first upper cap member wherein the first filter member is disposed below; a second upper cap member wherein the first upper cap member is disposed below, and has a hole through which the washing water moves; a third upper cap member wherein the second filter member is disposed below; a fourth upper cap member wherein the third upper cap member is disposed below; and a fifth upper cap member wherein the fourth upper cap member is disposed below.

In the composite filter according to another exemplary embodiment of the present invention, the filtering unit may further include a lower cap member which is coupled to a lower side of the second filter member.

In the composite filter according to another exemplary embodiment of the present invention, the lower cap member may include a lower cap guide which is disposed to extend upward to be coupled to the second filter member.

In the composite filter according to another exemplary embodiment of the present invention, the first upper cap member may include a first upward guide which is disposed to extend upward such that the first purified water flows into the second filter member.

In the composite filter according to another exemplary embodiment of the present invention, the second upper cap member may include a second upward guide which is disposed to extend upward such that the washing water is discharged from the first filter member.

In the composite filter according to another exemplary embodiment of the present invention, the third upper cap member may include an upper cap guide which is disposed to extend downward to be coupled to the second filter member.

In the composite filter according to another exemplary embodiment of the present invention, the fourth upper cap member may include a fourth upward guide which is disposed to extend upward such that the second purified water is discharged to the outside from the second filter member.

In the composite filter according to another exemplary embodiment of the present invention, the fifth upper cap member may include a fifth upward guide which is disposed to extend upward such that the washing water is discharged to the outside.

In the composite filter according to another exemplary embodiment of the present invention, after washing the first filter member, the washing water is moved to the washing water discharge port via a first discharge passage formed between the first filter member and the second upper cap member.

In the composite filter according to another exemplary embodiment of the present invention, a plurality of discharge holes communicating with the first discharge passage may be formed on a side surface of the first filter member, and the washing water that has washed the first filter member is moved to the first discharge passage through the plurality of discharge holes.

In the composite filter according to another exemplary embodiment of the present invention, a second discharge passage communicating with the first discharge passage may be formed between the fourth upper cap member and the fifth upper cap member, and the second discharge passage may communicate with the washing water discharge port.

In the composite filter according to another exemplary embodiment of the present invention, a first O-ring may be formed between the second upper cap member and the first filter member to prevent the washing water from being re-introduced into the first filter member.

In the composite filter according to another exemplary embodiment of the present invention, a second O-ring may be formed between the second upper cap member and the fifth upper cap member to prevent the washing water from being re-introduced into the first filter member.

In the composite filter according to another exemplary embodiment of the present invention, a third O-ring may be formed between the second upper cap member and the lower cap member to prevent the second purified water filtered by the second filter member from moving to the second discharge passage.

In the composite filter according to another exemplary embodiment of the present invention, a fourth O-ring may be formed between the first upper cap member and the second upper cap member to prevent the second purified water from flowing into the first discharge passage.

In the composite filter according to another exemplary embodiment of the present invention, a fifth O-ring may be formed between the lower cap member and the fourth upper cap member to prevent the second purified water from flowing into the second discharge passage.

In the composite filter according to another exemplary embodiment of the present invention, a first spacer may be formed between the fourth upper cap member and the fifth upper cap member to be spaced apart from each other at a certain interval.

In the composite filter according to another exemplary embodiment of the present invention, a second spacer may be formed between the fifth upper cap member and the case member to be spaced apart from each other at a certain interval.

The water purifier according to another exemplary embodiment of the present invention may include a raw water supply unit which controls the supply of raw water; a composite water for receiving raw water from the raw water supply unit and filtering; a purified water discharge unit which controls the discharge of purified water filtered by the composite filter; and a washing module which is provided between the raw water supply unit and the composite filter, and controls the supply of washing water to the composite filter, wherein the composite filter includes a filtering unit which is provided with a first filter member that filters the raw water to produce first purified water, and a second filter member that filters the first purified water to produce second purified water and is disposed to be stacked on the upper part of the first filter member, wherein the filtering unit includes a first upper cap member wherein the first filter member is disposed below; a second upper cap member wherein the first upper cap member is disposed below, and has a hole through which the washing water moves; a third upper cap member wherein the second filter member is disposed below; a fourth upper cap member wherein the third upper cap member is disposed below; and a fifth upper cap member wherein the fourth upper cap member is disposed below, and wherein the raw water and the washing water are selectively supplied to the composite filter.

In the water purifier according to another exemplary embodiment of the present invention, the composite filter may further include a housing part which is provided with a raw water inlet port through which raw water is introduced, a purified water outlet port through which filtered purified water is discharged, and a washing water discharge port through which washing water is discharged, wherein the housing part includes a head member which is provided with a first partition wall that prevents the raw water and the washing water from mixing, and a second partition wall that prevents the purified water and the washing water from mixing; and a case member which extends from the head member and has the filtering unit disposed therein.

In the water purifier according to another exemplary embodiment of the present invention, the washing module is characterized in that the composite filter is washed by using the raw water supplied from the raw water supply unit.

The water purifier according to another exemplary embodiment of the present invention may further include a purified water storage tank which is connected to the purified water discharge unit, and is supplied with purified water filtered by the composite filter, wherein the washing module washes the composite filter by using purified water supplied from the purified water storage tank.

The composite filter according to still another exemplary embodiment of the present invention may include a housing part which is provided with a raw water inlet port through which raw water is introduced, a purified water outlet port through which filtered purified water is discharged, and a washing water discharge port through which washing water is discharged; and a filtering unit which is provided with a first filter member that filters the raw water to produce first purified water, and a second filter member that filters the first purified water to produce second purified water and is stacked below the first filter member, wherein the housing part includes a head member which is provided with a first partition wall that prevents the raw water and the washing water from mixing, and a second partition wall that prevents the purified water and the washing water from mixing; and a case member which extends from the head member and has the filtering unit disposed therein, and wherein the filtering unit includes a first body member which surrounds the first filter member; a first upper cap member wherein the first filter member is disposed below; a second upper cap member wherein the first upper cap member is disposed below, and the first body member is disposed below; a first lower cap member wherein the first filter member is disposed below, and penetrates the second filter member; a second body member which surrounds the second filter member; and a third upper cap member wherein the second filter member is disposed below.

In the composite filter according to still another exemplary embodiment of the present invention, the filtering unit may further include a second lower cap member which is coupled to a lower side of the second filter member.

In the composite filter according to still another exemplary embodiment of the present invention, the second lower cap member may include a second lower cap guide which is disposed to extend upward to be coupled to the second filter member.

In the composite filter according to still another exemplary embodiment of the present invention, the first upper cap member may include a first upward guide which is disposed to extend upward such that the raw water flows into the second filter member.

In the composite filter according to still another exemplary embodiment of the present invention, the second upper cap member may include a second upward guide which is disposed to extend upward such that the washing water is discharged from the first filter member.

In the composite filter according to still another exemplary embodiment of the present invention, the first lower cap member may include a first lower cap guide which is disposed to extend downward to pass through the second filter member.

In the composite filter according to still another exemplary embodiment of the present invention, the third upper cap member may include an upper cap guide which is disposed to extend downward to be coupled to the second filter member.

In the composite filter according to still another exemplary embodiment of the present invention, after washing the first filter member, the washing water may be moved to the washing water discharge port via a first discharge passage formed between the first filter member and the first body member.

In the composite filter according to still another exemplary embodiment of the present invention, a plurality of discharge holes communicating with the first discharge passage may formed on a side surface of the first filter member, and the washing water that has washed the first filter member is moved to the first discharge passage through the plurality of discharge holes.

In the composite filter according to still another exemplary embodiment of the present invention, a second discharge passage communicating with the first discharge passage may be formed between the first upper cap member and the second upper cap member, and the second discharge passage may communicate with the washing water discharge port.

In the composite filter according to still another exemplary embodiment of the present invention, a first O-ring may be formed between the first upper cap member and the first filter member to prevent the washing water from being re-introduced into the first filter member.

In the composite filter according to still another exemplary embodiment of the present invention, a second O-ring may be formed between the second upper cap member and the first body member to prevent the washing water from mixing with the second purified water.

In the composite filter according to still another exemplary embodiment of the present invention, a third O-ring may be formed between the first filter member and the first lower cap member to prevent the washing water from flowing into the second filter member.

In the composite filter according to still another exemplary embodiment of the present invention, a fourth O-ring may be formed between the first body member and the first lower cap member to prevent the washing water from mixing with the second purified water.

In the composite filter according to still another exemplary embodiment of the present invention, a fifth O-ring may be formed between the second body member and the third upper cap member to prevent the second purified water from being re-introduced into the second filter member.

In the composite filter according to still another exemplary embodiment of the present invention, a first spacer may be formed between the first upper cap member and the first body member to be spaced apart from each other at a certain interval.

In the composite filter according to still another exemplary embodiment of the present invention, a second spacer may be formed between the second upper cap member and the case member to be spaced apart from each other at a certain interval.

The water purifier according to still another exemplary embodiment of the present invention may include a raw water supply unit which controls the supply of raw water; a composite water for receiving raw water from the raw water supply unit and filtering; a purified water discharge unit which controls the discharge of purified water filtered by the composite filter; and a washing module which is provided between the raw water supply unit and the composite filter, and controls the supply of washing water to the composite filter, wherein the composite filter includes a filtering unit which is provided with a first filter member that filters the raw water to produce first purified water, and a second filter member that filters the first purified water to produce second purified water and is disposed to be stacked on the lower part of the first filter member, wherein the filtering unit includes a first body member which surrounds the first filter; a first upper cap member wherein the first filter member is disposed below; a second upper cap member wherein the first upper cap member is disposed below, and the first body member is disposed below; a first lower cap member which is disposed above the first filter member and penetrates the second filter member; a second body member which surrounds the second filter member; and a third upper cap member wherein the second filter member is disposed below, and wherein the raw water and the washing water are selectively supplied to the composite filter.

In the water purifier according to still another exemplary embodiment of the present invention, the composite filter may further include a housing part which is provided with a raw water inlet port through which raw water is introduced, a purified water outlet port through which filtered purified water is discharged, and a washing water discharge port through which washing water is discharged, wherein the housing part includes a head member which is provided with a first partition wall that prevents the raw water and the washing water from mixing, and a second partition wall that prevents the purified water and the washing water from mixing; and a case member which extends from the head member and has the filtering unit disposed therein.

In the water purifier according to still another exemplary embodiment of the present invention, the washing module is characterized in that the composite filter is washed by using raw water supplied from the raw water supply unit.

The water purifier according to still another exemplary embodiment of the present invention may further include a purified water storage tank which is connected to the purified water discharge unit, and is supplied with purified water filtered by the composite filter, wherein the washing module washes the composite filter by using purified water supplied from the purified water storage tank.

Advantageous Effects

According to the above configurations, in the composite filter according to an exemplary embodiment of the present invention, since the discharging of washing water as well as the input of raw water and the output of purified water are possible, filter members are integrated to configure a composite filter such that user convenience is enhanced. In addition, since a head member of a housing part is provided with first and second partition walls to form independent flow paths in which the raw water, the purified water and the washing water do not mix, passages through which the raw water, the purified water and the washing water flow are concentrated on the upper side of the composite filter such that a degree of freedom in designing the layout of other parts is improved. In addition, since a second filter member is arranged to surround a first filter member through first, second and third upper cap members in a filtering unit, it is configured to manufacture a composite filter by utilizing a pre-manufactured first filter member, and thus, it provides an effect of enhancing manufacturability.

In the composite filter according to an exemplary embodiment of the present invention, the filtering unit is provided with a lower cap member that is coupled to a lower side of the second filter member to improve structural stability, and a flow path through which the first purified water moves to the second filter member is formed such that the second purified water that is finally discharged moves to the upper direction, and thus, it provides an effect of enhancing the manufacturability of a composite filter.

In the composite filter according to an exemplary embodiment of the present invention, a plurality of discharge holes are formed on the side surface of the first filter member, and since the washing water that has washed the first filter member is moved to a washing water discharge port via a first discharge passage formed between the first filter member and the body member through a plurality of discharge holes, the washing water is not mixed with raw water or purified water and moves through an independent flow path, and thus, it provides an effect of improving user satisfaction by improving the water quality of purified water.

In the composite filter according to an exemplary embodiment of the present invention, since a first O-ring is formed between the first filter member and the first upper cap member to prevent the washing water from being re-introduced into the first filter member, the washing water is stably discharged, and thus, it provides an effect of increasing the usage period of the first filter member by stably discharging the washing water to the outside.

In the composite filter according to an exemplary embodiment of the present invention, since a second O-ring is formed between the second filter member and the body member to prevent the first purified water from moving to the second discharge passage, the first purified water is stably moved to the second filter member, and thus, it provides an effect of improving the operation reliability of a composite filter.

In the composite filter according to an exemplary embodiment of the present invention, since a first spacer is formed between the body member and the first upper cap member, the washing water is smoothly moved between the body member and the first upper cap member, and thus, it provides an effect of improving the operational reliability of a composite filter.

In the composite filter according to an exemplary embodiment of the present invention, since a second spacer is formed between the second upper cap member and the third upper cap member, the purified water is smoothly moved between the second upper cap member and the third upper cap member, and thus, it provides an effect of improving the operation reliability of a composite filter.

In the composite filter according to an exemplary embodiment of the present invention, since raw water flows into the first filter member through a first upward guide, passages in which the raw water, purified water and washing water flow are concentrated in the upper part of the composite filter, while the raw water is not mixed with the purified water or washing water, and thus, it provides an effect of improving the operation reliability of a composite filter.

In the composite filter according to an exemplary embodiment of the present invention, since a first partition wall is disposed to extend in the axial direction along the first upward guide, it effectively prevents incoming raw water from mixing with the discharged washing water, and thus, it provides an effect of improving user satisfaction through the improvement of the water quality of purified water that is finally discharged.

In the composite filter according to an exemplary embodiment of the present invention, since the washing water that has passed through the first filter member is discharged to the outside through a second upward guide, the washing water is stably discharged, and thus, it provides an effect of improving the operational stability of a composite filter.

In the composite filter according to an exemplary embodiment of the present invention, since a second partition wall is disposed to extend in the axial direction along the second upward guide, it effectively prevents the purified water that is discharged from mixing with the discharged washing water, and thus, it provides an effect of improving user satisfaction through the improvement of the water quality of purified water.

In the water purifier according to an exemplary embodiment of the present invention, since the raw water and the washing water are selectively supplied to the composite filter, the composite filter is washed by the washing water while the finally discharged purified water and washing water are not mixed, and thus, it provides an effect of improving user satisfaction by increasing the product lifespan of a composite filter.

In the water purifier according to an exemplary embodiment of the present invention, since a washing module uses the raw water supplied from the raw water supply unit as washing water, a separate fluid supply for use as washing water in the washing module is not required, and thus, it provides an effect of improving the manufacturability of a water purifier.

In the water purifier according to an exemplary embodiment of the present invention, since the washing module users purified water as washing water, it provides an effect of improving the washing efficiency of a composite filter.

In the composite filter according to another exemplary embodiment of the present invention, since the discharging of washing water as well as the input of raw water and the output of purified water are possible, filter members are integrated to configure a composite filter such that user convenience is enhanced. In addition, since a head member of a housing part is provided with first and second partition walls to form independent flow paths in which the raw water, the purified water and the washing water do not mix, passages through which the raw water, the purified water and the washing water flow are concentrated on the upper part of the composite filter such that a degree of freedom in designing the layout of other parts is improved. In addition, since first to fifth upper cap members are disposed on the upper part of the first filter member and the second filter member in a filtering unit, it is configured to manufacture a composite filter by utilizing a previously manufactured first filter member, and thus, it provides an effect of enhancing manufacturability.

In the composite filter according to another exemplary embodiment of the present invention, the filtering unit is provided with a lower cap member that is coupled to the lower side of the second filter member to enhance structural stability, and since a flow path through which the first purified water moves to the second filter member is formed such that the finally discharged second purified water moves upward, it provides an effect of enhancing the manufacturability of a composite filter.

In the composite filter according to another exemplary embodiment of the present invention, since the first purified water that has passed through the first filter member flows into the second filter member through a first upward guide, even if the second filter member is disposed to be stacked on the upper part of the first filter member, passages through which the raw water, purified water and washing water flow are concentrated on the upper part of the composite filter, and thus, it provides an effect of improving the use convenience of a composite filter.

In the composite filter according to another exemplary embodiment of the present invention, since the washing water that has passed through the first filter member is moved through a second upward guide, the washing water is not mixed with purified water, and thus, it provides an effect of improving the operation reliability of a composite filter.

In the composite filter according to another exemplary embodiment of the present invention, since the upper cap guide of the third upper cap member is coupled to the second filter member, the second filter member is stably disposed on the upper part of the first filter member to stably secure a passage in which the second purified water is moved, and thus, it provides an effect of improving the operational reliability of a composite filter.

In the composite filter according to another exemplary embodiment of the present invention, since the purified water that has passed through the second filter member is moved through a fourth upward guide, the purified water is not mixed with the washing water, and thus, it provides an effect of improving the operation reliability of a composite filter.

In the composite filter according to another exemplary embodiment of the present invention, since the washing water that has passed through the first filter member is discharged to the outside through a fifth upward guide, the washing water is not mixed with the raw water, and thus, it provides an effect of improving the operation reliability of a composite filter.

In the composite filter according to another exemplary embodiment of the present invention, a plurality of discharge holes are formed on the side surface of the first filter member, and since the washing water that has washed the first filter member is moved to a washing water discharge port via a first discharge passage formed between the first filter member and the second upper cap member through a plurality of discharge holes, the washing water is moved through an independent flow path without being mixed with raw water or purified water, and thus, it provides an effect of improving user satisfaction through the improvement of the water quality of purified water.

In the composite filter according to another exemplary embodiment of the present invention, since a first O-ring is formed between the second upper cap member and the first filter member to prevent the washing water from being re-introduced into the first filter member, the washing water is stably discharged to the outside, and thus, it provides an effect of increasing the usage period of the first filter member.

In the composite filter according to another exemplary embodiment of the present invention, since a second O-ring is formed between the second upper cap member and the fifth upper cap member to prevent the washing water from being re-introduced into the first filter member, it prevents the washing water from mixing with raw water, and thus, it provides an effect of improving the operational reliability of a composite filter.

In the composite filter according to another exemplary embodiment of the present invention, since a third O-ring that prevents the second purified water that is filtered by the second filter member from moving to the second discharge passage is formed between the second upper cap member and the lower cap member, it prevents the second purified water from mixing with the washing water, and thus, it provides an effect of improving the operational reliability of a composite filter.

In the composite filter according to another exemplary embodiment of the present invention, since a fourth O-ring is formed between the first upper cap member and the second upper cap member to prevent the second purified water from flowing into the first discharge passage, it prevents the second purified water from mixing with the washing water, and thus, it provides an effect of improving the operational reliability of a composite filter.

In the composite filter according to another exemplary embodiment of the present invention, since a fifth O-ring is formed between the lower cap member and the fourth upper cap member to prevent inflow into the second discharge passage, it prevents the second purified water from mixing with the washing water, and thus, it provides an effect of improving the operation reliability of a composite filter.

In the composite filter according to another exemplary embodiment of the present invention, since a first spacer is formed between the fourth upper cap member and the fifth upper cap member, the washing water is smoothly moved upward through a gap between the fourth upper cap member and the fifth upper cap member, and thus, it provides an effect of improving the operation reliability of a composite filter.

In the composite filter according to another exemplary embodiment of the present invention, since a second spacer is formed between the fifth upper cap member and the case member, the raw water is smoothly moved downward through a gap between the fifth upper cap member and the case member such that while the first filter member and the second filter member have a stacked structure, passages through which the raw water, purified water and washing water flow are concentrated at the upper part of the composite filter, and thus, it provides an effect of improving user convenience of a composite filter.

In the water purifier according to another exemplary embodiment of the present invention, since the raw water and the washing water are selectively supplied to the composite filter, the composite filter is washed by the washing water without mixing the purified water finally that is discharged with the washing water such that it extends the product lifespan of the composite filter, and thus, it provides an effect of increasing user satisfaction.

In the water purifier according to another exemplary embodiment of the present invention, since the washing module uses raw water supplied from the raw water supply unit as washing water, a separate fluid supply for use as washing water in the washing module is not required, and thus, it provides an effect of improving the manufacturability of a water purifier.

In the water purifier according to another exemplary embodiment of the present invention, since the washing module uses purified water as the washing water, it provides an effect of improving the washing efficiency of a composite filter.

In the composite filter according to still another exemplary embodiment of the present invention, since the discharging of washing water as well as the input of raw water and the output of purified water are possible, filter members are integrated to configure a composite filter such that user convenience is enhanced. In addition, since a head member of a housing part is provided with first and second partition walls to form independent flow paths in which the raw water, the purified water and the washing water do not mix, passages through which the raw water, the purified water and the washing water flow are concentrated on the upper part of the composite filter such that a degree of freedom in designing the layout of other parts is improved. In addition, since the filtering unit uses a first body member, a first upper cap member, a second upper cap member, a first lower cap member and a third upper cap member such that the first filter member and the second filter member are arranged in a stacked structure, it is configured to manufacture a composite filter by utilizing a previously manufactured first filter member, and thus, it provides an effect of enhancing manufacturability.

In the composite filter according to still another exemplary embodiment of the present invention, the filtering unit is provided with a second lower cap member that is coupled to the lower side of the second filter member to improve structural stability, and a flow path through which the first purified water moves to the second filter member is formed such that the finally discharged second purified water moves upward, and thus, it provides an effect of improving the manufacturability of a composite filter.

In the composite filter according to still another exemplary embodiment of the present invention, since raw water flows into the first filter member through the first upward guide, the passages through which the raw water, purified water and washing water flow are concentrated on the upper part of the composite filter, while the raw water is not mixed with the purified water or washing water, and thus, it provides an effect of improving the operational reliability of a composite filter.

In the composite filter according to still another exemplary embodiment of the present invention, since the washing water that has passed through the first filter member is discharged to the outside through the second upward guide, the washing water is stably discharged, and thus, it provides an effect of improving the operational stability of a composite filter.

In the composite filter according to still another exemplary embodiment of the present invention, since the first purified water that has passed through the first filter member is moved to the lower side of the second filter member through the first lower cap guide, the first purified water is smoothly moved to the second filter member even if the first filter member and the second filter member have a stacked structure, and thus, it provides an effect of improving the operational reliability of a composite filter.

In the composite filter according to still another exemplary embodiment of the present invention, since the upper cap guide of the third upper cap member is coupled to the second filter member, the passage through which the second purified water moves between the first filter member and the second filter member is stably secured, and thus, it provides an effect of improving the operational stability of a composite filter.

In the composite filter according to still another exemplary embodiment of the present invention, since a plurality of discharge holes are formed on the side surface of the first filter member and the washing water that has washed the first filter member is moved to the washing water discharge port via the first discharge passage formed between the first filter member and the first body member through a plurality of discharge holes, the washing water is not mixed with raw water or purified water and moves through an independent flow path, and thus, it provides an effect of improving user satisfaction through the improvement of the water quality of purified water.

In the composite filter according to still another exemplary embodiment of the present invention, since a first O-ring is formed between the first upper cap member and the first filter member to prevent the washing water from being re-introduced into the first filter member, the washing water is stably discharged to the outside, and thus, it provides an effect of increasing the usage period of the first filter member.

In the composite filter according to still another exemplary embodiment of the present invention, since a second O-ring is formed between the second upper cap member and the first body member to prevent the washing water from mixing with the second purified water, it provides an effect of improving the operational reliability of a composite filter.

In the composite filter according to still another exemplary embodiment of the present invention, since a third O-ring is formed between the first filter member and the first lower cap member to prevent the washing water from flowing into the second filter member, it prevents the washing water from mixing with the first purified water, and thus, it provides an effect of improving the satisfaction of users through securing the quality of purified water.

In the composite filter according to still another exemplary embodiment of the present invention, since a fourth O-ring is formed between the first body member and the first lower cap member to prevent the washing water from mixing with the second purified water, it provides an effect of improving the operation reliability of a composite filter.

In the composite filter according to still another exemplary embodiment of the present invention, since a fifth O-ring is formed between the second body member and the third upper cap member to prevent the second purified water from being re-introduced into the second filter member, the second purified water is smoothly moved upward, and thus, it provides an effect of improving the operational reliability of a composite filter.

In the composite filter according to still another exemplary embodiment of the present invention, since a first spacer is formed between the first upper cap member and the first body member, the washing water is smoothly moved upward through a gap between the first upper cap member and the second upper cap member, and thus, it provides an effect of improving the operation reliability of a composite filter.

In the composite filter according to still another exemplary embodiment of the present invention, since a second spacer is formed between the second upper cap member and the case member, the purified water is smoothly moved between the second upper cap member and the case member. and thus, it provides an effect of improving the operational reliability of a composite filter.

In the water purifier according to still another exemplary embodiment of the present invention, since the raw water and washing water are selectively supplied to the composite filter, the composite filter is washed by the washing water without mixing the final discharged purified water and the washing water, and thus, it provides an effect of improving user satisfaction by increasing the product lifespan of the composite filter.

In the water purifier according to still another exemplary embodiment of the present invention, since the washing module uses raw water supplied from the raw water supply unit as washing water, a separate fluid supply for use as washing water in the washing module is not required, and thus, it provides an effect of improving the manufacturability of a water purifier.

In the water purifier according to still another exemplary embodiment of the present invention, since the washing module uses purified water as the washing water, it provides an effect of improving the washing efficiency of a composite filter.

Figure 1:
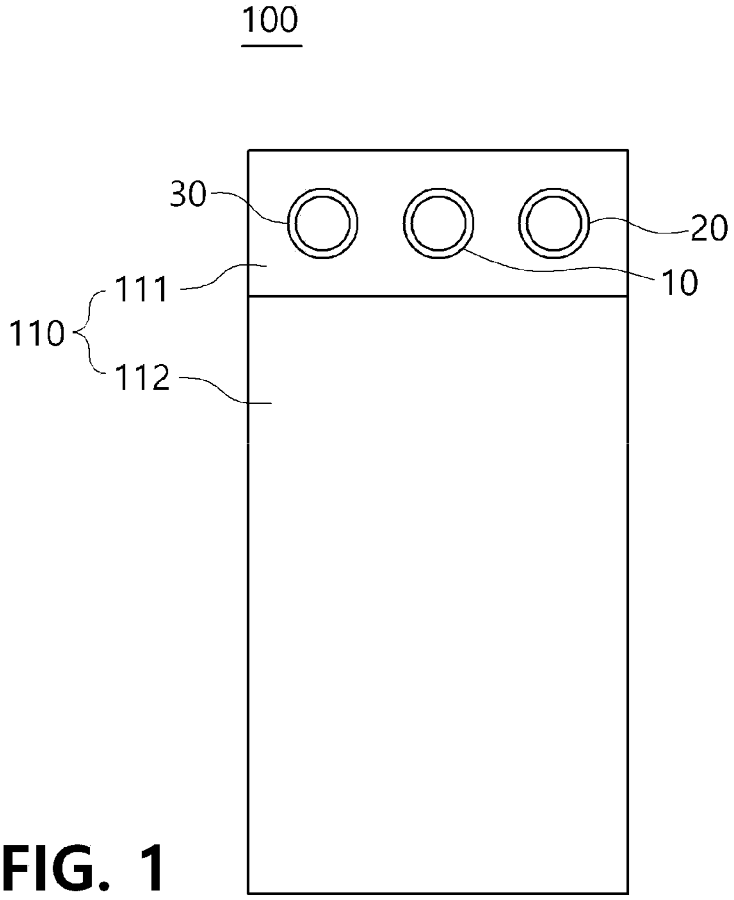
FIG. 1 is a diagram schematically showing the appearance of a composite filter according to an exemplary embodiment of the present invention.

| | |
|---|---|
| 10: Raw water inlet port | 20: Purified water outlet port |
| 30: Washing water discharge port | 100: Composite filter |
| 110: Housing part | 111: Head member |
| 111a: First partition wall | 111b: Second partition wall |
| 112: Case member | 200: Filtering unit |
| 210: First filter member | 220: Second filter member |
| 230: Body member | 240: First upper cap member |
| 250: Second upper cap member | 260: Third upper cap member |
| 500: Composite filter | 510: Housing part |
| 511 Head member | 512 Case member |
| 520: Raw water inlet port | 530: Purified water outlet port |
| 540: Washing water discharge port | 511a: First compartment wall |
| 511b: Second partition wall | 600: Filtering unit |
| 610: First filter member | 620: Second filter member |
| 630: First upper cap member | 640: Second upper cap member |
| 650: Third upper cap member | 660: Fourth upper cap member |
| 670: Fifth upper cap member | |
| 900: Composite filter | 910: Housing part |
| 911 Head member | 912 Case member |
| 920: Raw water inlet port | 930: Purified water outlet port |
| 940: Washing water discharge port | 911a: First compartment wall |
| 911b: Second partition wall | 1000: Filtering unit |
| 1010: First filter member | 1020: Second filter member |
| 1030: First body member | 1040: First upper cap member |
| 1050: Second upper cap member | 1060: First lower cap member |
| 1070: Second body member | 1080: Third upper cap member |

MODES OF THE INVENTION

Hereinafter, various exemplary embodiments will be described in more detail with reference to the accompanying drawings. The exemplary embodiments according to the present invention may be variously modified. Specific exemplary embodiments may be depicted in the drawings and described in detail in the detailed description. However, specific exemplary embodiments disclosed in the accompanying drawings are only intended to facilitate understanding of various exemplary embodiments. Therefore, the technical idea is not limited by the specific exemplary embodiments disclosed in the accompanying drawings, and it is to be understood as including all equivalents or substitutes included in the spirit and scope of the invention.

Terms including ordinal numbers such as first and second may be used to describe various elements, but these elements are not limited by the above-described terms. The above-described terms are only used to differentiate one element from another.

It is understood that the terms "include" or "have", when used in the exemplary embodiments of the present invention, are intended to specify the presence of stated features, integers, steps, operations, elements, components and/or a combination thereof described in the exemplary embodiments of the present invention, but not preclude the possibility of the presence or addition of one or more other features, integers, steps, operations, elements, components or a combination thereof. When an element is referred to as being "connected" or "linked" to other element, it will be understood that it can be directly connected or linked to the other element, but intervening elements may also be present. On the other hand, when an element is referred to as being "directly connected" or "directly linked" to other element, it will be understood that there are no intervening elements present.

Meanwhile, a "module" or "unit" for an element used in an exemplary embodiment of the present invention performs at least one function or operation. In addition, the "module" or "unit" may perform a function or operation by hardware, software or a combination of hardware and software. In addition, a plurality of "modules" or a plurality of "units" excluding "module" or "unit" to be performed in a specific hardware or performed by at least one processor may be integrated into at least one module. Expressions in the singular include plural expressions unless the context clearly indicates otherwise.

Additionally, in terms of describing an exemplary embodiment of the present invention, when it is determined that the detailed description of a related known function or configuration may unnecessarily obscure the gist of the present invention, the detailed description thereof will be abbreviated or omitted.

Figure 2:
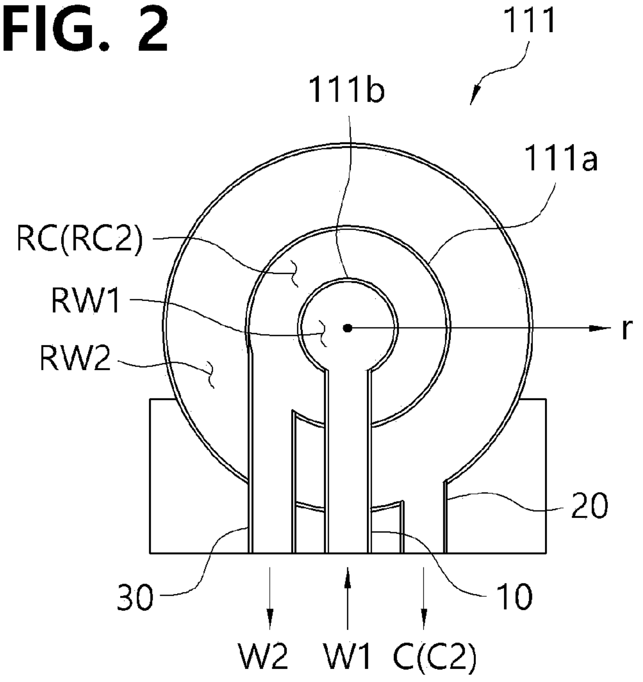
FIG. 2 is a plan view showing the head member of a composite filter according to an exemplary embodiment of the present invention.
Figure 3:
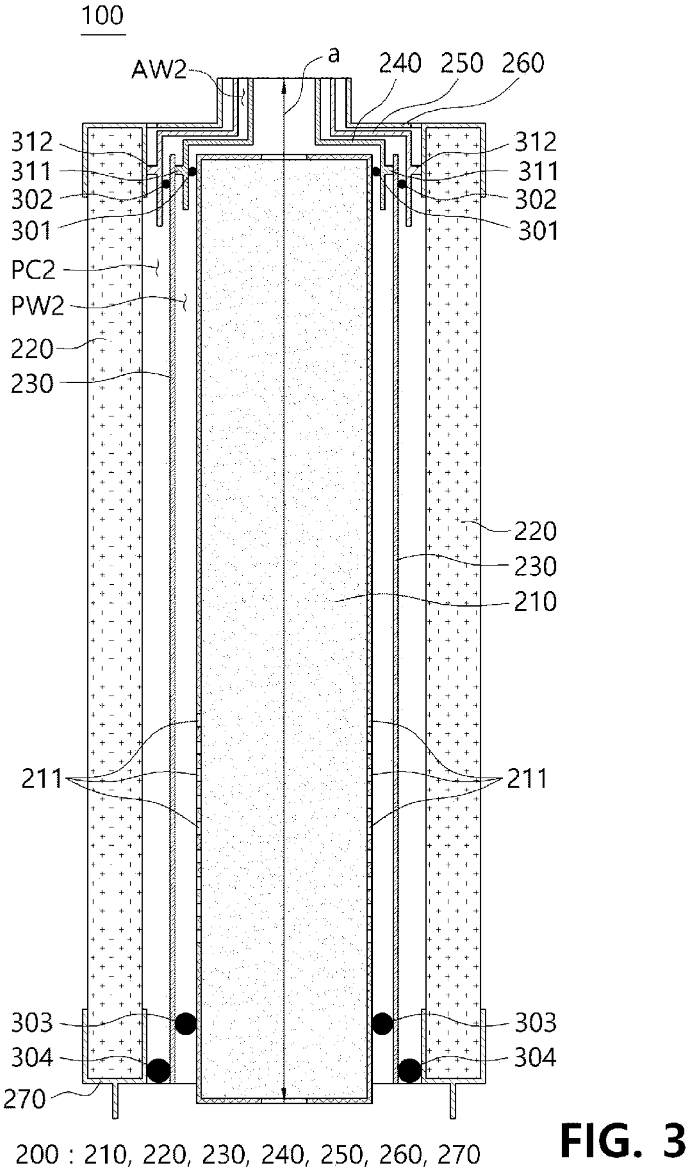
FIG. 3 is a cross-sectional view showing the assembled state of the filtering unit of a composite filter according to an exemplary embodiment of the present invention.

Hereinafter, the composite filter according to an exemplary embodiment of the present invention and the water purifier including the composite filter will be described with reference to the drawings. FIG. 1 is a diagram schematically showing the appearance of a composite filter according to an exemplary embodiment of the present invention, FIG. 2 is a plan view showing the head member of a composite filter according to an exemplary embodiment of the present invention, and FIG. 3 is a cross-sectional view showing the assembled state of the filtering unit of a composite filter according to an exemplary embodiment of the present invention. Herein, a means the axial direction of the composite filter, and r means the radial direction of the composite filter.

As illustrated in FIGS. 1 to 3, the composite filter 100 of the present invention includes a housing part 110 which is provided with a raw water inlet port 10 through which raw water (W1) is introduced, a purified water outlet port 20 through which filtered purified water (C) is discharged, and a washing water discharge port 30 through which washing water (W2) is discharged; and a filtering unit 200 which is provided with a first filter member 210 that filters the raw water (W1) to produce first purified water (C1), and a second filter member 220 that filters the first purified water (C1) to produce second purified water (C2) and is disposed to surround the first filter member 210. That is, after the raw water (W1) introduced through the raw water inlet port 10 moves to the filtering unit 200, it sequentially moves to the first filter member 210 and the second filter member 220 provided in the filtering unit 200 to be filtered, and finally, filtered purified water (C) is discharged through the purified water outlet port 20 and then provided to the user. In addition, the purified water (C) may be stored in a separate purified water tank (not illustrated), or may be supplied to a cold water generator (not illustrated), a hot water generator (not illustrated) and an ice generator (not illustrated) for generating cold water, hot water and ice, respectively. Then, the first purified water (C1) moves to a lower side of the first filter member 210 and then moves to the second filter member 220, and after washing the first filter member 210, the washing water (W2) moves to a first discharge passage (PW2) formed between the first filter member 210 and the second filter member 220 and is discharged outside of the composite filter through the washing water discharge port 30. In this way, since it is configured such that the discharge of the washing water (W2) as well as the input of the raw water (W1) and the output of the purified water (C) are possible, the first filter member 210 and the second filter member 220 are integrated to configure a composite filter, and thus, user convenience is enhanced. In addition, by washing the first filter member 210 using the washing water (W2), the product lifespan of the composite filter 100 is increased, and thus, user convenience is enhanced. In this case, the first filter member 210 may be an ultra-filtration (UF) filter that filters out contaminants by a hollow fiber membrane. In addition, the second filter member 220 may be a carbon filter or a microfiltration (MF) filter. In addition, the second filter may include an electric deionization-type filter. The electric deionization method refers to EDI (Electro Deionization), CEDI (Continuous Electro Deionization), CDI (Capacitive Deionization) or the like. In this case, a separate filter member may be provided on the outer surface of the second filter member 220. As an example, this separate filter member may be an NT filter member. Such an NT filter member may be made of a material that is charged with static electricity to adsorb foreign substances included in the introduced raw water (W1), for example, a nano-trap material. This electrostatic material may be configured to carry a positive charge. Accordingly, negatively charged foreign substances, such as viruses, bacteria and fine particles, included in the raw water (W1) may be adsorbed to the NT filter member by static electricity. In addition, this separate filter member may be a sediment filter member.

As illustrated in FIG. 2, in the composite filter according to an exemplary embodiment of the present invention, the housing part 110 includes a head member 111 which is provided with a first partition wall 111*a* that prevents the raw water (W1) and the washing water (W2) from mixing, and a second partition wall 111*b* that prevents the second purified water (C2) and the washing water (W2) from mixing; and a case member 112 which extends from the head member 111 and has the filtering unit 200 disposed therein. That is, it is a structure in which not only the raw water (W1) received but also the output second purified water (C2) and the discharged washing water (W2) are output/discharged to the upper part of the composite filter 100, and to this end, the head member 111 is formed with a raw water area (RW1) from which the raw water (W1) is introduced, a second purified water area (RC2) from which the second purified water (C2) is output, and a washing water area (RW2) from which the washing water (W2) is discharged. To this end, since the first and second partition walls 111*a*, 111*b* are provided in the head member 111 of the housing part 110 to form independent passages in which the raw water (W1), the second purified water (C2) and the washing water (W2) do not mix, water output/discharge are concentrated in the upper part of the composite filter 100, thereby improving the freedom of layout design of other parts. Herein, the washing water (W2) flowing into the first filter member 210 washes the first filter member 210 using the raw water (W1). However, the washing water (W2) is not limited to using only the raw water (W1), and purified water that is output may be used.

As illustrated in FIG. 3, the filtering unit 200 includes a body member 230 which is disposed between the first filter member 210 and the second filter member 220; a first upper cap member 240 which is disposed below the first filter member 210 that is disposed inside the body member 230; a second upper cap member 250 which is disposed below the first upper cap member; 240 and a third upper cap member 260 wherein the second filter member 220 which is disposed outside the body member 230 is disposed below, and the third upper cap member 260 is disposed above the second upper cap member 240. In this case, the raw water (W1) is moved through the inside of the first upper cap member 240, and the washing water (W2) is moved between the first upper cap member 240 and the second upper cap member 250, and since the purified water (C) is moved between the second upper cap member 250 and the third upper cap member 260, independent flow paths in which the raw water (W1), the washing water (W2) and the purified water (C) do not mix are formed, and thus, the first filter member 210 and the second filter member 220 are integrated to enhance manufacturability.

As illustrated in FIG. 3, a plurality of discharge holes 211 that are disposed to be spaced apart from each other are provided on a lower side of the side surface of the first filter member 210. In this case, the plurality of discharge holes 211 have the same size. However, the size of the plurality of discharge holes 211 is not limited to the same size, and it may increase or decrease in the downward direction. In addition, the plurality of discharge holes 211 are disposed to be spaced apart from each other at equal intervals. However, the plurality of discharge holes 211 are not limited to being disposed to be spaced apart from each other at equal intervals, and may be spaced apart from each other in the downward direction. In addition, a first discharge passage (PW2) through which the washing water (W2) flows is provided between the first filter member 210 and the body member 230. In this case, the plurality of discharge holes 211 communicate with the first discharge passage (PW2). In addition, the washing water (W2) that has washed the first filter member 210 is moved to the first discharge passage (PW2) through the plurality of discharge holes 211. A second discharge passage (AW2) communicating with the first discharge passage (PW2) is provided between the first upper cap member 240 and the second upper cap member 250. In this case, the second discharge passage (AW2) communicates with the washing water discharge port 30 (refer to FIG. 2). Through this, the washing water (W2) that has washed the first filter member 210 sequentially passes through the plurality of discharge holes 211, the first discharge passage (PW2), the second discharge passage (AW2) and the washing water discharge port 30 to be discharged to the outside of the composite filter 100. In this way, the composite filter 100 according to an exemplary embodiment of the present invention is manufactured by integrating the first filter member 210 and the second filter member 220, and since the washing water (W2) and the purified water (C) do not mix with each other and are discharged, the operation reliability of the composite filter 100 is improved.

Figure 4:
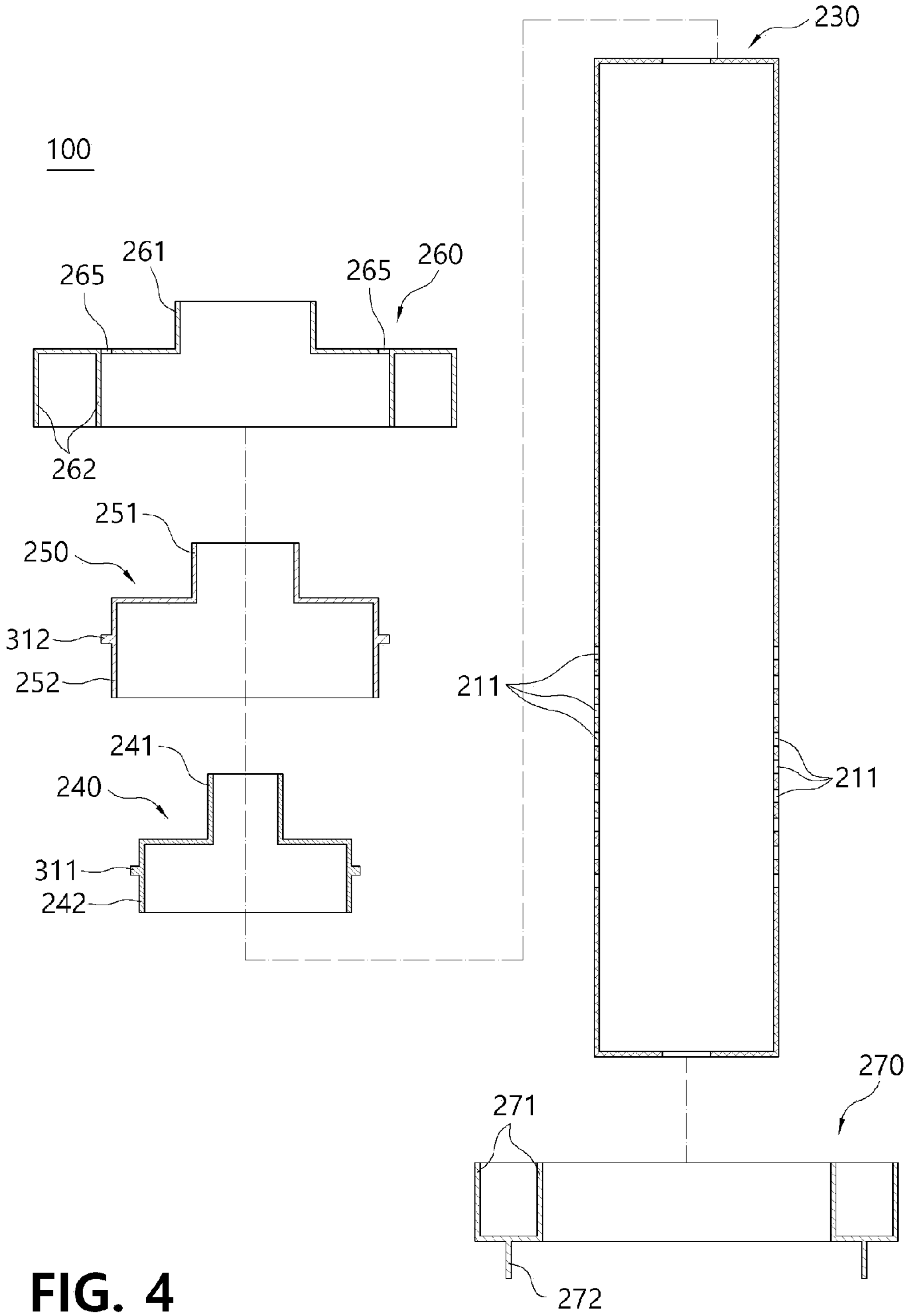
FIG. 4 is a cross-sectional view showing a state in which the body member, first, second and third upper cap members, and lower cap member of the filtering unit of a composite filter according to an exemplary embodiment of the present invention are separated.

FIG. 4 is a cross-sectional view showing a state in which the body member, first, second and third upper cap members, and lower cap member of the filtering unit of a composite filter according to an exemplary embodiment of the present invention are separated.

As illustrated in FIG. 4, in the composite filter 100 according to an exemplary embodiment of the present invention, the second upper cap member 250 is positioned below the third upper cap member 260, the first upper cap member 240 is positioned below the second upper cap member 250, the body member 230 is positioned below the first upper cap member 240, and the lower cap member 270 is positioned below the body member 230. In this way, since the third upper cap member 260, the second upper cap member 250, the first upper cap member 240, the body member 230 and the lower cap member 270 are sequentially stacked, the first filter member 210 (refer to FIG. 3) and the second filter member 220 are assembled to have a dual structure, and thus, the manufacturability of the composite filter 100 is improved.

As illustrated in FIGS. 3 and 4, in the composite filter 100 according to an exemplary embodiment of the present invention, the first upper cap member 240 includes a first upward guide 241 which is disposed to extend upward such that the raw water (W1) flows into the first filter member 210. That is, since the first upper cap member 240 is provided with the first upward guide 241 through which the raw water (W1) flows, the inflow of the raw water (W1) and the discharge of the washing water (W2) are separated, and thus, the operational reliability of the composite filter 100 is secured. In addition, the first partition wall 111*a* (refer to FIG. 2) is disposed to extend in the axial direction along the first upward guide 241. That is, the raw water (W1) is smoothly moved to the first filter member 210 through the first partition wall 111*a* (refer to FIG. 2) and the first upward guide 241.

In addition, as illustrated in FIGS. 3 and 4, in the composite filter 100 according to an exemplary embodiment of the present invention, the second upper cap member 250 includes a second upward guide 251 which is disposed to extend upward such that the washing water (W2) that has passed through the first filter member 210 is discharged to the outside. In this case, while surrounding the first upward guide 241, the second upward guide 251 is formed to be disposed to be spaced apart. In addition, since the second upper cap member 250 is provided with a second upward guide 251 through which the washing water (W2) flows, the output of the washing water (W2) and the discharge of the purified water (C) are separated, and thus, the operational reliability of the composite filter 100 is secured. In addition, the second partition wall 111*b* (refer to FIG. 2) is disposed to extend in the axial direction along the second upward guide 251. That is, after moving upward along the second upward guide 251, the washing water (W2) is smoothly moved to the washing water discharge port 30 through the second partition wall 111*b* (refer to FIG. 2).

In addition, as illustrated in FIGS. 3 and 4, in the composite filter 100 according to an exemplary embodiment of the present invention, the first upper cap member 240 is provided with a first downward guide which extends downward between the first filter member 210 and the body member 230. In this case, a first O-ring 301 is formed between the first filter member 210 and the first downward guide 242 of the first upper cap member 240. The first O-ring 301 is made of a rubber or silicone material. However, the first O-ring 301 is not limited to being made of a rubber or silicone material, and it may be made of various materials having elasticity. In addition, the first O-ring 301 seals a gap between the first filter member 210 and the first downward guide 242 such that the washing water (W2) moving through the first discharge passage (PW2) is prevented from being re-introduced into the first filter member 210. In addition, a first spacer 311 for disposing to be spaced apart from each other at a certain interval is provided between the body member 230 and the first downward guide 242 of the first upper cap member 240. That is, the first spacer 311 prevents the first discharge passage (PW2) and the second discharge passage (AW2) from being blocked with each other. In addition, as the elastic force of the first O-ring 301 is provided to the first spacer 311 so as to be pressed toward the body member 230, the first upper cap member 240 becomes stably fixed between the first filter member 210 and the body member 230 by the first spacer 311 and the first O-ring 301.

In addition, as illustrated in FIGS. 3 and 4, in the composite filter 100 according to an exemplary embodiment of the present invention, a second downward guide 252 which extends downward between the second filter member 220 and the body member 230 is provided on the second upper cap member 250. In this case, a second O-ring 302 is formed between the body member 230 and the second downward guide 252 of the second upper cap member 250. The second O-ring 302 is made of a rubber or silicone material. However, the second O-ring 302 is not limited to being made of a rubber or silicon material, and it may be made of various materials having elasticity. In addition, the second O-ring 302 seals a gap between the body member 230 and the second downward guide 252 to prevent the second purified water (C2) from flowing into the second discharge passage (AW2). In addition, a second spacer 312 for disposing to be spaced apart from each other at a certain interval is provided between the third upper cap member 260 and the second downward guide 252 of the second upper cap member 250. That is, the second spacer 312 prevents the second upper cap member 250 and the third upper cap member 260 from contacting each other and blocking the passage through which the second purified water (C2) is discharged.

In addition, since the elastic force of the second O-ring 302 is provided to the second spacer 312 so as to be pressed toward the third upper cap member 260, the second upper cap member 250 becomes stably fixed between the third upper cap member 260 and the body member 230 by the spacer 312 and the second O-ring 302.

In addition, as illustrated in FIGS. 3 and 4, in the composite filter 100 according to an exemplary embodiment of the present invention, the third upper cap member 260 is provided with a water outlet hole 265 which is used to discharge the second purified water (C2). The second purified water (C2) filtered by the second filter member 220 is moved upward through the water outlet hole 265. In addition, a third downward guide 262 which extends downward such that the second filter member 220 is fixedly disposed is provided on the third upper cap member 260. Since the third downward guide 262 contacts the outer peripheral surface of the upper side of the second filter member 220, the third upper cap member 260 stably fixes the second filter member 220, thereby enhancing the durability of the composite filter 100. In addition, a third upward guide 261 through which the second purified water (C2) flows is formed in the third upper cap member 260. In this third upward guide 261, the second purified water (C2) is connected to the purified water outlet port 20 such that the second purified water (C2) is stably discharged to the outside of the composite filter 100, thereby securing the operational stability of the composite filter 100.

As illustrated in FIGS. 3 and 4, in the composite filter 100 according to an exemplary embodiment of the present invention, the filtering unit 200 further includes a lower cap member 270 which is coupled to a lower side of the second filter member 220. In addition, the lower cap member 270 includes a support guide 271 which is disposed to extend upward so as to be coupled to the second filter member 220. Since the support guide 271 contacts the outer peripheral surface of the lower side of the second filter member 220, the support guide 271 stably fixes the second filter member 220, thereby enhancing the durability of the composite filter 100. Accordingly, the lower cap member 270 stably fixes the second filter member 220 together with the third upper cap member 260 such that the composite filter can be modularized through a sub-assembly process, thereby improving workability.

Figure 5:
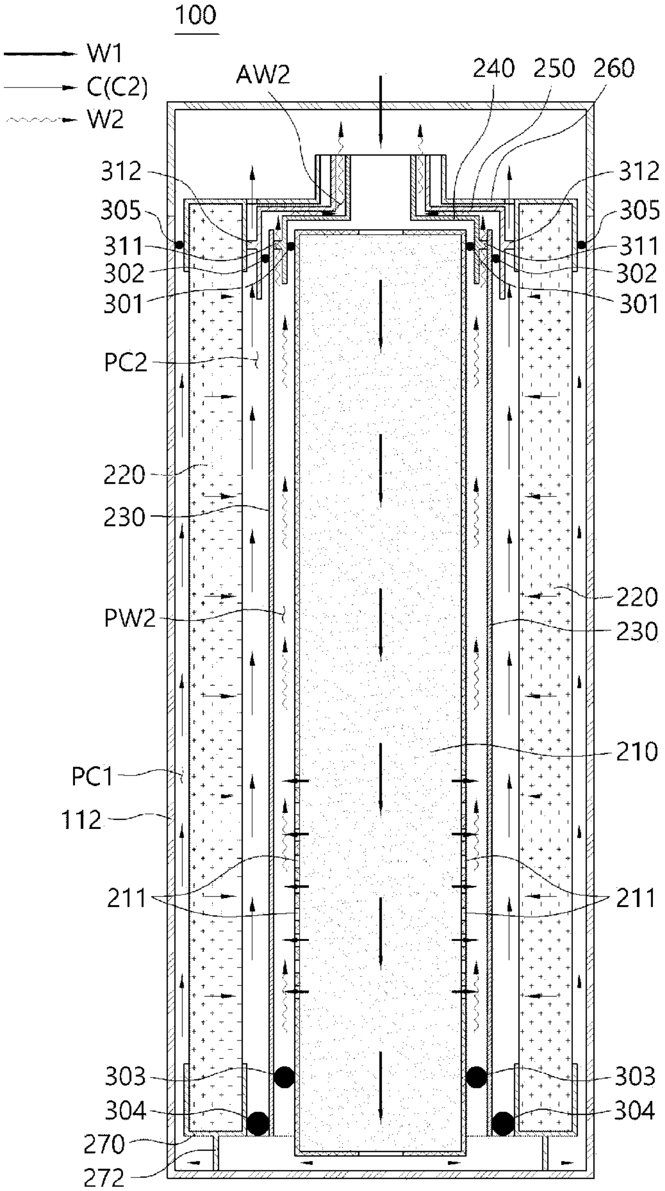
FIG. 5 is a cross-sectional view showing a state in which the filtering unit of the composite filter according to an exemplary embodiment of the present invention is installed in the housing part.

FIG. 5 is a cross-sectional view showing a state in which the filtering unit of the composite filter according to an exemplary embodiment of the present invention is installed in the housing part.

As illustrated in FIG. 5, in the composite filter 100 according to an exemplary embodiment of the present invention, the lower cap member 270 is provided with a lower leg 272 which extends downward toward a lower surface of the case member 112. The lower leg 272 is formed such that the lower cap member 270 is disposed to be spaced apart from a lower side surface of the case member 112. In addition, since the lower leg 272 and the lower cap member 270 are disposed to be spaced apart from the lower side surface of the case member 112, the first purified water (C1) that has passed through the first filter member 210 is moved between the lower cap member 270 and the lower side surface of the case member 112. In this case, a third O-ring 303 is provided between the first filter member 210 and the lower side of the body member 230 to prevent the first purified water (C1) that has passed through the first filter member 210 from moving into the first discharge passage (PW2). Accordingly, the first purified water (C1) does not move to the first discharge passage (PW2) such that the washing water (W2) flows stably in a separated state without being mixed, thereby securing the operational stability of the composite filter.

In this case, as illustrated in FIG. 5, in the composite filter 100 according to an exemplary embodiment of the present invention, a first purified water flow path (PC1) is formed between the side surface of the case member 112 and the second filter member 220. The first purified water (C1) is moved to the second filter member 220 while moving upward along the first purified water flow path (PC1). In addition, a fourth O-ring 304 is provided between the lower cap member 270 and the lower side of the body member 230 to prevent the second purified water (C2) that has passed through the second filter member 220 from being re-introduced to the lower side of the case member 112. Accordingly, the second purified water (C2) is prevented from being re-introduced to the lower side of the case member 112 and moving back to the second filter member 220, thereby securing the operational stability of the composite filter.

In addition, as illustrated in FIG. 5, in the composite filter 100 according to an exemplary embodiment of the present invention, a first purified water flow path (PC1) is formed between the side surface of the case member 112 and the second filter member 220. The first purified water (C1) is moved to the second filter member 220 while moving upward along the first purified water flow path (PC1). In addition, a fourth O-ring 304 is provided between the lower cap member 270 and the lower side of the body member 230 to prevent the second purified water (C2) that has passed through the second filter member 220 from being re-introduced to the lower side of the case member 112. Accordingly, the second purified water (C2) is prevented from being re-introduced to the lower side of the case member 112 and moving back to the second filter member 220, thereby securing the operational stability of the composite filter.

In addition, as illustrated in FIG. 5, in the composite filter 100 according to an exemplary embodiment of the present invention, a fifth O-ring 305 is provided between the side surface of the case member 112 and the third upper cap member 260 to prevent the first purified water (C1) moving along the first purified flow path (PC1) from moving upward of the third upper cap member 260. Accordingly, the first purified water (C1) is stably moved upward through the first purified water flow path (PC1) and does not directly move upward of the third upper cap member 260, but is introduced into the second filter member 220, thereby securing the operational stability of the composite filter.

Figure 6:
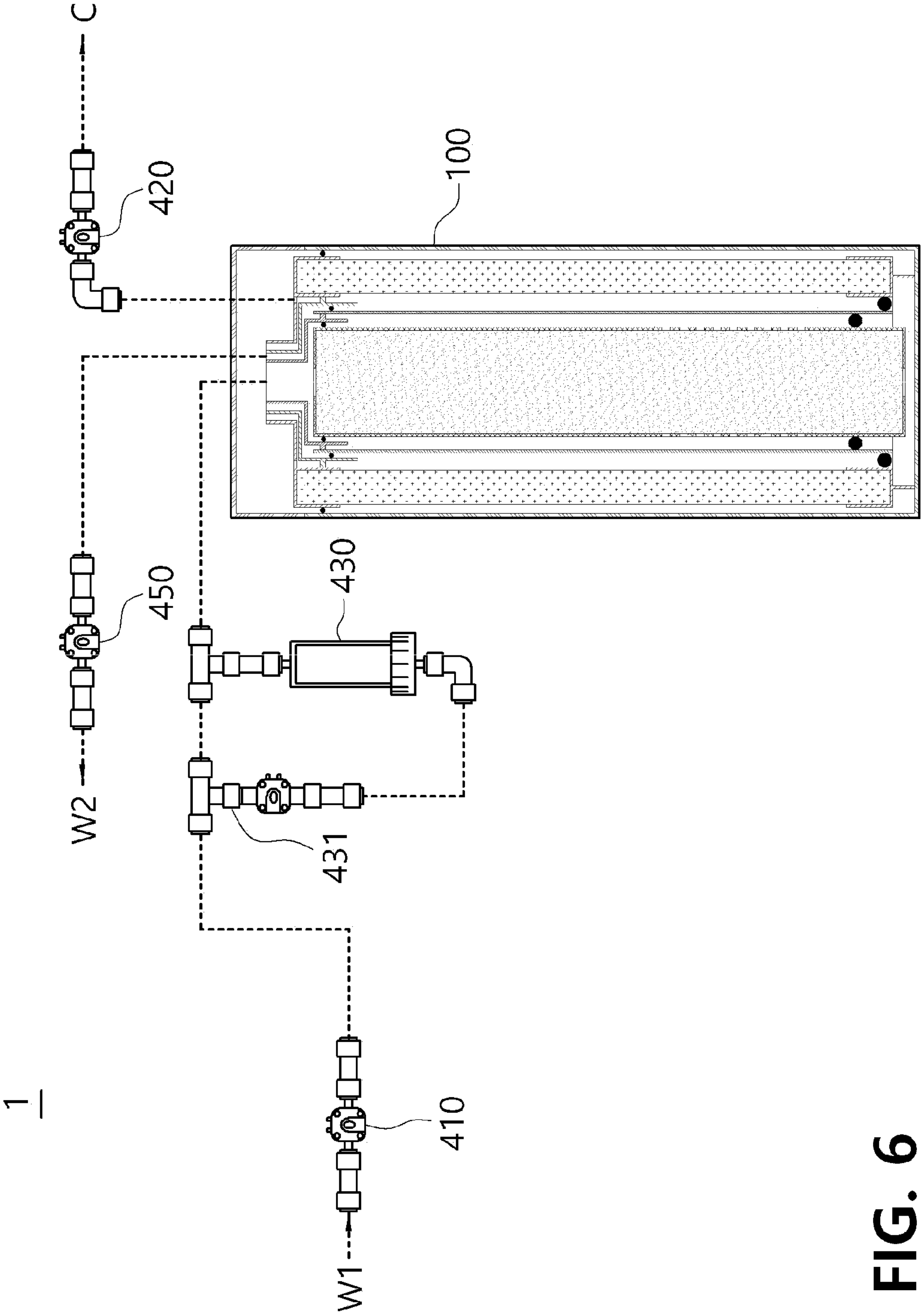
FIG. 6 is a configuration diagram schematically showing a water purifier according to an exemplary embodiment of the present invention.

FIG. 6 is a configuration diagram schematically showing a water purifier according to an exemplary embodiment of the present invention.

As illustrated in FIG. 6, the water purifier 1 according to an exemplary embodiment of the present invention includes a raw water supply unit 410 which controls the supply of raw water (W1); a composite water 100 for receiving the raw water (W1) from the raw water supply unit 410 and filtering; a purified water discharge unit 420 which controls the discharge of purified water (C) filtered by the composite filter 100; and a washing module 430 which is provided between the raw water supply unit 410 and the composite filter 100, and controls the supply of washing water (W2) to the composite filter 100, wherein the raw water (W1) and the washing water (W2) are selectively supplied to the composite filter 100.

In this case, since the raw water supply unit 410 controls the supply of the raw water (W1), the raw water (W1) is prevented from being excessively supplied to the composite filter 100, and the composite filter 100 is prevented from being damaged by the raw water (W1), and the raw water (W1) is prevented from being under-supplied to the composite filter 100 such that the flow of the raw water (W1) is prevented from being lowered inside the composite filter 100, thereby securing the operational stability of the water purifier. In addition, since the purified water discharging unit 420 controls the discharge of the purified water (C), it extracts purified water to meet the user's needs, thereby improving user satisfaction.

In addition, as illustrated in FIG. 6, in the water purifier 1 according to an exemplary embodiment of the present invention, the composite filter 100 is the above-described composite filter. However, the composite filter 100 is not limited to the above-described composite filter, and a structure in which the input of raw water, the output of purified water and the discharge of washing water are independently performed may also be applied.

In addition, as illustrated in FIG. 6, in the water purifier 1 according to an exemplary embodiment of the present invention, the washing module 430 includes a washing water control valve 431 for controlling the supply of the washing water (W2) by using the raw water of the raw water supply unit 410. The washing water control valve 431 controls to supply the raw water (W1) to the composite filter 100 or to supply the raw water (W1) to the washing module 430. That is, the washing water control valve 431 controls the supply of the raw water (W1) to the composite filter 100 and also controls the supply of the raw water (W1) to the washing module 430 to be stopped. Conversely, the washing water control valve 431 controls the supply of the raw water (W1) to the composite filter 100 to be stopped, and also controls the raw water (W1) to be supplied to the washing module 430. In addition, the washing module 430 performs a function of sterilizing the raw water (W1) supplied from the raw water supply unit 410. That is, the washing module 430 may be a sterilization device that sterilizes the raw water (W1). For example, the washing module 430 may sterilize the raw water (W1) or add a sterilizing agent by using ultrasonic waves or plasma, and additionally, it may sterilize the raw water (W1) such that various methods for washing the composite filter 100 may be applied thereto. The washing water (W2) of the washing module 430 is moved to the composite filter 100 to wash the composite filter 100 and then discharged to the outside through a washing water discharge valve 450.

In addition, with reference to FIG. 6, the process of extracting purified water and the process of washing the composite filter 100 will be described. First of all, in order to extract purified water, the raw water supply unit 410 opens a flow path of the raw water (W1) such that the raw water (W1) is supplied to the composite filter 100. In this case, the washing water control valve 431 opens the flow path of the raw water (W1) to control the raw water (W1) to be moved to the composite filter 100, and the flow path through which the raw water (W1) is moved to the washing module 430 is closed. In addition, as the raw water (W1) passes through the composite filter 100, the composite filter 100 produces the purified water (C). Then, the purified water (C) is extracted to the outside through the purified water discharge unit 420. In this case, the washing water discharge valve 450 closes the flow path of the washing water (W2) to secure the stability of the operation of purified water extraction.

Next, in order to wash the composite filter 100, the raw water supply unit 410 opens a flow path of the raw water (W1) such that the raw water (W1) is supplied to the washing module 430. In this case, the washing water control valve 431 opens the flow path of the washing water (W2) to control the movement of the raw water (W1) to the washing module 430, and the flow path through which the raw water (W1) is moved to the composite filter 100 is closed. In addition, the washing module 430 supplies the washing water (W2) to the composite filter 100. As the washing water (W2) passes through the composite filter 100, the composite filter 100 is washed by the washing water (W2). In addition, the washing water (W2) is discharged to the outside through the washing water discharge valve 450. In this case, the purified water discharge unit 420 closes a flow path of the purified water (C) to secure the operational stability for washing the composite filter 100.

Figure 7:
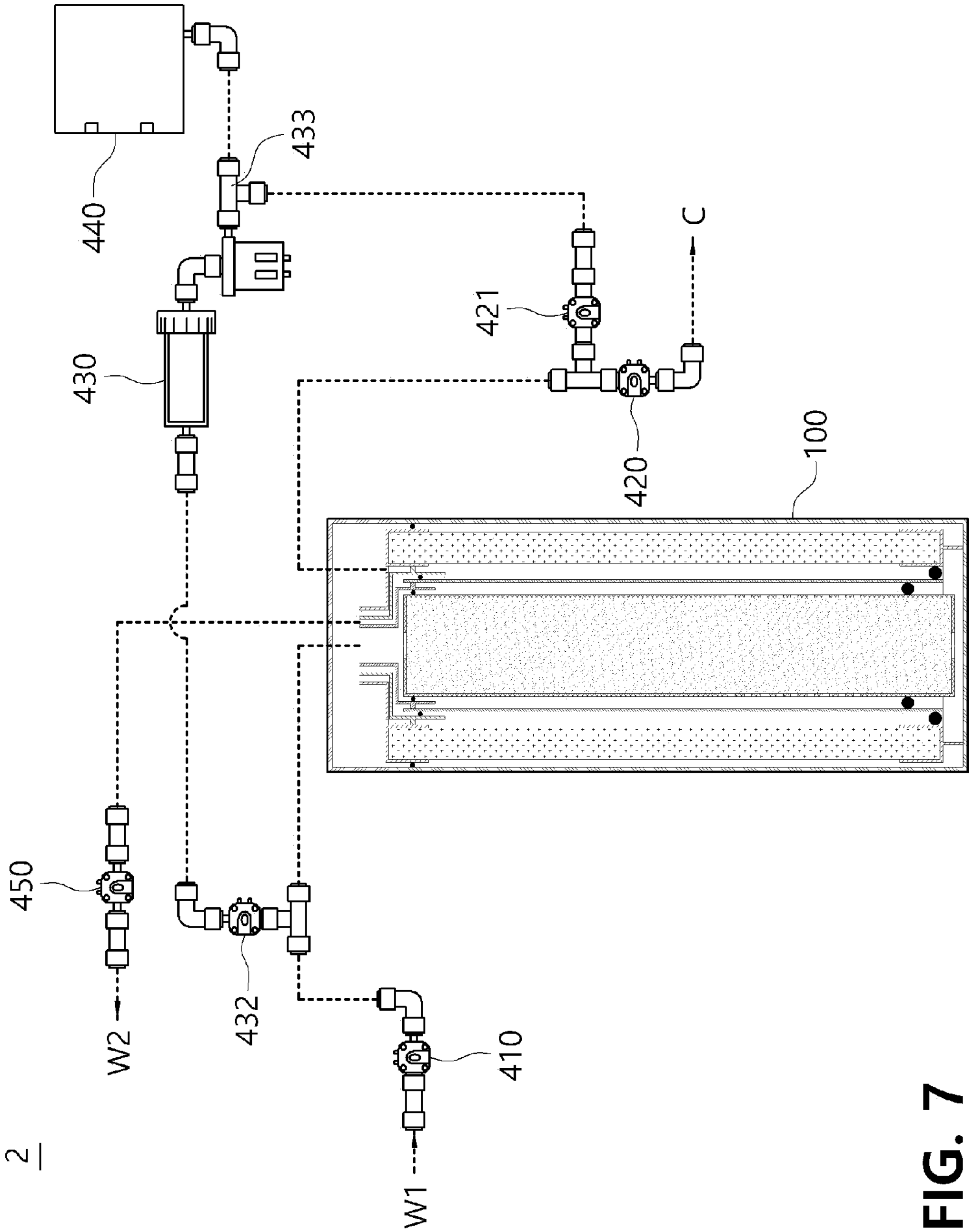
FIG. 7 is a configuration diagram schematically showing a water purifier according to another exemplary embodiment of the present invention.

FIG. 7 is a configuration diagram schematically showing a water purifier according to another exemplary embodiment of the present invention.

As illustrated in FIG. 7, the water purifier 2 according to another exemplary embodiment of the present invention includes a raw water supply unit 410, a composite filter 100, a purified water discharge unit 420, a purified water storage tank 440 and a washing module 430, and the descriptions of components that are identical or similar to those of the above-described exemplary embodiment are replaced with the foregoing descriptions, and it will be described by focusing on the purified water storage tank 440 and the washing module 430. The purified water storage tank 440 is connected to the purified water discharge unit 420. The purified water discharge unit 420 includes a first control valve 421 that controls the purified water (C) filtered by the composite filter 100 to be supplied to the purified water storage tank 440. In addition, the purified water (C) is extracted to the outside by the control of the purified water discharge unit 420 or moved to the purified water storage tank 440 by the control of the first control valve 421.

In addition, as illustrated in FIG. 7, in the water purifier 2 according to another exemplary embodiment of the present invention, the washing module 430 includes a washing water control valve 433 that controls the supply of the washing water (W2) by using purified water supplied from the purified water storage tank 440. When the washing water control valve 433 opens a flow path through which the purified water (C) is moved, the purified water (C) is moved to the washing module 430 and used as the washing water (W2). In this case, a second control valve 432 is provided in the flow path through which the raw water (W1) is moved. The washing water (W2) that has passed through the washing module 430 is moved to the second control valve 432 disposed in the flow path through which the raw water (W1) is moved. The second control valve 432 controls the washing water (W2) to be supplied to the composite filter 100 while stopping the supply of the raw water (W1), and conversely, it controls such that the raw water (W1) is supplied to the composite filter 100, and the supply of the washing water (W2) may be stopped.

In addition, with reference to FIG. 7, the process of extracting purified water and the process of washing the composite filter 100 will be described. First of all, in order to extract purified water, the raw water supply unit 410 opens a flow path of the raw water (W1) such that the raw water (W1) is supplied to the composite filter 100. In this case, the second control valve 432 opens the flow path of the raw water (W1) to control the raw water (W1) to be moved to the composite filter 100, and the flow path through which the washing water (W2) is moved to the composite filter 100 is closed. In addition, as the raw water (W1) passes through the composite filter 100, the composite filter 100 produces the purified water (C). In addition, the purified water (C) is extracted to the outside or moved to the purified water storage tank 440 according to the control of the purified water discharge unit 420. In this case, the washing water control valve 433 and the washing water discharge valve 450 close the flow path of the washing water (W2) to secure the stability of the operation of purified water extraction.

Next, in order to wash the composite filter 100, the washing water control valve 433 controls the purified water (C) to be moved to the washing module 430 by opening a flow path of the washing water (W2). In addition, the washing module 430 supplies the washing water (W2) to the second control valve 432. In this case, the second control valve 432 closes the flow path of the raw water (W1) and opens the flow path through which the washing water (W2) is moved to the composite filter 100. As the washing water (W2) passes through the composite filter 100, the composite filter 100 is washed by the washing water (W2). In addition, the washing water (W2) is discharged to the outside through the washing water discharge valve 450. In this case, the purified water discharge unit 420 closes the flow path of the purified water (C) to secure the operational stability for washing the composite filter 100.

Figure 8:
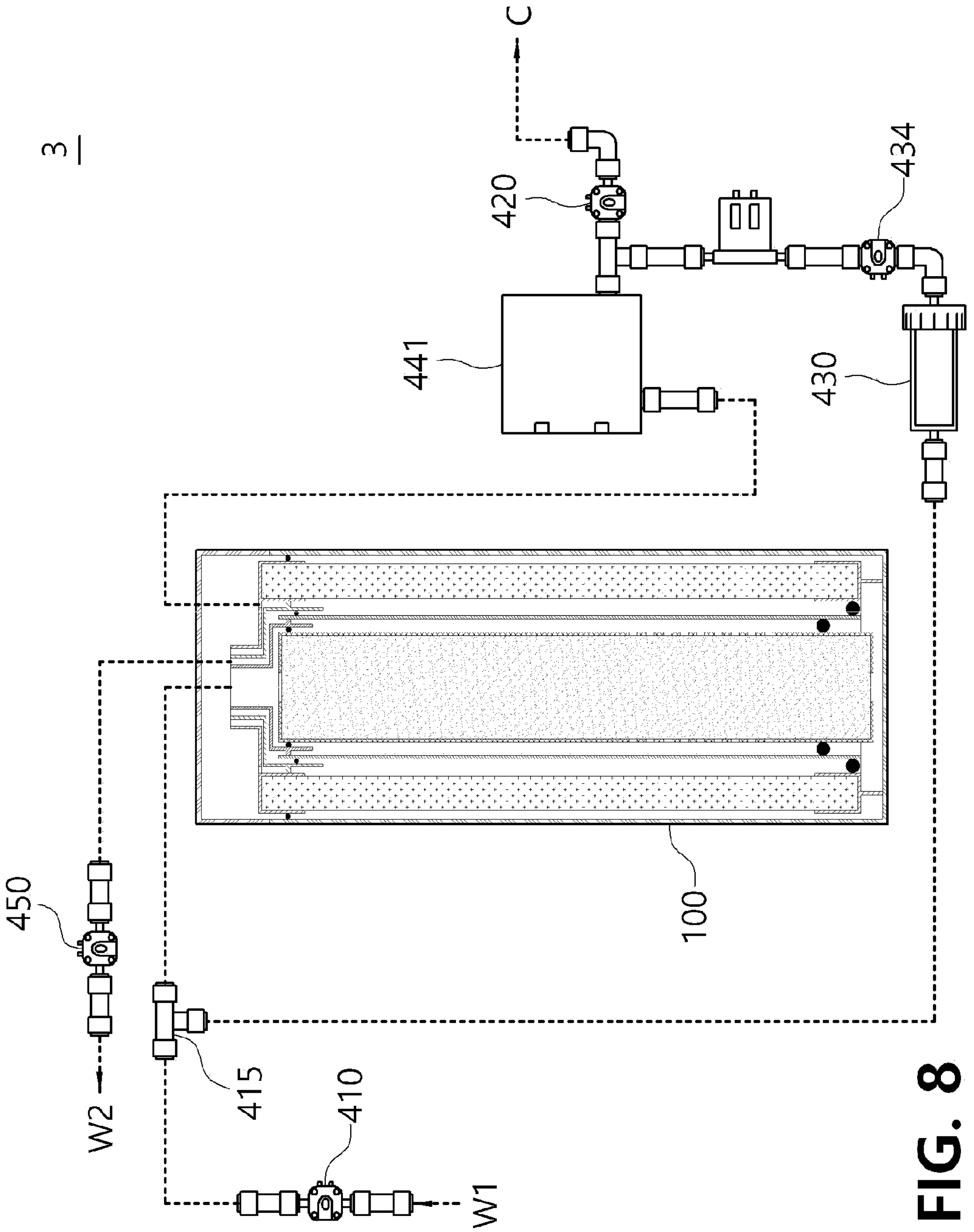
FIG. 8 is a configuration diagram schematically showing a water purifier according to still another exemplary embodiment of the present invention.

FIG. 8 is a configuration diagram schematically showing a water purifier according to still another exemplary embodiment of the present invention.

As illustrated in FIG. 8, the water purifier 3 according to still another exemplary embodiment of the present invention includes a raw water supply unit 410, a composite filter 100, a purified water discharge unit 420, a purified water storage tank 441 and a washing module 430, and the descriptions of components that are identical or similar to those of the above-described exemplary embodiment will be replaced with the foregoing descriptions, and it will be described by focusing on the purified water storage tank 441 and the washing module 430. The purified water storage tank 441 is disposed between the composite filter 100 and the purified water discharge unit 420 to be connected to the purified water discharge unit 420. The purified water (C) filtered by the composite filter 100 is supplied to the purified water storage tank 441. Then, the purified water (C) is extracted to the outside by the control of the purified water discharge unit 420.

In addition, as illustrated in FIG. 8, in the water purifier 3 according to still another exemplary embodiment of the present invention, the washing module 430 includes a washing water control valve 434 that controls the supply of the washing water (W2) by using purified water supplied from the purified water storage tank 441. When the washing water control valve 434 opens a flow path through which the purified water (C) is moved, the purified water (C) is moved to the washing module 430 and used as the washing water (W2). In this case, a control valve 415 is provided in the flow path through which the raw water (W1) is moved. The washing water (W2) that has passed through the washing module 430 is moved to the control valve 415 disposed in the flow path through which the raw water (W1) is moved. The control valve 415 controls the washing water (W2) to be supplied to the composite filter 100 while stopping the supply of the raw water (W1), and conversely, it controls such that the raw water (W1) is supplied to the composite filter 100, and the supply of the washing water (W2) may be stopped.

In addition, with reference to FIG. 8, the process of extracting purified water and the process of washing the composite filter 100 will be described. First of all, in order to extract purified water, the raw water supply unit 410 opens a flow path of the raw water (W1) such that the raw water (W1) is supplied to the composite filter 100. In this case, the control valve 415 controls the raw water (W1) to be moved to the composite filter 100 by opening the flow path of the raw water (W1), and the flow path through which the washing water (W2) is moved to the composite filter 100 is closed. In addition, as the raw water (W1) passes through the composite filter 100, the composite filter 100 produces the purified water (C). After the purified water (C) is stored in the purified water storage tank 441, it is extracted to the outside according to the control of the purified water discharge unit 420. In this case, the washing water control valve 434 and the washing water discharge valve 450 close the flow path of the washing water (W2) to secure the stability of the operation of purified water extraction.

Next, in order to wash the composite filter 100, the purified water discharge unit 420 closes the flow path of purified water (C) such that the purified water (C) is not discharged to the outside. In this case, the washing water control valve 434 controls the purified water (C) to be moved to the washing module 430 by opening the flow path of the washing water (W2). In addition, the washing module 430 supplies the washing water (W2) to the control valve 415. In this case, the control valve 415 closes the flow path of the raw water (W1) and opens a flow path through which the washing water (W2) is moved to the composite filter 100. As the washing water (W2) passes through the composite filter 100, the composite filter 100 is washed by the washing water (W2). In addition, the washing water (W2) is discharged to the outside through the washing water discharge valve 450. In this way, as the purified water (C) is used as the washing water (W2), the washing efficiency of the composite filter 100 is improved.

Figure 9:
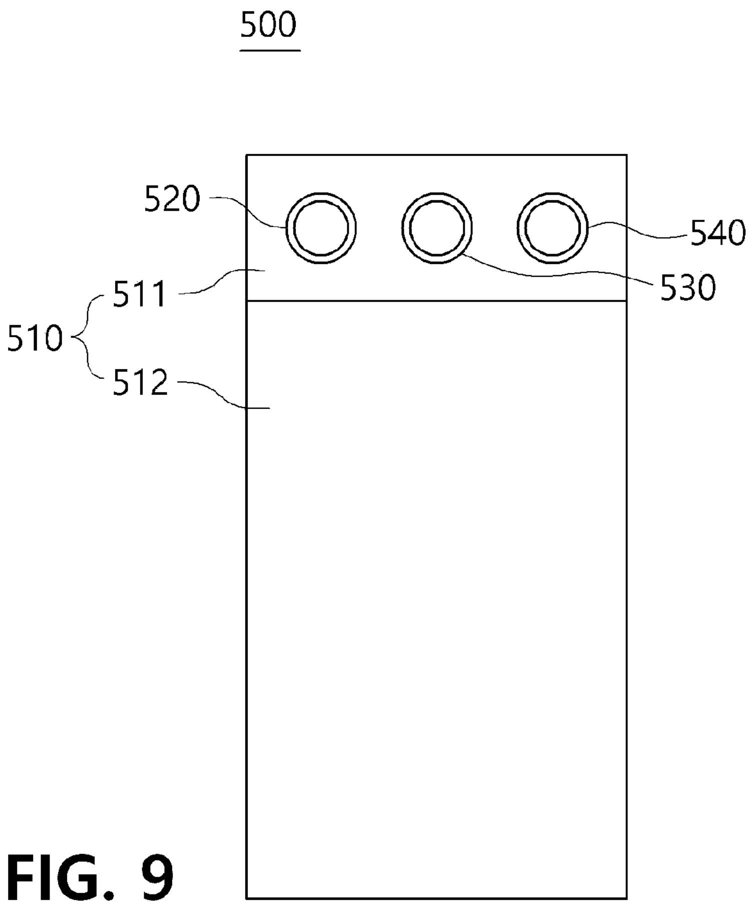
FIG. 9 is a diagram schematically showing the appearance of a composite filter according to another exemplary embodiment of the present invention.
Figure 10:
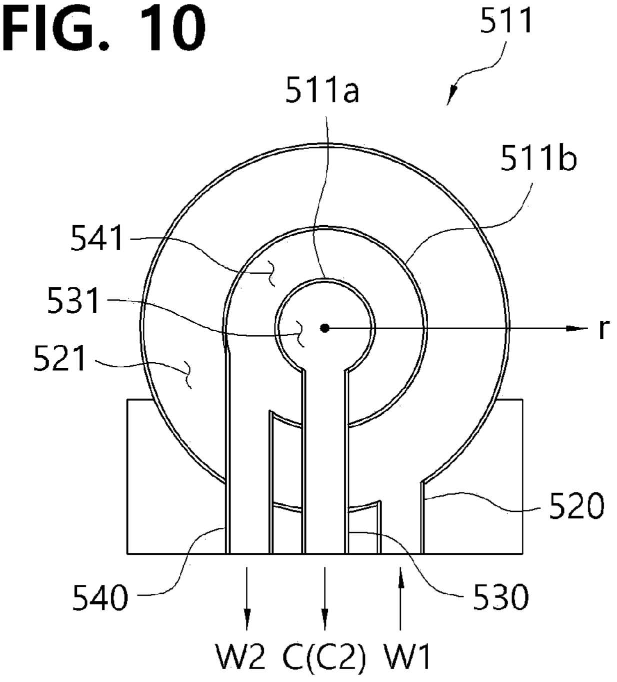
FIG. 10 is a plan view showing the head member of a composite filter according to another exemplary embodiment of the present invention.
Figure 11:
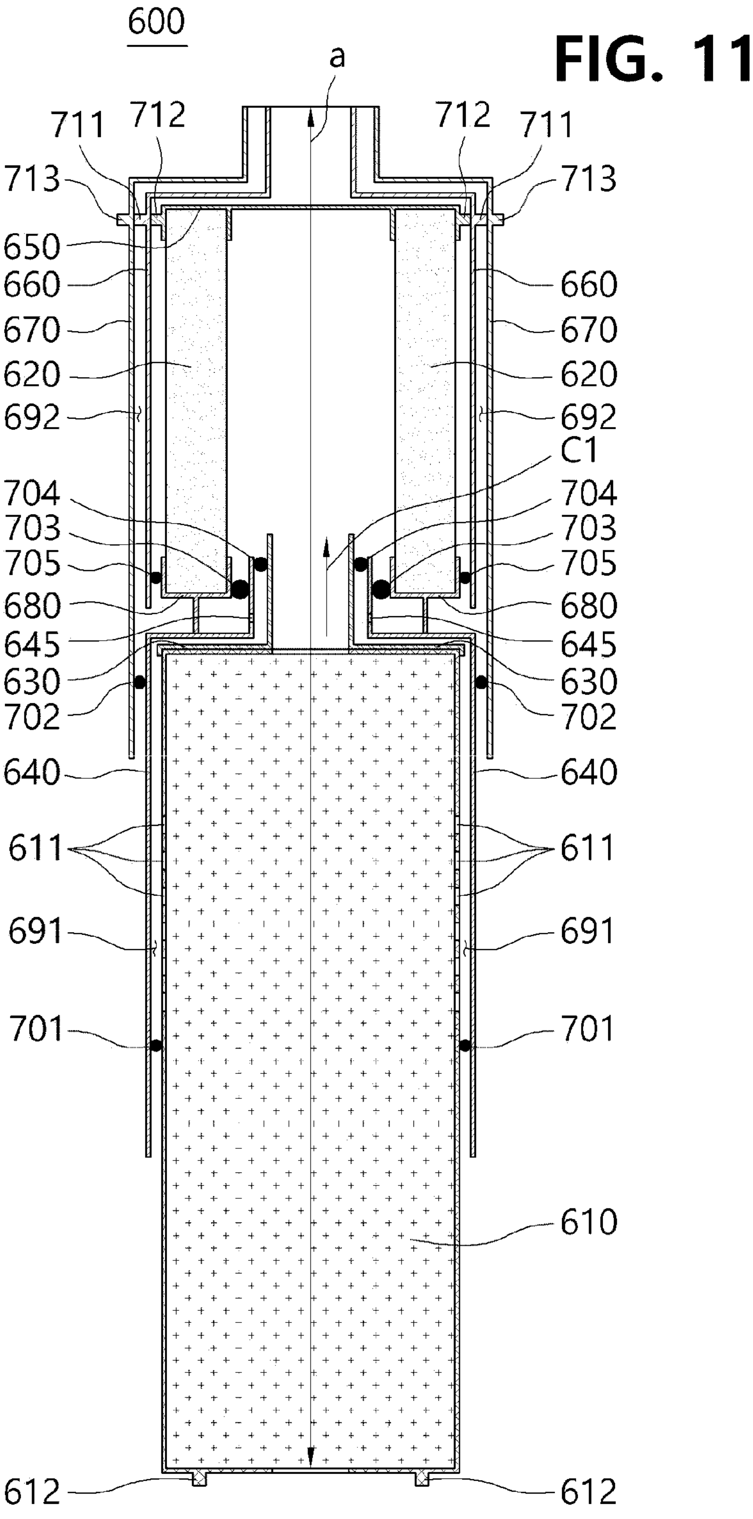
FIG. 11 is a cross-sectional view showing the assembled state of the filtering unit of a composite filter according to another exemplary embodiment of the present invention.

As illustrated in FIGS. 9 to 11, another composite filter 500 of the present invention includes a housing part 510 which is provided with a raw water inlet port 520 through which raw water (W1) is introduced, a purified water outlet port 530 through which filtered purified water (C) is discharged, and a washing water discharge port 540 through which washing water (W2) is discharged; and a filtering unit 600 which is provided with a first filter member 610 that filters the raw water (W1) to produce first purified water (C1), and a second filter member 620 that filters the first purified water (C1) to produce second purified water (C2) and is stacked above the first filter member 610. That is, after the raw water (W1) introduced through the raw water inlet port 520 moves to the filtering unit 600, it is filtered by sequentially moving through the first filter member 610 and the second filter member 610 that are provided in the filtering unit 600, and finally filtered purified water (C) is discharged through the purified water outlet port 530 and then provided to the user. In addition, the purified water (C) may be stored in a separate purified water tank (not illustrated), or may be supplied to a cold water generator (not illustrated), a hot water generator (not illustrated) and an ice generator (not illustrated) for generating cold water, hot water and ice, respectively. In addition, after the first purified water (C1) moves to the upper side of the first filter member 610, it moves to the second filter member 620, and after washing the first filter member 610, the washing water (W2) moves to a first discharge passage 691 which is formed between the first filter member 610 and the fifth upper cap member 670 to be discharged to the outside of the composite filter 500 through the washing water discharge port 540. In this way, since it is configured such that the discharge of the washing water (W2) as well as the input of the raw water (W1) and the output of the purified water (C) are possible, the first filter member 610 and the second filter member 620 are integrated to configure a composite filter, thereby enhancing user convenience. In addition, by washing the first filter member 610 using the washing water (W2), the product lifespan of the composite filter 500 is increased, thereby enhancing user convenience. In this case, the first filter member 610 may be an ultra-filtration (UF) filter that filters out contaminants by a hollow fiber membrane. In addition, the second filter member 620 may be a carbon filter or a microfiltration (MF) filter. In addition, the second filter member 620 may include an electrodeionization-type filter. The electric deionization method refers to EDI (Electro Deionization), CEDI (Continuous Electro Deionization), CDI (Capacitive Deionization) or the like. In this case, a separate filter member may be provided on the outer surface of the second filter member 620. As an example, this separate filter member may be an NT filter element. Such an NT filter member may be made of a material that is charged with static electricity to adsorb foreign substances included in the introduced raw water (W1), for example, a nano-trap material. This electrostatic material may be configured to carry a positive charge. Accordingly, negatively charged foreign substances included in the raw water (W1), such as viruses, bacteria and fine particles, may be adsorbed to the NT filter member by static electricity. In addition, this separate filter member may be a sediment filter member.

As illustrated in FIG. 10, in the composite filter according to another exemplary embodiment of the present invention, the housing part 510 includes a head member 511 which is provided with a first partition wall 511*a* that prevents the second purified water (C2) and the washing water (W2) from mixing, and a second partition wall 511*b* that prevents the raw water (W1) and the washing water (W2) from mixing; and a case member 512 which extends from the head member 511 and has the filtering unit 600 disposed therein. That is, it is a structure in which not only the incoming raw water (W1) but also the output second purified water (C2) and the discharged washing water (W2) are output/discharged to the upper part of the composite filter 500, and to this end, the head member 511 is formed with a raw water area 521 through which the raw water (W1) is introduced, a second purified water area 531 through which the second purified water (C2) is discharged, and a washing water area 541 through which the washing water (W2) is discharged. To this end, since the first and second partition walls 511*a*, 511*b* are provided in the head member 511 of the housing part 510 such that independent passages in which the raw water (W1), the second purified water (C2) and the washing water (W2) are not mixed are formed, water outlet/discharge are concentrated on the upper part of the composite filter 500, and the layout design freedom of other parts is improved. Herein, the washing water (W2) flowing into the first filter member 610 washes the first filter member 610 by using the raw water (W1). However, the washing water (W2) is not limited to using only the raw water (W1), and output purified water may be used.

As illustrated in FIG. 11, the filtering unit 600 includes a first upper cap member 630 wherein the first filter member 610 is disposed below; a second upper cap member 640 wherein the first upper cap member 630 is disposed below; a third upper cap member 650 wherein the second filter member 620 is disposed below; a fourth upper cap member 660 wherein the third upper cap member 650 is disposed below; and a fifth upper cap member 670 wherein the fourth upper cap member 660 is disposed below. In this case, after the raw water (W1) is moved through the outside of the fifth upper cap member 670, it flows into the first filter member 610 from the lower side of the first filter member 610, and the washing water (W2) is moved upward through a gap between the fourth upper cap member 660 and the fifth upper cap member 670 through a gap between the first filter member 610 and the second upper cap member 640, and as the purified water (C) is moved upward through a gap between the second filter member 620 and the fourth upper cap member 660, independent flow paths in which the raw water (W1), the washing water (W2) and the purified water (C) do not mix with each other are formed such that the first filter member 610 and the second filter member 620 are integrated, thereby enhancing manufacturability.

As illustrated in FIG. 11, a plurality of discharge holes 611 that are disposed to be spaced apart from each other are provided on a side surface of the first filter member 610. In this case, the plurality of discharge holes 611 have the same size. However, the size of the plurality of discharge holes 611 is not limited to the same size, and it may increase or decrease in the downward direction. In addition, the plurality of discharge holes 611 are disposed to be spaced apart from each other at equal intervals. However, the plurality of discharge holes 611 are not limited to being disposed to be spaced apart from each other at equal intervals, and they may be disposed to be spaced apart from each other in the downward direction. In addition, a first discharge passage 691 through which the washing water (W2) flows is provided between the first filter member 610 and the fourth upper cap member 660. In this case, the plurality of discharge holes 611 communicate with the first discharge passage 691. In addition, the washing water (W2) that has washed the first filter member 610 is moved to the first discharge passage 691 through the plurality of discharge holes 611.

In addition, a second discharge passage 692 communicating with the first discharge passage 691 is provided between the fourth upper cap member 660 and the fifth upper cap member 670. In this case, the second discharge passage 692 communicates with the washing water discharge port 540 (refer to FIG. 10). Through this, the washing water (W2) that has washed the first filter member 610 is discharged to the outside of the composite filter 500 by sequentially passing through the plurality of discharge holes 611, the first discharge passage 691, the second discharge passage 692 and the washing water discharge port 540. In this way, the composite filter 500 according to another exemplary embodiment of the present invention is manufactured by integrating the first filter member 610 and the second filter member 620, and since the washing water (W2) is discharged without being mixed with the purified water (C), the operation reliability of the composite filter 500 is improved.

Figure 12:
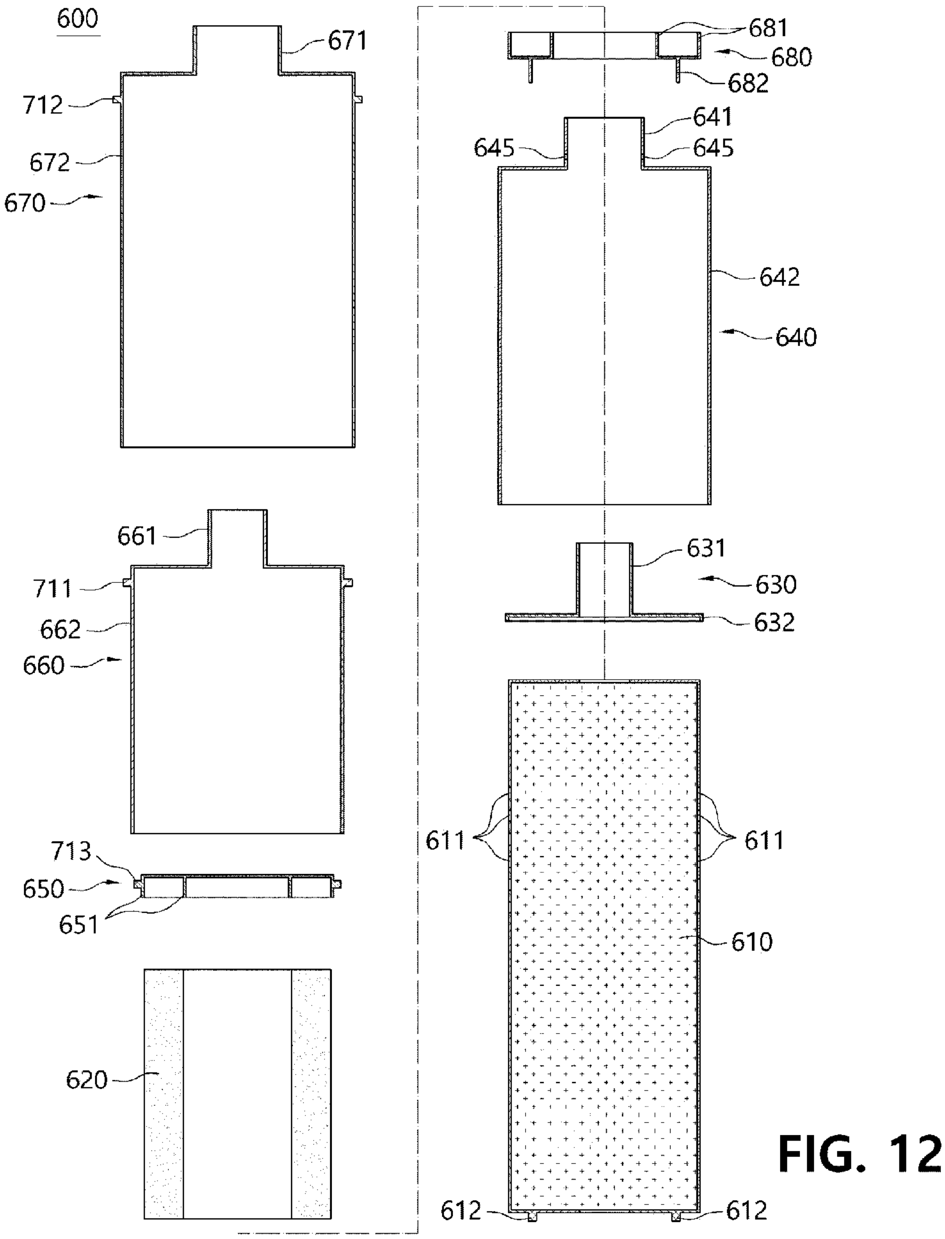
FIG. 12 is a cross-sectional view showing the separated state of the filtering unit of a composite filter according to another exemplary embodiment of the present invention.

FIG. 12 is a cross-sectional view showing the separated state of the filtering unit of a composite filter according to another exemplary embodiment of the present invention.

As illustrated in FIGS. 11 and 12, in the filtering unit 600 of the composite filter according to another exemplary embodiment of the present invention, the first filter member 610 is positioned below the first upper cap member 630, the first upper cap member 630 is positioned below the second upper cap member 640, the second filter member 620 is positioned below the third upper cap member 650, the third upper cap member 650 is positioned below the fourth upper cap member 660, and the fourth upper cap member 660 is positioned below the fifth upper cap member 670. In this way, since the first to fifth upper cap members 630, 640, 650, 660, 670 are assembled to have a stacked structure of the first filter member 610 and the second filter member 620, the manufacturability of the composite filter 500 is improved.

As illustrated in FIGS. 11 and 12, in the filtering unit 600 of the composite filter according to another exemplary embodiment of the present invention, the first upper cap member 630 includes a first upward guide 631 which is disposed to extend upward such that the first purified water (C1) that has passed through the first filter member 610 flows into the second filter member 620. That is, as the first upper cap member 630 is provided with the first upward guide 631 through which the first purified water (C1) flows, even when the first filter member 610 and the second filter member 620 are made of a stacked structure, the first purified water (C1) is smoothly moved upward toward the second filter member 620, thereby securing the operation reliability of the composite filter 500. In addition, the first upper cap member 630 includes a first downward guide 632 which is disposed to extend downward. While the first downward guide 632 is formed to surround the upper part of the first filter member 610, it is combined with the first filter member 610 such that the first upper cap member 630 is stably coupled to the upper part of the first filter member 610 by the first downward guide 632.

In addition, as illustrated in FIGS. 11 and 12, in the filtering unit 600 of the composite filter according to another exemplary embodiment of the present invention, the second upper cap member 640 includes a second upward guide 641 which is disposed to extend upward such that the washing water (W2) that has passed through the first filter member 610 is moved to the second discharge passage 692. In addition, while surrounding the first upward guide 631, the second upward guide 641 is formed to be disposed to be spaced apart. That is, the washing water (W2) is moved between the first upward guide 631 and the second upward guide 641 and is prevented from mixing with the washing water (W2) and the first purified water (C1), thereby securing the operational reliability of the composite filter 500. In addition, the second upper cap member 640 includes a second downward guide 642 which is disposed to extend downward. In addition, while surrounding the first filter member 610, the second downward guide 642 is formed to be disposed to be spaced apart. That is, the first discharge passage 691 through which the washing water (W2) that has washed the first filter member 610 moves is provided between the second downward guide 642 and the first filter member 610. In addition, a hole 645 through which the washing water (W2) is moved is formed in the second upper cap member 640. Accordingly, the washing water (W2) that has passed through the first discharge passage 691 is moved to the second discharge passage 692 through the hole 645. In this way, since the filtering unit 600 is provided with independent flow paths such that the washing water (W2) is not mixed with the raw water (W1) or the purified water (C), the quality of the purified water (C) is secured, thereby improving user satisfaction.

In addition, as illustrated in FIGS. 11 and 12, in the filtering unit 600 of the composite filter according to another exemplary embodiment of the present invention, the third upper cap member 650 includes an upper cap guide which is disposed to extend downward so as to be coupled to the second filter member 620. In addition, the upper cap guide 651 is formed to surround the upper part of the second filter member 620 such that the third upper cap member 650 is stably fixed to the second filter member 620 by the upper cap guide 651.

In addition, as illustrated in FIGS. 11 and 12, in the filtering unit 600 of the composite filter according to another exemplary embodiment of the present invention, the fourth upper cap member 660 includes a fourth upward guide 661 which is disposed to extend upward. In addition, the second purified water (C2) that has passed through the second filter member 620 is moved upward through the fourth upward guide 661 such that the discharge of the washing water (W2) and the output of the purified water (C) are separated, thereby securing the operational reliability of the composite filter 500. In addition, the first partition wall 511*a* (refer to FIG. 10) is disposed to extend in the axial direction along the fourth upward guide 661. That is, the purified water (C) is output to the outside of the composite filter 500 through the first partition wall 511*a* (refer to FIG. 10) and the fourth upward guide 661. In addition, the fourth upper cap member 660 includes a fourth downward guide 662 which is disposed to extend downward. While surrounding the side surface of the second filter member 620, the fourth downward guide 662 is disposed to be spaced apart. In addition, the second purified water (C2) that has passed through the second filter member 620 is moved upward between the fourth downward guide 662 and the second filter member 620, and the washing water (W2) is moved along the outside of the fourth downward guide 662 to prevent mixing of the second purified water (C2) and the washing water (W2), thereby stably securing the quality of the purified water.

In addition, as illustrated in FIGS. 11 and 12, in the filtering unit 600 of the composite filter according to another exemplary embodiment of the present invention, the fifth upper cap member 670 includes a fifth upward guide 671 which is disposed to extend upward. In addition, the washing water (W2) is moved upward through the fifth upward guide 671 such that the discharge of the washing water (W2) and the inflow of the raw water (W1) are separated, thereby securing the operation reliability of the composite filter 500. In addition, the second partition wall 511*b* (refer to FIG. 10) is disposed to extend in the axial direction along the fifth upward guide 671. That is, after moving upward along the fifth upward guide 671, the washing water (W2) is smoothly moved to the washing water discharge port 540 through the second partition wall 511*b* (refer to FIG. 10). In addition, the fifth upper cap member 670 includes a fifth downward guide 672 which is disposed to extend downward. While surrounding the side surface of the fourth downward guide 662, the fifth downward guide 672 is disposed to be spaced apart. That is, the second discharge passage 692 through which the washing water (W2) moves upward is formed between the fourth downward guide 662 and the fifth downward guide 672. After the washing water (W2) sequentially passes through the first filter member 610, the first discharge passage 691 and the hole 645, it is moved to the inside of the fifth upper guide 671 through the second discharge passage 692. In addition, the raw water (W1) is moved along the outside of the fifth downward guide 672 such that the fifth downward guide 672 prevents the raw water (W1) and the washing water (W2) from being mixed, thereby securing the operational stability of the composite filter 500.

As illustrated in FIGS. 11 and 12, the filtering unit 600 of the composite filter according to another exemplary embodiment of the present invention further includes a lower cap member 680 which is coupled to a lower side of the second filter member 620. In addition, the lower cap member 680 includes a lower cap guide 681 which is disposed to extend upward so as to be coupled to the second filter member 620. As the lower cap guide 681 contacts the lower outer peripheral surface of the second filter member 620, the lower cap guide 681 stably fixes the second filter member 620, thereby improving the durability of the composite filter 500. Accordingly, since the lower cap member 680 stably fixes the second filter member 620 together with the third upper cap member 650, it enables the modularization of a composite filter through a sub-assembly process, thereby enhancing workability.

In addition, as illustrated in FIGS. 11 and 12, in the filtering unit 600 of the composite filter according to another exemplary embodiment of the present invention, a first O-ring 701 is formed between the second upper cap member 640 and the first filter member 610 to prevent the washing water (W2) from being re-introduced into the first filter member 610. The first O-ring 701 is made of a rubber or silicone material. However, the first O-ring 701 is not limited to being made of a rubber or silicone material, and it may be made of various materials having elasticity. The first O-ring 701 seals a gap between the first filter member 610 and the second upper cap member 640 such that the washing water (W2) moving through the first discharge passage 691 is prevented from being re-introduced into the first filter member 610.

In addition, as illustrated in FIGS. 11 and 12, in the filtering unit 600 of the composite filter according to another exemplary embodiment of the present invention, a second O-ring 702 is formed between the second upper cap member 640 and the fifth upper cap member 670 to prevent the washing water (W2) from being re-introduced into the first filter member 610. The second O-ring 702 is made of a rubber or silicone material. However, the second O-ring 702 is not limited to being made of a rubber or silicone material, and it may be made of various materials having elasticity. In addition, the second O-ring 702 seals a gap between the second upper cap member 640 and the fifth upper cap member 670 to prevent the washing water (W2) from mixing with the raw water (W1).

In addition, as illustrated in FIGS. 11 and 12, in the filtering unit 600 of the composite filter according to another exemplary embodiment of the present invention, a third O-ring 703 is formed between the second upper cap member 640 and the lower cap member 680 to prevent the second purified water (C2) from moving to the second discharge passage 692. The third O-ring 703 is made of a rubber or silicone material. However, the third O-ring 703 is not limited to being made of a rubber or silicone material, and it may be made of various materials having elasticity. In addition, the third O-ring 703 seals a gap between the second upper cap member 640 and the lower cap member 680 to prevent the second purified water (C2) from mixing with the washing water (W2).

In addition, as illustrated in FIGS. 11 and 12, in the filtering unit 600 of the composite filter according to another exemplary embodiment of the present invention, a fourth O-ring 704 is formed between the first upper cap member 630 and the second upper cap member 640 to prevent the second purified water (C2) from moving to the first discharge passage 691. The fourth O-ring 704 is made of a rubber or silicone material. However, the fourth O-ring 704 is not limited to being made of a rubber or silicone material, and it may be made of various materials having elasticity. In addition, the fourth O-ring 704 seals a gap between the first upper cap member 630 and the second upper cap member 640 to prevent the second purified water (C2) of the second filter member 620 from mixing with the washing water (W2).

In addition, as illustrated in FIGS. 11 and 12, in the filtering unit 600 of the composite filter according to another exemplary embodiment of the present invention, a fifth O-ring 705 is formed between the lower cap member 680 and the fourth upper cap member 660 to prevent the second purified water (C2) from moving to the second discharge passage 692. The fifth O-ring 705 is made of a rubber or silicone material. However, the fifth O-ring 705 is not limited to being made of a rubber or silicone material, and it may be made of various materials having elasticity. In addition, the fifth O-ring 705 seals a gap between the lower cap member 680 and the fourth upper cap member 660 to prevent the second purified water (C2) that has passed through the second filter member 620 from mixing with the washing water (W2).

In addition, as illustrated in FIGS. 11 and 12, in the filtering unit 600 of the composite filter according to another exemplary embodiment of the present invention, a first spacer 711 is provided between the fourth upper cap member 660 and the fifth upper cap member 670 to be disposed to be spaced apart from each other at a certain interval. Accordingly, the first spacer 711 prevents the second discharge passage 692 from being blocked. In addition, since the first spacer 711 is made of a material having elastic force such as rubber, the elastic force of the first spacer 711 is provided between the fourth upper cap member 660 and the fifth upper cap member 670 in a direction away from each other, and thus, the fifth upper cap member 670 is stably fixed to the fourth upper cap member 660 by the first spacer 711.

In addition, as illustrated in FIGS. 11 and 12, in the filtering unit 600 of the composite filter according to another exemplary embodiment of the present invention, a second spacer 712 is provided between the fifth upper cap member 670 and the case member 512 (refer to FIG. 13) to be disposed to be spaced apart from each other at a certain interval. Accordingly, the second spacer 712 prevents clogging between the fifth upper cap member 670 and the case member 512 (refer to FIG. 13) such that the raw water (W1) is smoothly moved along the outer side of the fifth upper cap member 670. In addition, since the second spacer 712 is made of a material having elastic force such as rubber, the elastic force of the second spacer 712 is provided between the fifth upper cap member 670 and the case member 512 (refer to FIG. 13) in a direction away from each other, and thus, the fifth upper cap member 670 is stably fixed to the case member 512 (refer to FIG. 13) by the second spacer 712.

In addition, as illustrated in FIGS. 11 and 12, in the filtering unit 600 of the composite filter according to another exemplary embodiment of the present invention, a third spacer 713 is provided between the third upper cap member 650 and the fourth upper cap member 660 to be spaced apart from each other at a certain interval. Accordingly, the third spacer 713 prevents the passage through which the second purified water (C2) is moved from being blocked. In addition, since the third spacer 713 is made of a material having elastic force such as rubber, the elastic force of the third spacer 713 is provided between the third upper cap member 650 and the fourth upper cap member 660 in a direction away from each other, and thus, the fourth upper cap member 660 is stably fixed to the third upper cap member 650 by the third spacer 713.

Figure 13:
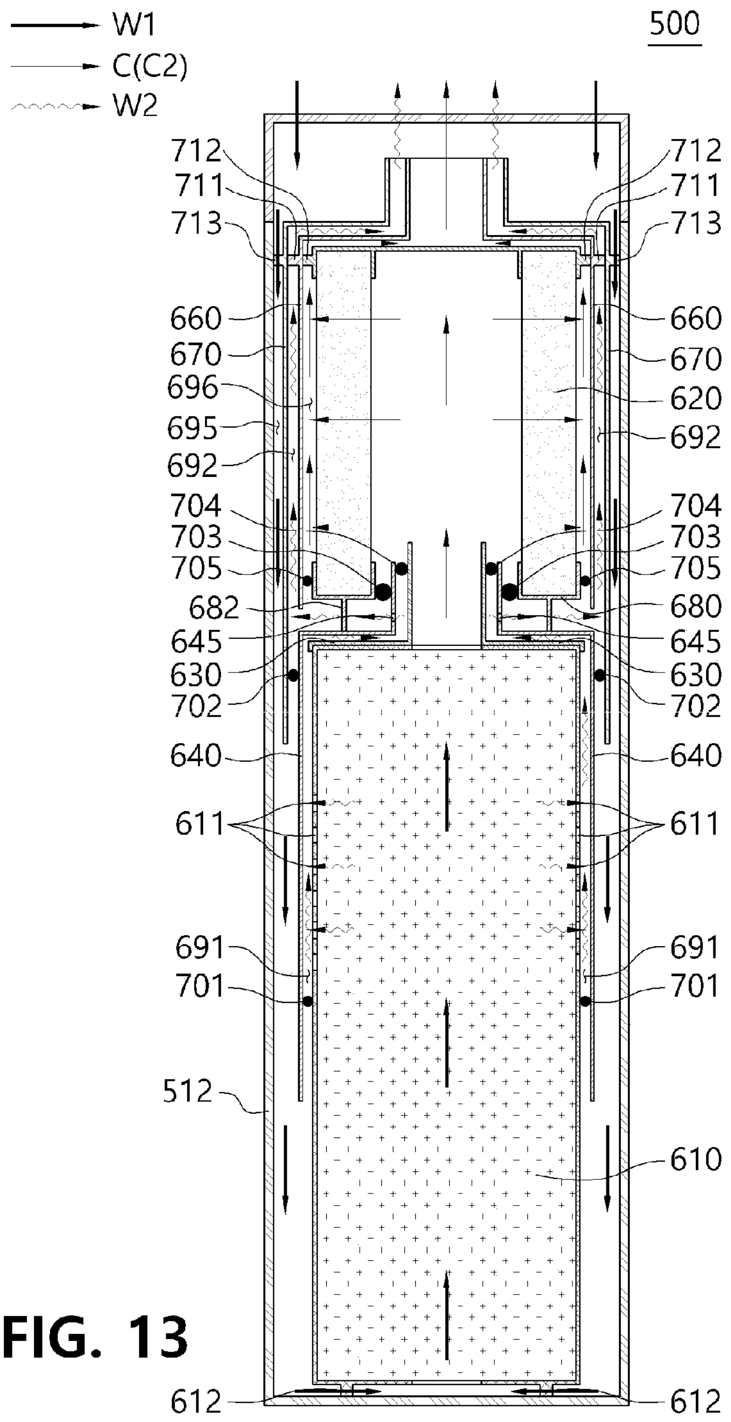
FIG. 13 is a cross-sectional view showing a state in which the filtering unit of the composite filter according to another exemplary embodiment of the present invention is installed in the housing part.

FIG. 13 is a cross-sectional view showing a state in which the filtering unit of the composite filter according to another exemplary embodiment of the present invention is installed in the housing part.

As illustrated in FIG. 13, in the composite filter 500 according to another exemplary embodiment of the present invention, the lower cap member 680 is provided with a lower leg 682 which extends downward toward the second upper cap member 640. The lower leg 682 is formed such that the lower cap member 680 is disposed to be spaced apart from the second upper cap member 640. In addition, since the lower leg 682 and the lower cap member 680 are disposed to be spaced apart from the second upper cap member 640, the washing water (W2) that has passed through the first discharge passage 691 is moved through the upper part of the second upper cap member 640, it moves to the second discharge passage 692, thereby securing the operational stability of the composite filter 500.

In this case, as illustrated in FIG. 13, in the composite filter 500 according to another exemplary embodiment of the present invention, a raw water flow path 695 is formed between the case member 512 and the fourth upper cap member 660. The raw water (W1) introduced through the raw water inlet port 520 (refer to FIG. 10) is moved to the lower part of the first filter member 610 along the raw water flow path 695. In addition, the first filter member 610 is provided with a filter leg 612 which extends downward toward a lower side surface of the case member 512. The filter leg 612 is formed to provide a passage through which the raw water (W1) moves between the first filter member 610 and the lower side surface of the case member 512. In addition, the raw water (W1) passing through the raw water passage 695 is introduced into the first filter member 610 via a gap between the first filter member 610 and the lower side surface of the case member 512.

In addition, as illustrated in FIG. 13, in the composite filter 500 according to another exemplary embodiment of the present invention, the first purified water (C1) that has passed through the first filter member 610 is moved to the inner side of the second filter member 620. In this case, a purified water passage 696 is formed between the second filter member 620 and the fourth upper cap member 660. In addition, after passing through the second filter member 620, the second purified water (C2) moves upward along the purified water passage 696, and then is output to the outside of the composite filter through the purified water outlet port 520 (refer to FIG. 10). In this way, while the composite filter 500 according to another exemplary embodiment of the present invention stacks the first filter member 610 and the second filter member 620 on the case member 512, it is assembled by firth to fifth upper cap members 630, 640, 650, 660, 670 and a lower cap member 680 such that independent flow paths are formed through the upper part to enable the input of the raw water (W1), the output of the purified water (C) and the discharge of the washing water (W2), and thus, the modularization of the composite filter is possible such that there is no need for users to manipulate separate configurations for washing, thereby improving user convenience.

Figure 14:
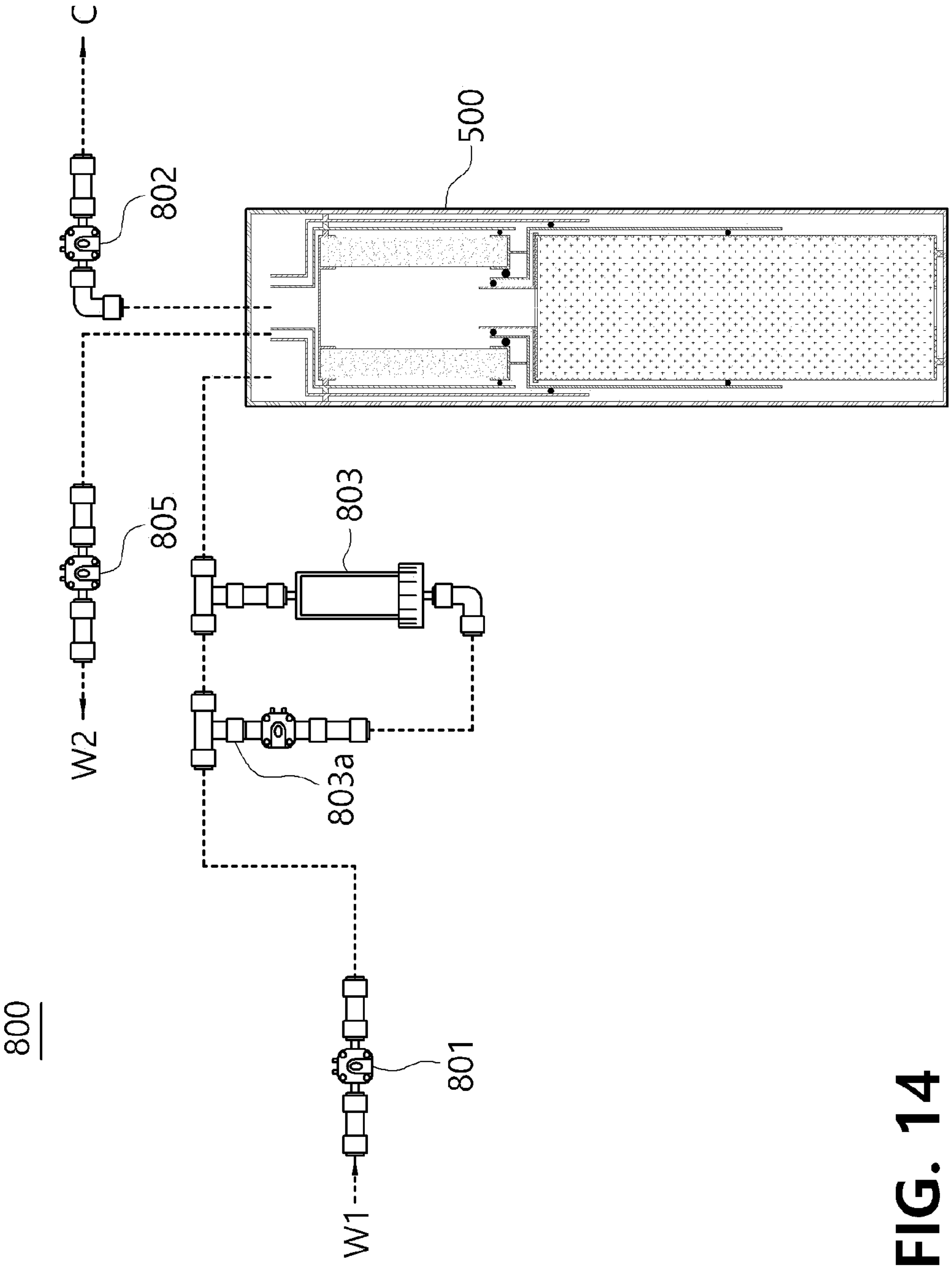
FIG. 14 is a configuration diagram schematically showing a water purifier according to still another exemplary embodiment of the present invention.

FIG. 14 is a configuration diagram schematically showing a water purifier according to still another exemplary embodiment of the present invention.

As illustrated in FIG. 14, the water purifier 800 according to still another exemplary embodiment of the present invention includes a raw water supply unit 801 which controls the supply of raw water (W1); a composite water 500 for receiving the raw water (W1) from the raw water supply unit 801 and filtering; a purified water discharge unit 802 which controls the discharge of purified water (C) filtered by the composite filter 500; and a washing module 803 which is provided between the raw water supply unit 801 and the composite filter 500, and controls the supply of washing water (W2) to the composite filter 500, wherein the raw water (W1) and the washing water (W2) are selectively supplied to the composite filter 500.

In this case, since the raw water supply unit 801 controls the supply of the raw water (W1), the raw water (W1) is prevented from being excessively supplied to the composite filter 500 such that the composite filter 500 is prevented from being damaged by the raw water (W1). In addition, since the raw water (W1) is prevented from being under-supplied to the composite filter 500 such that the flow of the raw water (W1) is lowered inside the composite filter 500, the operational stability of the water purifier is ensured. In addition, since the purified water discharging unit 802 controls the discharge of the purified water (C), purified water is extracted to meet the user's request, thereby improving user satisfaction.

In addition, as illustrated in FIG. 14, in the water purifier 800 according to still another exemplary embodiment of the present invention, the composite filter 500 is the composite filter of the above-described exemplary embodiment. However, the composite filter 500 is not limited to the above-described composite filter, and a structure in which the input of raw water, the output of purified water and the discharge of washing water are independently performed may also be applied.

In addition, as illustrated in FIG. 14, in the water purifier 800 according to still another exemplary embodiment of the present invention, the washing module 803 includes a washing water control valve 803*a* that controls the supply of the washing water (W2) by using the raw water from the raw water supply unit 801. The washing water control valve 803*a* controls the supply of the raw water (W1) to the composite filter 500 or the supply of the raw water (W1) to the washing module 803. That is, the washing water control valve 803*a* controls the supply of the raw water (W1) to the composite filter 500 and also controls the supply of the raw water (W1) to the washing module 803 to be stopped. Conversely, the washing water control valve 803*a* controls the supply of the raw water (W1) to the composite filter 500 to be stopped and also controls the supply of the raw water (W1) to the washing module 803. In addition, the washing module 803 performs a function of sterilizing the raw water (W1) supplied from the raw water supply unit 801. That is, the washing module 803 may be a sterilization device that sterilizes the raw water (W1). For example, the washing module 803 may sterilize the raw water (W1) or add a sterilizing agent by using ultrasonic waves or plasma, and additionally, various method for sterilizing the raw water (W1) to wash the composite filter 500 may be applied. The washing water (W2) of the washing module 803 is moved to the composite filter 500 to wash the composite filter 500 and then discharged to the outside through the washing water discharge valve 805.

In addition, with reference to FIG. 14, the process of extracting purified water and the process of washing the composite filter 500 will be described. First of all, in order to extract purified water, the raw water supply unit 801 opens a flow path of the raw water (W1) such that the raw water (W1) is supplied to the composite filter 500. In this case, the washing water control valve 803*a* opens the flow path of the raw water (W1) to control the raw water (W1) to be moved to the composite filter 500, and the flow path through which the raw water (W1) is moved to the washing module 803 is closed. In addition, as the raw water (W1) passes through the composite filter 500, the composite filter 500 produces the purified water (C). Then, the purified water (C) is extracted to the outside through the purified water discharge unit 802. In this case, the washing water discharge valve 805 closes the flow path of the washing water (W2) to secure the stability of the operation of the purified water extraction.

Next, in order to wash the composite filter 500, the raw water supply unit 801 opens a flow path of the raw water (W1) such that the raw water (W1) is supplied to the washing module 803. In this case, the washing water control valve 803*a* opens the flow path of the washing water (W2) to control the raw water (W1) to be moved to the washing module 803, and the flow path through which the raw water (W1) is moved to the composite filter 500 is closed. In addition, the washing module 803 supplies the washing water (W2) to the composite filter 500. As the washing water (W2) passes through the composite filter 500, the composite filter 500 is washed by the washing water (W2). In addition, the washing water (W2) is discharged to the outside through the washing water discharge valve 805. In this case, the purified water discharge unit 802 closes the flow path of the purified water (C) to secure the operational stability for washing the composite filter 500.

Figure 15:
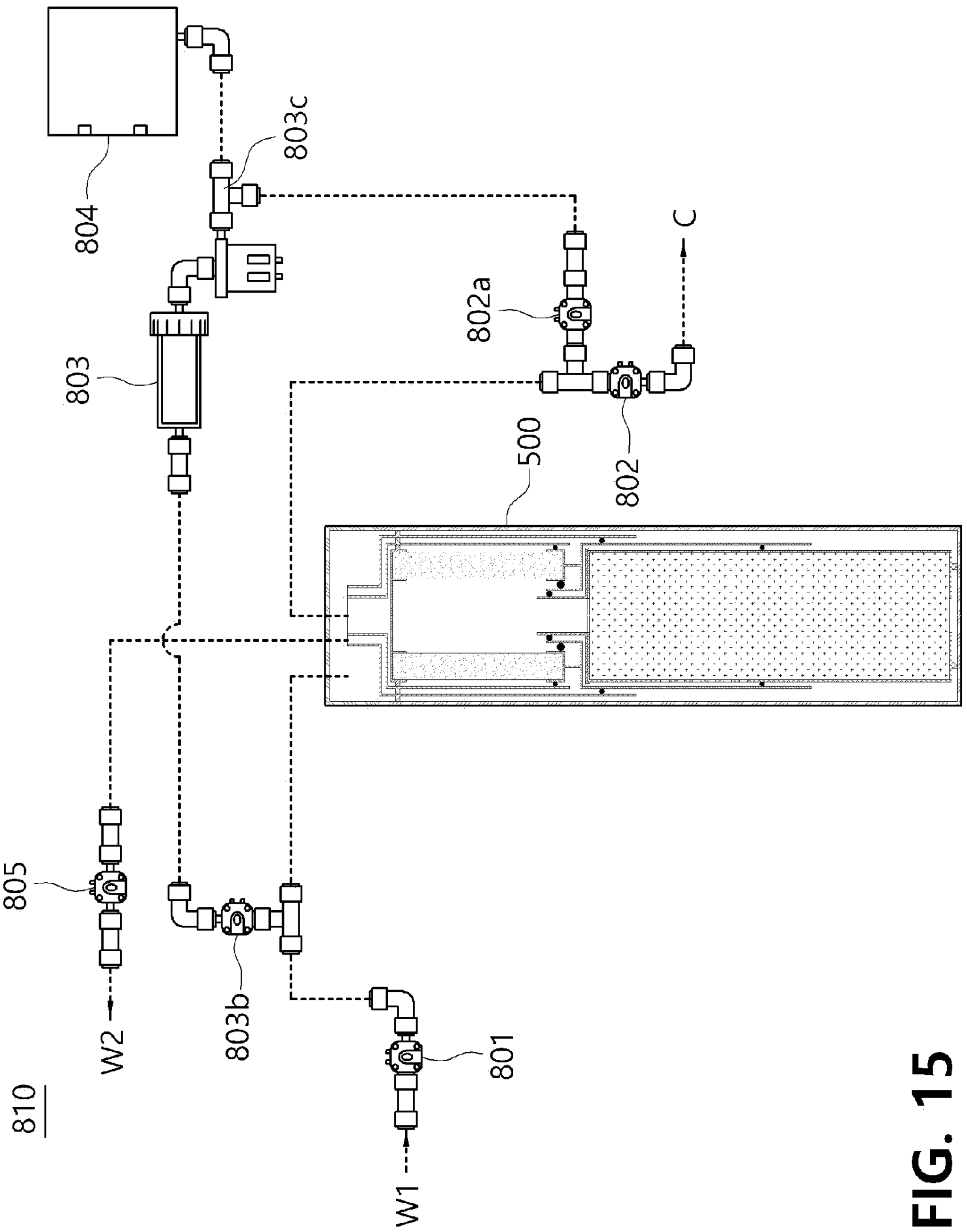
FIG. 15 is a configuration diagram schematically showing a water purifier according to still another exemplary embodiment of the present invention.

FIG. 15 is a configuration diagram schematically showing a water purifier according to still another exemplary embodiment of the present invention.

As illustrated in FIG. 15, the water purifier 810 according to still another exemplary embodiment of the present invention includes a raw water supply unit 801, a composite filter 500, a purified water discharge unit 802, a purified water storage tank 804 and a washing module 803, and the descriptions of components that are the same or similar to the components of the above-described exemplary embodiment are replaced with the foregoing descriptions, and it will be described by focusing on the purified water storage tank 804 and the washing module 803. The purified water storage tank 804 is connected to the purified water discharge unit 802. The purified water discharge unit 802 includes a first control valve 802*a* that controls the purified water (C) filtered by the composite filter 500 to be supplied to the purified water storage tank 804. In addition, the purified water (C) is extracted to the outside by the control of the purified water discharge unit 802 or moved to the purified water storage tank 804 by the control of the first control valve 802*a*.

In addition, as illustrated in FIG. 15, in the water purifier 810 according to still another exemplary embodiment of the present invention, the washing module 803 includes a washing water control valve 803*c* that controls the supply of the washing water (W2) by using purified water supplied from the purified water storage tank 804. When the washing water control valve 803*c* opens a flow path through which the purified water (C) is moved, the purified water (C) is moved to the washing module 803 and used as the washing water (W2). In this case, a second control valve 803*b* is provided in the flow path through which the raw water (W1) is moved. The washing water (W2) that has passed through the washing module 803 is moved to the second control valve 803*b* which is disposed in the flow path through which the raw water (W1) is moved. The second control valve 803*b* controls the washing water (W2) to be supplied to the composite filter 500 while stopping the supply of the raw water (W1), and conversely, it controls the raw water (W1) to be supplied to the composite filter 500 such that the supply of the washing water (W2) may be stopped.

In addition, with reference to FIG. 15, the process of extracting purified water and the process of washing the composite filter 500 will be described. First of all, in order to extract purified water, the raw water supply unit 801 opens a flow path of the raw water (W1) such that the raw water (W1) is supplied to the composite filter 500. In this case, the second control valve 803*b* opens the flow path of the raw water (W1) to control the raw water (W1) to move to the composite filter 500, and the flow path through which the washing water (W2) is moved to the composite filter 500 is closed. In addition, as the raw water (W1) passes through the composite filter 500, the composite filter 500 produces the purified water (C). In addition, the purified water (C) is extracted to the outside or moved to the purified water storage tank 804 according to the control of the purified water discharge unit 802. In this case, the washing water control valve 803*c* and the washing water discharge valve 805 close the flow path of the washing water (W2) to secure the stability of the operation of purified water extraction.

Next, in order to clean the composite filter 500, the washing water control valve 803*c* opens a flow path of the washing water (W2) and controls the purified water (C) to be moved to the washing module 803. In addition, the washing module 803 supplies the washing water (W2) to the second control valve 803*b*. In this case, the second control valve 803*b* closes the flow path of the raw water (W1) and opens the flow path through which the washing water (W2) moves to the composite filter 500. As the washing water (W2) passes through the composite filter 500, the composite filter 500 is washed by the washing water (W2). In addition, the washing water (W2) is discharged to the outside through the washing water discharge valve 805. In this case, the purified water discharge unit 802 closes the flow path of the purified water (C) to secure the operational stability for washing the composite filter 500.

Figure 16:
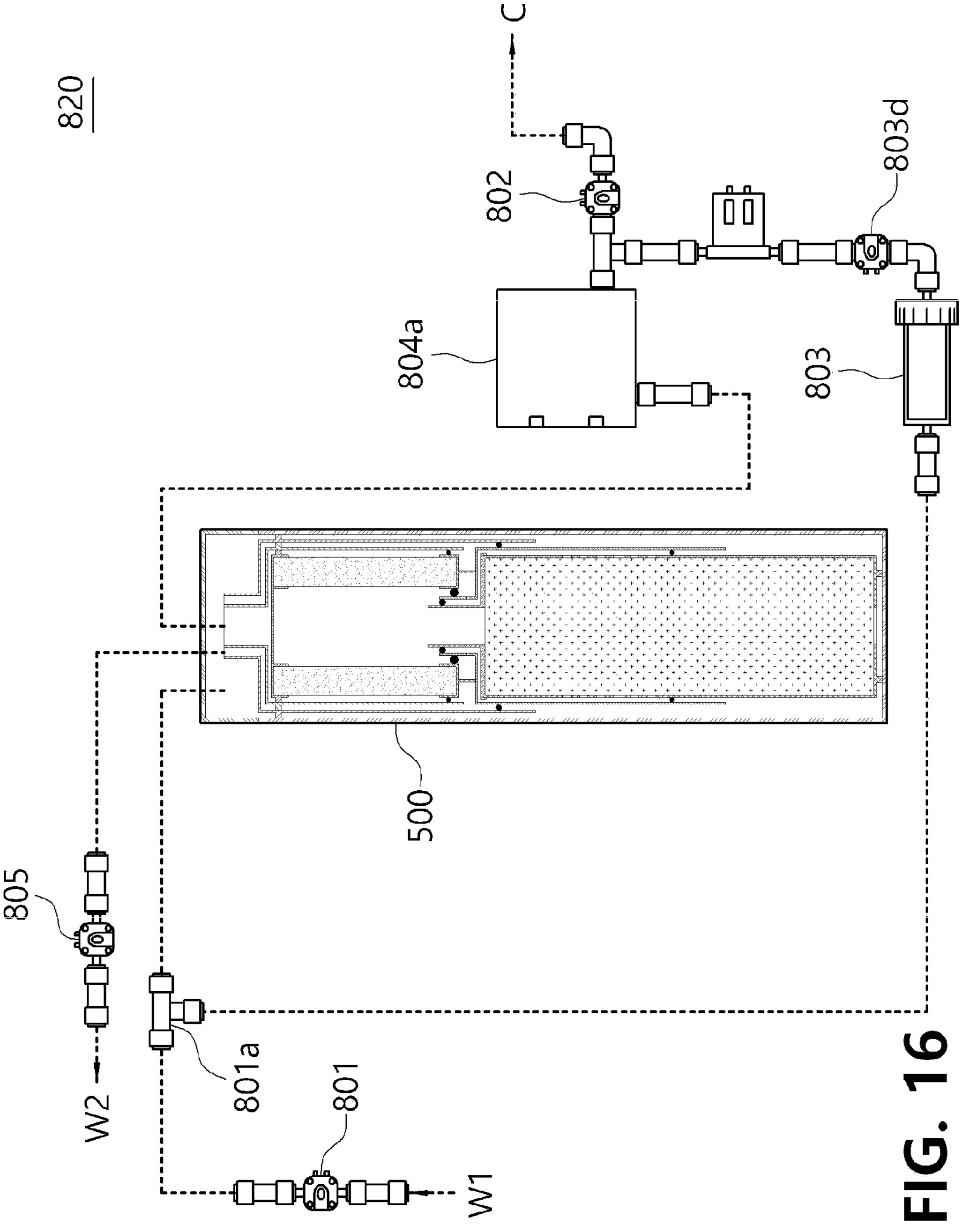
FIG. 16 is a configuration diagram schematically showing a water purifier according to still another exemplary embodiment of the present invention.

FIG. 16 is a configuration diagram schematically showing a water purifier according to still another exemplary embodiment of the present invention.

As illustrated in FIG. 16, the water purifier 820 according to still another exemplary embodiment of the present invention includes a raw water supply unit 801, a composite filter 500, a purified water discharge unit 802, a purified water storage tank 804*a* and a washing module 803, and the descriptions of components that are the same or similar to the components of the above-described exemplary embodiment will be replaced with the foregoing descriptions, and it will be described by focusing on the purified water storage tank 804*a* and the washing module 803. The purified water storage tank 804*a* is disposed between the composite filter 500 and the purified water discharge unit 802 and is connected to the purified water discharge unit 802. The purified water (C) filtered by the composite filter 500 is supplied to the purified water storage tank 804*a*. In addition, the purified water (C) is extracted to the outside by the control of the purified water discharge unit 802.

In addition, as illustrated in FIG. 16, in the water purifier 820 according to still another exemplary embodiment of the present invention, the washing module 803 includes a washing water control valve 803*d* that controls the supply of the washing water (W2) by using purified water supplied from the purified water storage tank 804*a*. When the washing water control valve 803*d* opens a flow path through which the purified water (C) is moved, the purified water (C) is moved to the washing module 803 and used as the washing water (W2). In this case, a control valve 801*a* is provided in the flow path through which the raw water (W1) is moved. The washing water (W2) that has passed through the washing module 803 is moved to the control valve 801*a* which is disposed in the flow path through which the raw water (W1) is moved. The control valve 801*a* controls the washing water (W2) to be supplied to the composite filter 500 while stopping the supply of the raw water (W1), and conversely, it controls the raw water (W1) to be supplied to the composite filter 500 such that the supply of the washing water (W2) may be stopped.

In addition, with reference to FIG. 16, the process of extracting purified water and the process of washing the composite filter 500 will be described. First of all, in order to extract purified water, the raw water supply unit 801 opens a flow path of the raw water (W1) such that the raw water (W1) is supplied to the composite filter 500. In this case, the control valve 801*a* opens a flow path of the raw water (W1) to control the raw water (W1) to be moved to the composite filter 500, and the flow path through which the washing water (W2) is moved to the composite filter 500 is closed. In addition, as the raw water (W1) passes through the composite filter 500, the composite filter 500 produces the purified water (C). After the purified water (C) is stored in the purified water storage tank 804*a*, it is extracted to the outside under the control of the purified water discharge unit 802. In this case, the washing water control valve 803*d* and the washing water discharge valve 805 close the flow path of the washing water (W2) to secure the stability of the operation of purified water extraction.

Next, in order to wash the composite filter 500, the purified water discharge unit 802 closes the flow path of the purified water (C) such that the purified water (C) is not discharged to the outside. In this case, the washing water control valve 803*d* opens a flow path of the washing water (W2) and controls the purified water (C) to be moved to the washing module 803. In addition, the washing module 803 supplies the washing water (W2) to the control valve 801*a*. In this case, the control valve 801*a* closes the flow path of the raw water (W1) and opens the flow path through which the washing water (W2) is moved to the composite filter 500. As the washing water (W2) passes through the composite filter 500, the composite filter 500 is washed by the washing water (W2). In addition, the washing water (W2) is discharged to the outside through the washing water discharge valve 805. As the purified water (C) is used as the washing water (W2), the washing efficiency of the composite filter 500 is improved.

Figure 17:
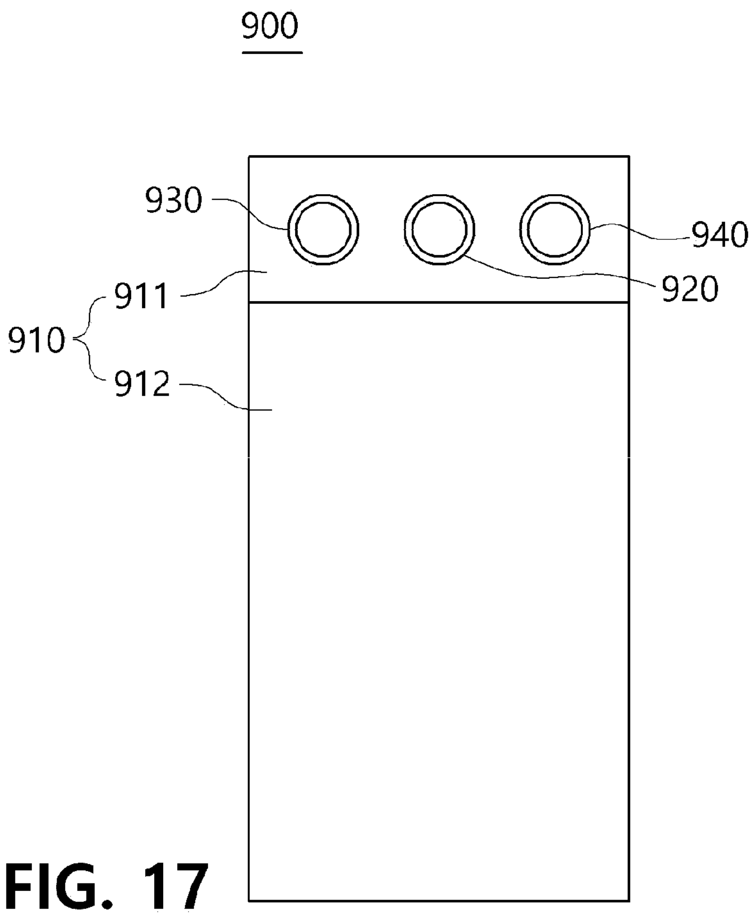
FIG. 17 is a diagram schematically showing the appearance of a composite filter according to still another exemplary embodiment of the present invention.
Figure 18:
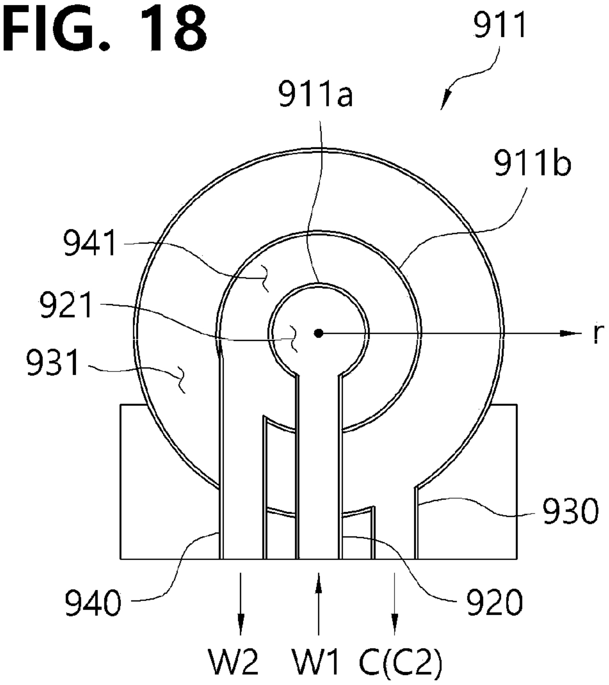
FIG. 18 is a plan view showing the head member of a composite filter according to still another exemplary embodiment of the present invention.
Figure 19:
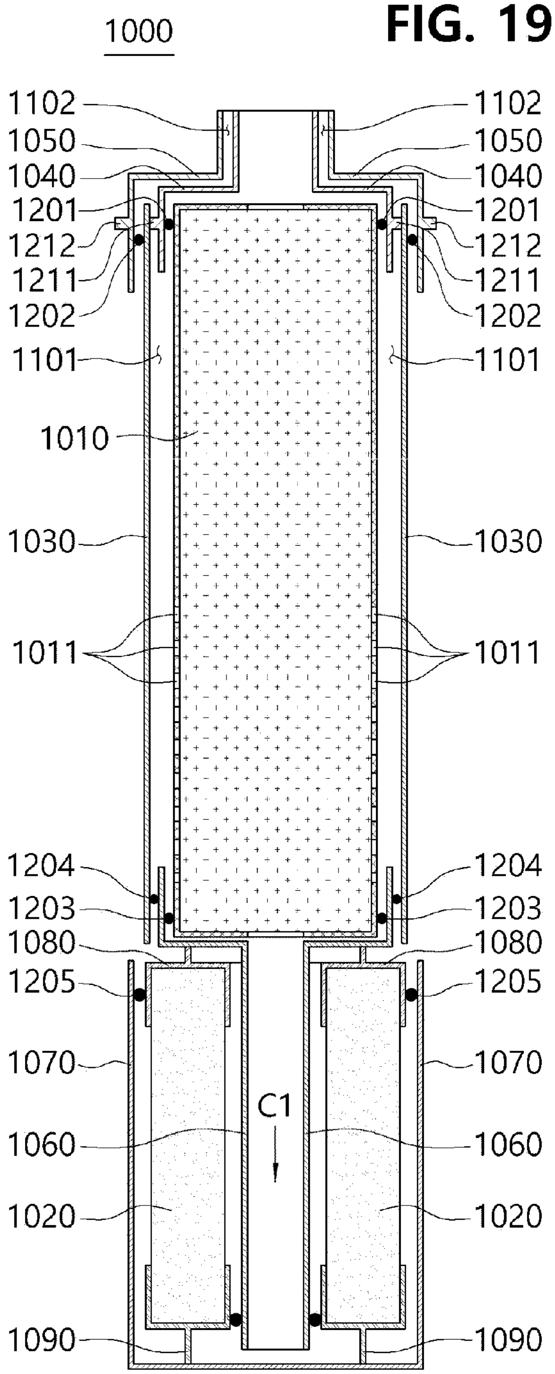
FIG. 19 is a cross-sectional view showing the assembled state of the filtering unit of a composite filter according to still another exemplary embodiment of the present invention.

FIG. 17 is a diagram schematically showing the appearance of a composite filter according to still another exemplary embodiment of the present invention, FIG. 18 is a plan view showing the head member of a composite filter according to still another exemplary embodiment of the present invention, and FIG. 19 is a cross-sectional view showing the assembled state of the filtering unit of a composite filter according to still another exemplary embodiment of the present invention. Herein, a means the axial direction of the composite filter, and r means the radial direction of the composite filter.

As illustrated in FIGS. 17 to 19, the composite filter 900 of the present invention includes a housing part 910 which is provided with a raw water inlet port 920 through which raw water (W1) is introduced, a purified water outlet port 930 through which filtered purified water (C) is discharged, and a washing water discharge port 940 through which washing water (W2) is discharged; and a filtering unit 1000 which is provided with a first filter member 1010 that filters the raw water (W1) to produce first purified water (C1), and a second filter member 1020 that filters the first purified water (C1) to produce second purified water (C2) and is disposed below the first filter member 1010. That is, after the raw water (W1) introduced through the raw water inlet port 920 moves to the filtering unit 1000, it sequentially moves to the first filter member 1010 and the second filter member 1020 provided in the filtering unit 1000 to be filtered, and finally, filtered purified water (C) is discharged through the purified water outlet port 930 and then provided to the user. In addition, the purified water (C) may be stored in a separate purified water tank (not illustrated), or may be supplied to a cold water generator (not illustrated), a hot water generator (not illustrated) and an ice generator (not illustrated) for generating cold water, hot water and ice, respectively. Then, the first purified water (C1) moves to a lower side of the first filter member 1010 and then moves to the second filter member 1020, and after washing the first filter member 1010, the washing water (W2) moves to a first discharge passage 1101 formed between the first filter member 1010 and the second filter member 1030 and is discharged outside of the composite filter 900 through the washing water discharge port 940. In this way, since it is configured such that the discharge of the washing water (W2) as well as the input of the raw water (W1) and the output of the purified water (C) are possible, the first filter member 1010 and the second filter member 1020 are integrated to configure a composite filter, and thus, user convenience is enhanced. In addition, by washing the first filter member 1010 using the washing water (W2), the product lifespan of the composite filter 900 is increased, and thus, user convenience is enhanced. In this case, the first filter member 1010 may be an ultra-filtration (UF) filter that filters out contaminants by a hollow fiber membrane. In addition, the second filter member 1020 may be a carbon filter or a microfiltration (MF) filter. In addition, the second filter 1020 may include an electric deionization-type filter. The electric deionization method refers to EDI (Electro Deionization), CEDI (Continuous Electro Deionization), CDI (Capacitive Deionization) or the like. In this case, a separate filter member may be provided on the outer surface of the second filter member 1020. As an example, this separate filter member may be an NT filter member. Such an NT filter member may be made of a material that is charged with static electricity to adsorb foreign substances included in the introduced raw water (W1), for example, a nano-trap material. This electrostatic material may be configured to carry a positive charge. Accordingly, negatively charged foreign substances, such as viruses, bacteria and fine particles, included in the raw water (W1) may be adsorbed to the NT filter member by static electricity. In addition, this separate filter member may be a sediment filter member.

As illustrated in FIG. 18, in the composite filter according to still another exemplary embodiment of the present invention, the housing part 910 includes a head member 911 which is provided with a first partition wall 911*a* that prevents the raw water (W1) and the washing water (W2) from mixing, and a second partition wall 911*b* that prevents the purified water (C) and the washing water (W2) from mixing; and a case member 912 which extends from the head member 911 and has the filtering unit 1000 disposed therein. That is, it is a structure in which not only the incoming raw water (W1) but also the second purified water (C2) and the discharged washing water (W2) are output/discharged to the upper part of the composite filter 900, and to this end, the head member (911) is formed with a raw water area 921 from which the raw water (W1) is introduced, a second purified water area 931 from which the second purified water (C2) is output, and a washing water area 941 from which the washing water (W2) is discharged. To this end, since the first and second partition walls 911*a*, 911*b* are provided such that independent flow paths in which the raw water (W1), the second purified water (C)2 and the washing water (W2) are not mixed are formed in the head member 911 of the housing part 910, the water outlet/discharge is concentrated on the upper part of the composite filter 900, thereby improving the layout design freedom of other parts. Herein, the washing water (W2) flowing into the first filter member 1010 washes the first filter member 1010 by using the raw water (W1). However, the washing water (W2) is not limited to using only the raw water (W1), and purified water that is output may be used.

As illustrated in FIG. 19, the filtering unit 1000 includes a first body member 1030 which surrounds the first filter member 1010; a first upper cap member 1040 wherein the first filter member 1010 is disposed below; a second upper cap member 1050 wherein the first upper cap member 1040 is disposed below, and the first body member 1030 is disposed below; a first lower cap member 1060 wherein the first filter member 1010 is disposed below, and penetrates the second filter member 1020; a second body member 1070 which surrounds the second filter member 1020; and a third upper cap member 1080 wherein the second filter member 1020 is disposed below. In this case, the raw water (W1) is moved through the inside of the first upper cap member 1040, and the washing water (W2) is moved upward through a gap between the first upper cap member 1040 and the second upper cap member 1050 by passing between the first filter member 1010 and the first body member 1030, and as the purified water (C) is moved upward through the inside of the case member 912, independent flow paths in which the raw water (W1), the washing water (W2) and the purified water (C) do not mix are formed such that the first filter member 1010 and the second filter member 1020 are integrated, thereby improving manufacturability.

As illustrated in FIG. 19, a plurality of discharge holes 1011 that are disposed to be spaced apart from each other are provided on a side surface of the first filter member 1010. In this case, the plurality of discharge holes 1011 have the same size. However, the size of the plurality of discharge holes 1011 is not limited to the same size, and it may increase or decrease in the downward direction. In addition, the plurality of discharge holes 1011 are disposed to be spaced apart from each other at equal intervals. However, the plurality of discharge holes 1011 are not limited to being spaced apart from each other at equal intervals, and they may be disposed to be spaced apart from each other in the downward direction. In addition, a first discharge passage 1101 through which the washing water (W2) flows is provided between the first filter member 1010 and the first body member 1030. In this case, the plurality of discharge holes 1011 communicate with the first discharge passage 1101. The washing water (W2) that has washed the first filter member 1010 is moved to the first discharge passage 1101 through the plurality of discharge holes 1011. In addition, a second discharge passage 1102 communicating with the first discharge passage 1101 is provided between the first upper cap member 1040 and the second upper cap member 1050. In this case, the second discharge passage 1102 communicates with the washing water discharge port 940 (refer to FIG. 18). Through this, the washing water (W2) that has washed the first filter member 1010 is discharged to the outside of the composite filter by sequentially passing through the plurality of discharge holes 1011, the first discharge passage 1101, the second discharge passage 1102 and the washing water discharge port 940. As described above, the composite filter 900 according to still another exemplary embodiment of the present invention is manufactured by integrating the first filter member 1010 and the second filter member 1020, and since the washing water (W2) and the purified water (C) are discharged without being mixed with each other, the operational reliability of the composite filter 900 is improved.

Figure 20:
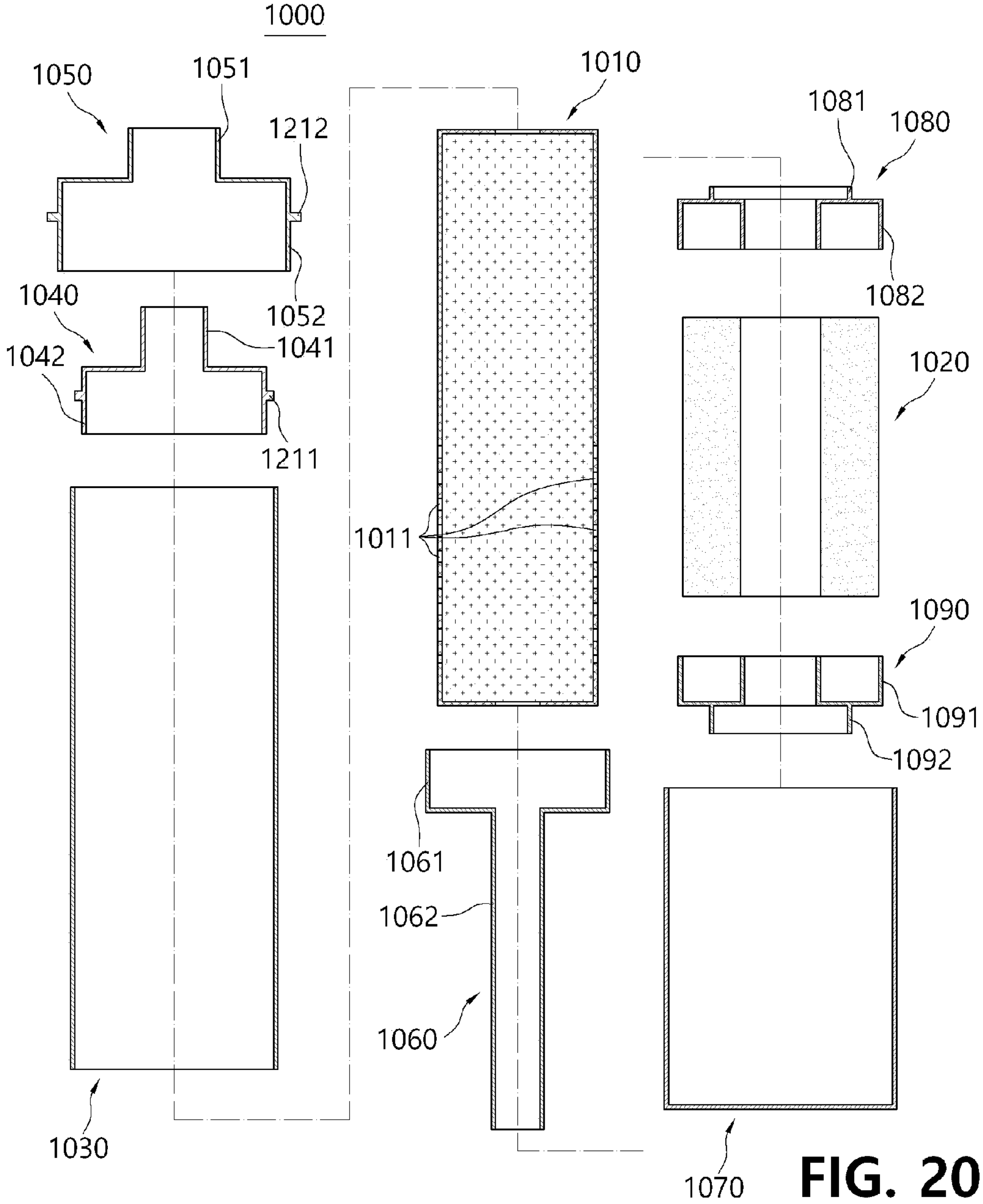
FIG. 20 is a cross-sectional view showing the separated state of the filtering unit of a composite filter according to still another exemplary embodiment of the present invention.

FIG. 20 is a cross-sectional view showing the separated state of the filtering unit of a composite filter according to still another exemplary embodiment of the present invention.

As illustrated in FIGS. 19 and 20, in the filtering unit 1000 of the composite filter according to still another exemplary embodiment of the present invention, the first filter member 1010 is positioned below the first upper cap member 1040, the first upper cap member 1040 is positioned below the second upper cap member 1050, the first lower cap member 1060 is positioned below the first filter member 1010, and the second filter member 1020 is positioned below the third upper cap member 1080. Since the first upper cap member 1040, the second upper cap member 1050, the first lower cap member 1060 and the third upper cap member 1080 are assembled such that the first filter member 1010 and the second filter member 1020 have a stacked structure, the manufacturability of the composite filter 900 is improved. In addition, since the first body member 1030 surrounds the first filter member 1010 and is disposed to be spaced apart from the first filter member 1010, separate flow paths are provided inside and outside the first body member 1030, and thus, while the first filter member 1010 and the second filter member 1020 have a stacked structure, the raw water (W1), the purified water (C) and the washing water (W2) are not mixed, and independent flow paths are formed, thereby securing the operation reliability of the composite filter 900.

As illustrated in FIGS. 19 and 20, in the filtering unit 1000 of the composite filter according to still another exemplary embodiment of the present invention, the first upper cap member 1040 includes a first upward guide 1041 which is disposed to extend upward such that the raw water (W1) flows into the first filter member 1010. That is, as the first upper cap member 1040 is provided with the first upward guide 1041 through which the raw water (W1) flows, the inflow of the raw water (W1) and the discharge of the washing water (W2) are separated, thereby securing the operational reliability of the composite filter 900. In addition, the first partition wall 911*a* (refer to FIG. 18) is disposed to extend in the axial direction along the first upward guide 1041. That is, the raw water (W1) is smoothly moved to the first filter member 1010 through the first partition wall 911*a* (refer to FIG. 18) and the first upward guide 1041. In addition, the first upper cap member 1040 includes a first downward guide 1042 which is disposed to extend downward. The first downward guide 1042 is formed to surround the upper part of the first filter member 1010 and is coupled to the first filter member 1010 such that the first upper cap member 1040 is stably coupled to the upper part of the first filter member 1040 by the first downward guide 1042.

In addition, as illustrated in FIGS. 19 and 20, in the filtering unit 1000 of the composite filter according to still another exemplary embodiment of the present invention, the second upper cap member 1050 includes a second upward guide 1051 which is disposed to extend upward such that the washing water (W2) that has passed through the first filter member 1010 is discharged to the outside of the composite filter 900. In this case, the second upward guide 1051 surrounds the first upward guide 1041 and is disposed to be spaced apart from each other. In addition, as the second upper cap member 1050 is provided with the second upward guide 1051 through which the washing water (W2) flows, the discharge of the washing water (W2) and the output of the purified water (C) are separated, thereby securing the operational reliability of the composite filter 900. In addition, the second partition wall 911*b* (refer to FIG. 18) is disposed to extend in the axial direction along the second upward guide 1051. That is, after the washing water (W2) is moved upward along the second upward guide 1051, it is smoothly moved to the washing water discharge port 940 through the second partition wall 911*b* (refer to FIG. 18), thereby securing the operational reliability of the composite filter 900. In addition, the second upper cap member 1050 includes a second downward guide 1052 which is disposed to extend downward. In addition, the second downward guide 1052 surrounds the first downward guide 1042 and is formed to be spaced apart from each other. That is, a flow path through which the washing water that has passed through the first discharge passage 1101 is moved is formed between the first downward guide 1042 and the second downward guide 1052. In this case, the upper part of the first body member 1030 is disposed between the first downward guide 1042 and the second downward guide 1052.

In addition, as illustrated in FIGS. 19 and 20, in the filtering unit 1000 of the composite filter according to still another exemplary embodiment of the present invention, the first lower cap member 1060 includes a third upward guide 1061 which is disposed to extend upward. The third upward guide 1061 surrounds the lower part of the first filter member 1010 and is coupled to the first filter member 1010 such that the first lower cap member 1060 is stably fixed to the first filter member 1010. In addition, the first lower cap member 1060 includes a first lower cap guide 1062 which is disposed to extend downward so as to penetrate through the second filter member 1020. An outer diameter of the first lower cap guide 1062 is smaller than an inner diameter of the second filter member 1020. In addition, as the first purified water (C1) that has passed through the first filter member 1010 is moved to the lower part of the second filter member 1020 along the inner side of the first lower cap guide 1062, the first purified water (C1) and the second purified water (C2) that has passed through the second filter member 1020 are prevented from being mixed, thereby securing the operational stability of the composite filter 900.

In addition, as illustrated in FIGS. 19 and 20, in the filtering unit 1000 of the composite filter according to still another exemplary embodiment of the present invention, the third upper cap member 1080 includes an upper cap guide 1082 which is disposed to extend downward so as to be coupled to the second filter member 1020. In addition, the upper cap guide 1082 is formed to surround the upper part of the second filter member 1020 such that the third upper cap member 1080 is stably fixed to the second filter member 1082 by the upper cap guide 1082. In addition, the third upper cap member 1080 includes an upper cap support member 1081 which is disposed to extend upward. The upper cap support member 1081 is formed such that the first lower cap member 1060 and the third upper cap member 1080 are disposed to be spaced apart from each other. Accordingly, since the second purified water (C2) that has passed through the second filter member 1020 is moved through the upper part of the third upper cap member 1080, an independent flow path is formed through which the second purified water (C2) is moved to the upper part of the composite filter (900) without being mixed with the first purified water (C1), and thus, the quality of the purified water is secured, thereby enhancing user satisfaction.

As illustrated in FIGS. 19 and 20, the filtering unit 1000 of the composite filter according to still another exemplary embodiment of the present invention further includes a second lower cap member 1090 which is coupled to a lower side of the second filter member 1020. In addition, the second lower cap member 1090 includes a second lower cap guide 1091 which is disposed to extend upward so as to be coupled to the second filter member 1020. As the second lower cap guide 1091 comes into contact with the lower outer peripheral surface of the second filter member 1020, the second lower cap guide 1091 stably fixes the second filter member 1020, thereby improving the durability of the composite filter 900. Accordingly, the second lower cap member 1090 stably fixes the second filter member 1020 together with the third upper cap member 1080 such that the modularization of the composite filter 900 is possible through a sub-assembly process, thereby enhancing workability. In addition, the second lower cap member 1090 is provided with a lower leg 1092 which extends downward toward a lower side surface of the second body member 1070. The lower leg 1092 is formed such that the second lower cap member 1090 is disposed to be spaced apart from the second body member 1070. In addition, since the second lower cap member 1090 is disposed to be spaced apart from the second body member 1070 by the lower leg 1092, the first purified water (C1) that has passed through the first lower cap member 1060 is moved along the lower part of the second filter member 1020, and then, it is moved to the second filter member 1020, thereby securing the operational stability of the composite filter 900.

In addition, as illustrated in FIGS. 19 and 20, since the second filter member 1020, the third upper cap member 1080 and the second lower cap member 1090 are mounted on the second filter member 1020, the modularization of the composite filter 900 is possible, thereby enhancing workability.

In addition, as illustrated in FIGS. 19 and 20, in the filtering unit 1000 of the composite filter according to still another exemplary embodiment of the present invention, a first O-ring 1201 is formed between the second upper cap member 1040 and the first filter member 1010 to prevent the washing water (W2) from being re-introduced into the first filter member 1010. The first O-ring 1201 is made of a rubber or silicone material. However, the first O-ring 1201 is not limited to being made of a rubber or silicone material, and it may be made of various materials having elasticity. In addition, the first O-ring 1201 seals a gap between the first filter member 1010 and the second upper cap member 1040 such that the washing water (W2) moving through the first discharge passage 1101 is prevented from being re-introduced into the first filter member 1010.

In addition, as illustrated in FIGS. 19 and 20, in the filtering unit 1000 of the composite filter according to still another exemplary embodiment of the present invention, a second O-ring 1202 is formed between the second upper cap member 1050 and the first body member 1030 to prevent the washing water (W2) from mixing with the second purified water (C2). The second O-ring 1202 is made of a rubber or silicone material. However, the second O-ring 1202 is not limited to being made of a rubber or silicone material, and it may be made of various materials having elasticity. In addition, the second O-ring 1202 seals a gap between the second upper cap member 1050 and the first body member 1030 to prevent the second purified water (C2) from being introduced into the first discharge passage 1101 or the second discharge passage 1102.

In addition, as illustrated in FIGS. 19 and 20, in the filtering unit 1000 of the composite filter according to still another exemplary embodiment of the present invention, a third O-ring 1203 is formed between the firth filter member 1010 and the first lower cap member 1060 to prevent the washing water from being introduced into the second filter member 1020. The third O-ring 1203 is made of a rubber or silicone material. However, the third O-ring 1203 is not limited to being made of a rubber or silicone material, and it may be made of various materials having elasticity. In addition, the third O-ring 1203 seals a gap between the first filter member 1010 and the first lower cap member 1060 to prevent the second purified water (C2) from mixing with the washing water (W2).

In addition, as illustrated in FIGS. 19 and 20, in the filtering unit 1000 of the composite filter according to still another exemplary embodiment of the present invention, a fourth O-ring 1204 is formed between the first body member 1030 and the first lower cap member 1060 to prevent the washing water (W2) from mixing with the second purified water (C2). The fourth O-ring 1204 is made of a rubber or silicone material. However, the fourth O-ring 1204 is not limited to being made of a rubber or silicone material, and it may be made of various materials having elasticity. In addition, the fourth O-ring 1204 seals a gap between the first body member 1030 and the first lower cap member 1060 to prevent the second purified water (C2) from moving to the first discharge passage 1010, thereby securing the operational stability of the composite filter 900.

In addition, as illustrated in FIGS. 19 and 20, in the filtering unit 1000 of the composite filter according to still another exemplary embodiment of the present invention, a fifth O-ring 1205 is formed between the second body member 1070 and the third upper cap member 1080 to prevent the second purified water (C2) from being re-introduced into the second filter member 1020. The fifth O-ring 1205 is made of a rubber or silicone material. However, the fifth O-ring 1205 is not limited to being made of a rubber or silicone material, and it may be made of various materials having elasticity. In addition, the fifth O-ring 1205 seals a gap between the second body member 1070 and the third upper cap member 1080 to prevent the first purified water (C1) from mixing with the second purified water (C2), thereby securing the operational stability of the composite filter 900.

In addition, as illustrated in FIGS. 19 and 20, in the filtering unit 1000 of the composite filter according to still another exemplary embodiment of the present invention, a first spacer 1211 is provided between the first upper cap member 1040 and the first body member 1030 to be disposed to be spaced apart from each other at a certain interval. Accordingly, the first spacer 1211 prevents the first discharge passage 1101 and the second discharge passage 1102 from blocking each other. In addition, since the elastic force of the first O-ring 1201 is provided such that the first spacer 1211 is pressed toward the first body member 1030, the first upper cap member 1040 is stably fixed between the first filter member 1010 and the first body member 1030 by the first spacer 1211 and the first O-ring 1201.

In addition, as illustrated in FIGS. 19 and 20, in the filtering unit 1000 of the composite filter according to still another exemplary embodiment of the present invention, a second spacer 1212 is provided between the second upper cap member 1050 and the case member 912 (refer to FIG. 21) to be disposed to be spaced apart from each other at a certain interval. Accordingly, the first spacer 1212 prevents the second upper cap member 1050 and the case member 912 (refer to FIG. 21) from blocking each other such that the purified water (C) is smoothly moved along the inner side of the case member 912 (refer to FIG. 21). In addition, since the elastic force of the second O-ring 1201 is provided such that the second spacer 1212 is pressed toward the case member 912 (refer to FIG. 21), the second upper cap member 1050 is stably fixed between the case member 912 (refer to FIG. 21) and the first body member 1030 by the second spacer 1212 and the second O-ring 1202.

Figure 21:
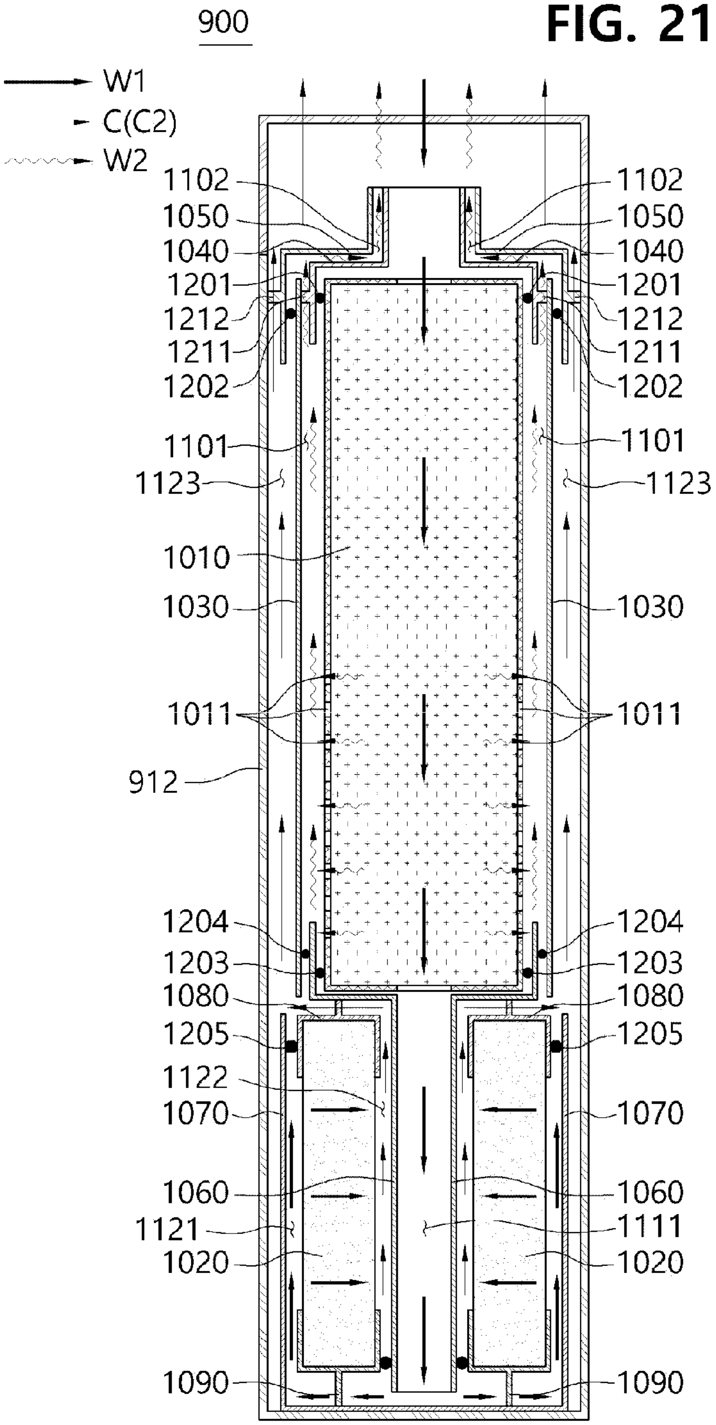
FIG. 21 is a cross-sectional view showing a state in which the filtering unit of the composite filter according to another exemplary embodiment of the present invention is installed in the housing part.

FIG. 21 is a cross-sectional view showing a state in which the filtering unit of the composite filter according to still another exemplary embodiment of the present invention is installed in the housing part.

As illustrated in FIG. 21, the raw water (W1) which is introduced through the raw water inlet port 520 (refer to FIG. 18) is moved to the first filter member 1010 through the first upper cap member 1040. In addition, the first purified water (C1) that has passed through the first filter member 1010 is moved to the lower part of the second filter member 1020 through the first lower cap member 1060. In this case, a first purified water flow path 1121 through which the first purified water (C1) is moved is formed between the second body member 1070 and the second filter member 1020. The first purified water (C1) is introduced into the second filter member 1020 while moving along the first purified water flow path 1121. In addition, a second purified water flow path 1121 through which the second purified water (C2) is moved is formed between the second filter member 1020 and the first lower cap member 1060. The second purified water (C2) that has passed through the second filter member 1020 is moved upward along the second purified water passage 1121, and is moved between the third upper cap member 1080 and the first lower cap member 1060. A third purified water flow path 1123 through which the second water purification (C2) is moved is formed between the case member 912 and the first body member 1030. The second purified water (C2) is moved upward along the third purified water flow path 1123.

In this way, while the composite filter 900 according to still another exemplary embodiment of the present invention forms independent flow paths through the upper part through the input of the raw water (W1), the output of the purified water (C) and the discharge of the washing water (W2), the first filter member 1010 and the second filter member 1020 are assembled to have a stacked structure by the first upper cap member 1040, the second upper cap member 1050, the first lower cap member 1060 and the third upper cap member 1080, and thus, the modularization of the composite filter is possible such that there is no need for the user to manipulate separate configurations for washing, thereby improving user convenience.

Figure 22:
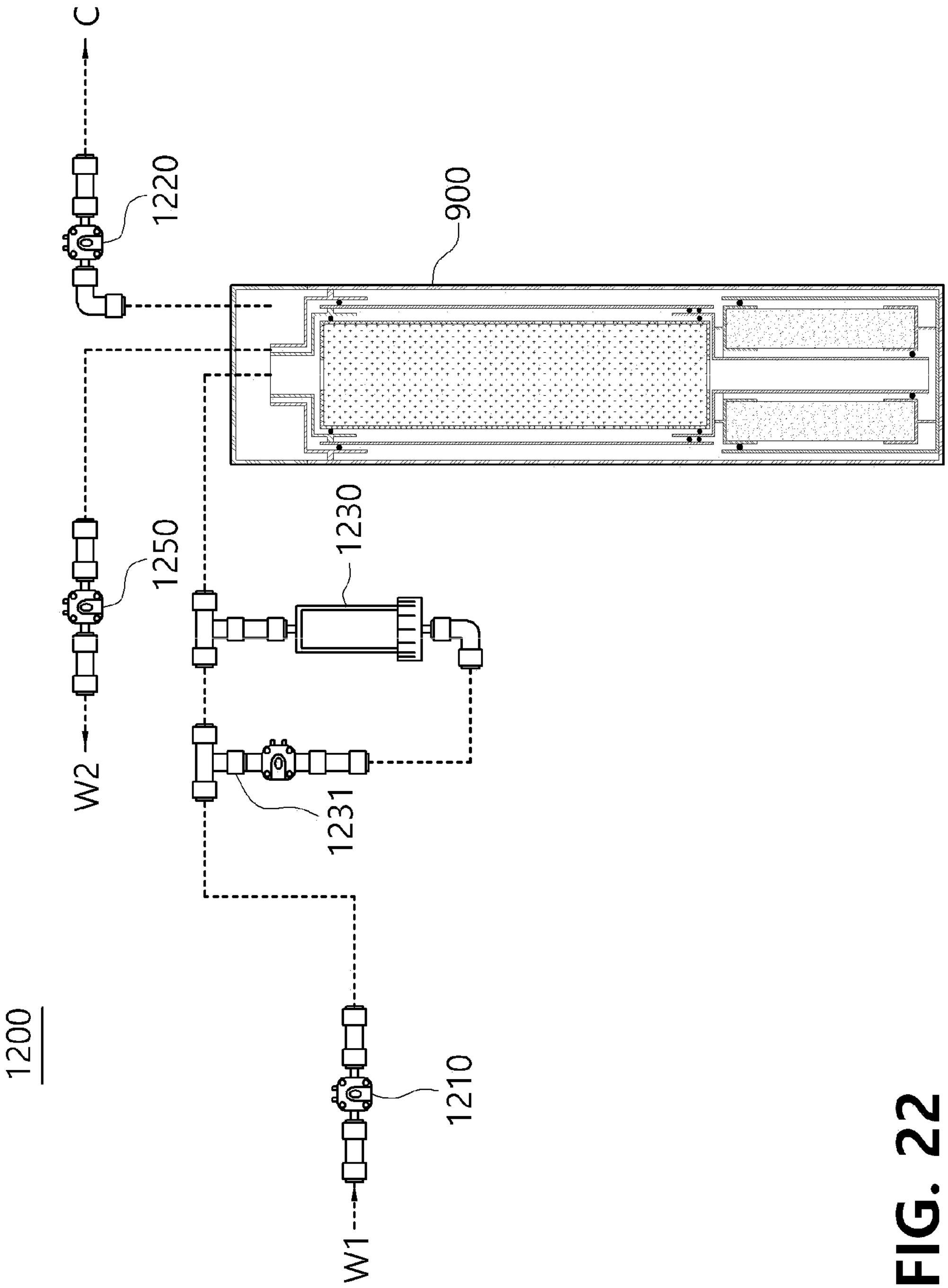
FIG. 22 is a configuration diagram schematically showing a water purifier according to still another exemplary embodiment of the present invention.

FIG. 22 is a configuration diagram schematically showing a water purifier according to still another exemplary embodiment of the present invention.

As illustrated in FIG. 22, the water purifier 1200 according to still another exemplary embodiment of the present invention includes a raw water supply unit 1210 which controls the supply of raw water (W1); a composite water 900 for receiving the raw water (W1) from the raw water supply unit 1210 and filtering; a purified water discharge unit 1220 which controls the discharge of purified water (C) filtered by the composite filter 900; and a washing module 1230 which is provided between the raw water supply unit 1210 and the composite filter 900, and controls the supply of washing water (W2) to the composite filter 900, wherein the raw water (W1) and the washing water (W2) are selectively supplied to the composite filter.

In this case, since the raw water supply unit 1210 controls the supply of the raw water (W1), the raw water (W1) is prevented from being excessively supplied to the composite filter 900 such that the composite filter 900 is prevented from being damaged by the raw water (W1). In addition, since the raw water (W1) is prevented from being under-supplied to the composite filter 900 such that the flow of the raw water (W1) is prevented from being lowered inside the composite filter 900, the operational stability of the water purifier is secured. In addition, since the purified water discharge unit 1220 controls the discharge of the purified water (C), it extracts purified water to meet the user's request, thereby improving user satisfaction.

In addition, as illustrated in FIG. 22, in the water purifier 1200 according to still another exemplary embodiment of the present invention, the composite filter 900 is the composite filter of the above-described exemplary embodiment. However, the composite filter 900 is not limited to the above-described composite filter, and a structure in which the input of raw water, the output of purified water and the discharge of washing water are independently performed may also be applied.

In addition, as illustrated in FIG. 22, in the water purifier 1200 according to still another exemplary embodiment of the present invention, the washing module 1230 includes a washing water control valve 1231 that controls the supply of the washing water (W2) by using the raw water from the raw water supply unit 1210. The washing water control valve 1231 controls the supply of the raw water (W1) to the composite filter 900 or the supply of the raw water (W1) to the washing module 1230. That is, the washing water control valve 1231 controls the raw water (W1) to be supplied to the composite filter 900 and also controls the supply of the raw water (W1) to the washing module 1230 to be stopped. Conversely, the washing water control valve 1231 controls the supply of the raw water (W1) to the composite filter 900 to be stopped, and also controls the raw water (W1) to be supplied to the washing module 1230. In addition, the washing module 1230 performs a function of sterilizing the raw water (W1) supplied from the raw water supply unit 1210. That is, the washing module 1230 may be a sterilization device that sterilizes the raw water (W1). For example, the washing module 1230 may sterilize the raw water (W1)

or add a sterilizing agent by using ultrasonic waves or plasma, and additionally, various methods of sterilizing the raw water (W1) to wash the composite filter 900 may be applied. The washing water (W2) of the washing module 1230 is moved to the composite filter 900 to wash the composite filter 900 and then discharged to the outside through the washing water discharge valve 1250.

In addition, with reference to FIG. 22, the process of extracting purified water and the process of washing the composite filter 900 will be described. First of all, for purified water extraction, the raw water supply unit 1210 opens a flow path of the raw water (W1) such that the raw water (W1) is supplied to the composite filter 900. In this case, the washing water control valve 1231 opens the flow path of the raw water (W1) to control the raw water (W1) to be moved to the composite filter 900, and the flow path through which the raw water (W1) is moved to the washing module 1230 is closed. In addition, as the raw water (W1) passes through the composite filter 900, the composite filter 900 produces the purified water (C). Then, the purified water (C) is extracted to the outside through the purified water discharge unit 1220. In this case, the washing water discharge valve 1250 closes a flow path of the washing water (W2), thereby securing the stability of the operation of purified water extraction.

Next, in order to wash the composite filter 900, the raw water supply unit 1210 opens a flow path of the raw water (W1) such that the raw water (W1) is supplied to the washing module 1230. In this case, the washing water control valve 1231 opens the flow path of the washing water (W2) such that the raw water (W1) is moved to the washing module 1230, and the flow path through which the raw water (W1) is moved to the composite filter 900 is closed. In addition, the washing module 1230 supplies the washing water (W2) to the composite filter 900. As the washing water (W2) passes through the composite filter 900, the composite filter 900 is washed by the washing water (W2). In addition, the washing water (W2) is discharged to the outside through the washing water discharge valve 1250. In this case, the purified water discharge unit 1220 closes the flow path of the purified water (C), thereby securing the operational stability for washing the composite filter 900.

Figure 23:
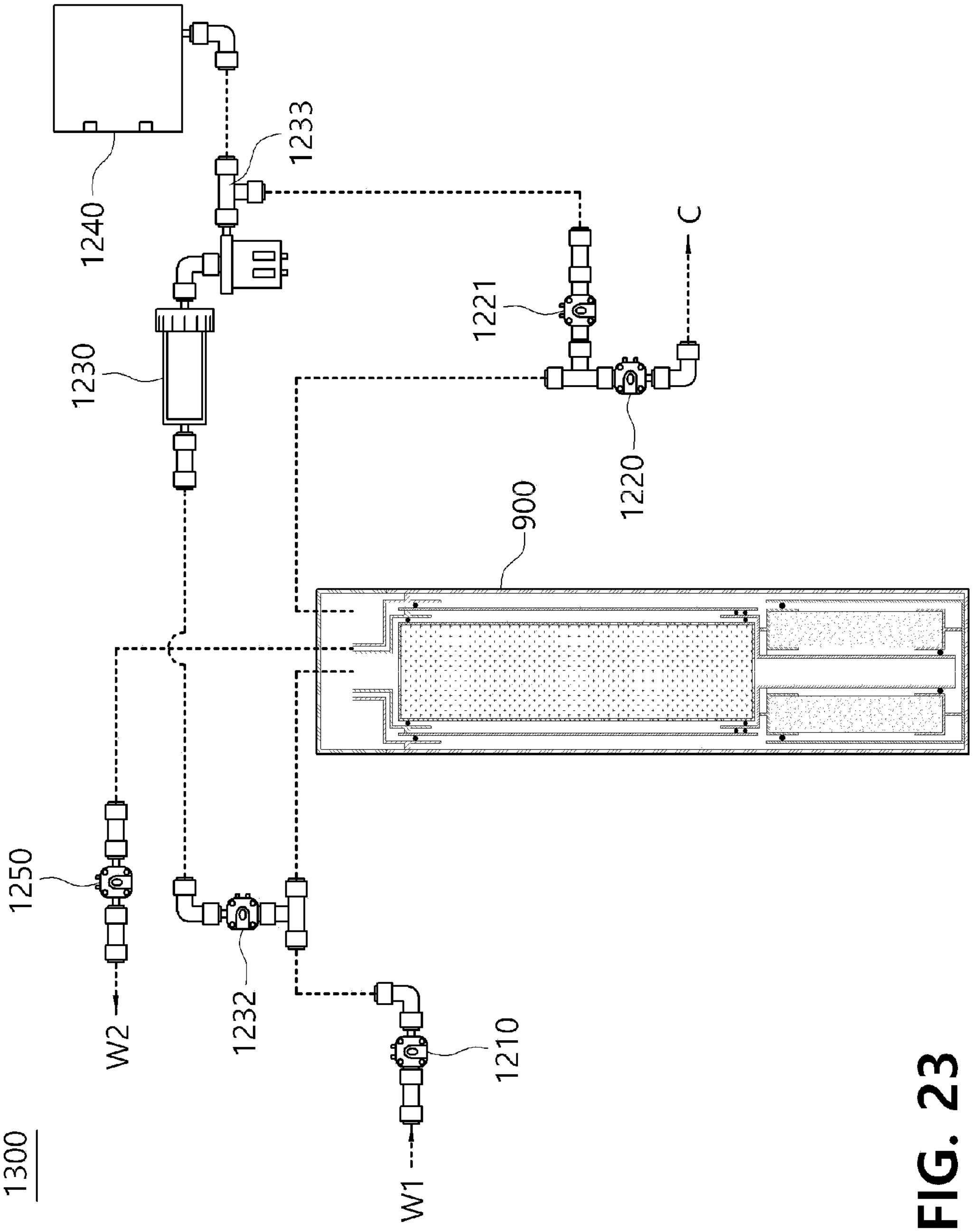
FIG. 23 is a configuration diagram schematically showing a water purifier according to still another exemplary embodiment of the present invention.

FIG. 23 is a configuration diagram schematically showing a water purifier according to still another exemplary embodiment of the present invention.

As illustrated in FIG. 23, the water purifier 1300 according to still another exemplary embodiment of the present invention includes a raw water supply unit 1210, a composite filter 900, a purified water discharge unit 1220, a purified water storage tank 1240 and a washing module. 1230, and the descriptions of components that are identical or similar to those of the above-described exemplary embodiment are replaced with the foregoing descriptions, and it will be described by focusing on the purified water storage tank 1240 and the washing module 1230. The purified water storage tank 1240 is connected to the purified water discharge unit 1220. The purified water discharge unit 1220 includes a first control valve 1221 that controls the purified water (C) filtered by the composite filter 900 to be supplied to the purified water storage tank 1240. In addition, the purified water (C) is extracted to the outside by the control of the purified water discharge unit 1220 or moved to the purified water storage tank 1240 by the control of the first control valve 1221.

In addition, as illustrated in FIG. 23, in the water purifier 1300 according to still another exemplary embodiment of the present invention, the washing module 1230 includes a washing water control valve 1233 that controls the supply of the washing water (W2) by using purified water supplied from the purified water storage tank 1240. When the washing water control valve 1233 opens a flow path through which the purified water (C) is moved, the purified water (C) is moved to the washing module 1230 and used as the washing water (W2). In this case, a second control valve 1232 is provided in the flow path through which the raw water (W1) is moved. The washing water (W2) that has passed through the washing module 1230 is moved to the second control valve 1232 which is disposed in the flow path through which the raw water (W1) is moved. The second control valve 1232 controls the washing water (W2) to be supplied to the composite filter 900 while stopping the supply of the raw water (W1), and conversely, it may stop the supply of the washing water (W2) while controlling the raw water (W1) to be supplied to the composite filter.

In addition, with reference to FIG. 23, the process of extracting purified water and the process of washing the composite filter 900 will be described. First of all, for purified water extraction, the raw water supply unit 1210 opens a flow path of the raw water (W1) such that the raw water (W1) is supplied to the composite filter 900. In this case, the second control valve 1232 opens the flow path of the raw water (W1) to control the raw water (W1) to move to the composite filter 900, and the flow path through which the washing water (W2) is moved to the composite filter 900 is closed. In addition, as the raw water (W1) passes through the composite filter 900, the composite filter 900 produces the purified water (C). In addition, the purified water (C) is extracted to the outside or moved to the purified water storage tank 1240 according to the control of the purified water discharge unit 1220. In this case, the washing water control valve 1233 and the washing water discharge valve 1250 close the flow path of the washing water (W2), thereby securing the stability of the operation of purified water extraction.

Next, in order to wash the composite filter 900, the washing water control valve 1233 controls the purified water (C) to be moved to the washing module 1230 by opening a flow path of the washing water (W2). In addition, the washing module 1230 supplies the washing water (W2) to the second control valve 1232. In this case, the second control valve 1232 closes a flow path of the raw water (W1) and opens a flow path through which the washing water (W2) is moved to the composite filter 900. As the washing water (W2) passes through the composite filter 900, the composite filter 900 is washed by the washing water (W2). In addition, the washing water (W2) is discharged to the outside through the washing water discharge valve 1250. In this case, the purified water discharge unit 1220 closes a flow path of the purified water (C), thereby securing the operational stability for washing the composite filter 900.

Figure 24:
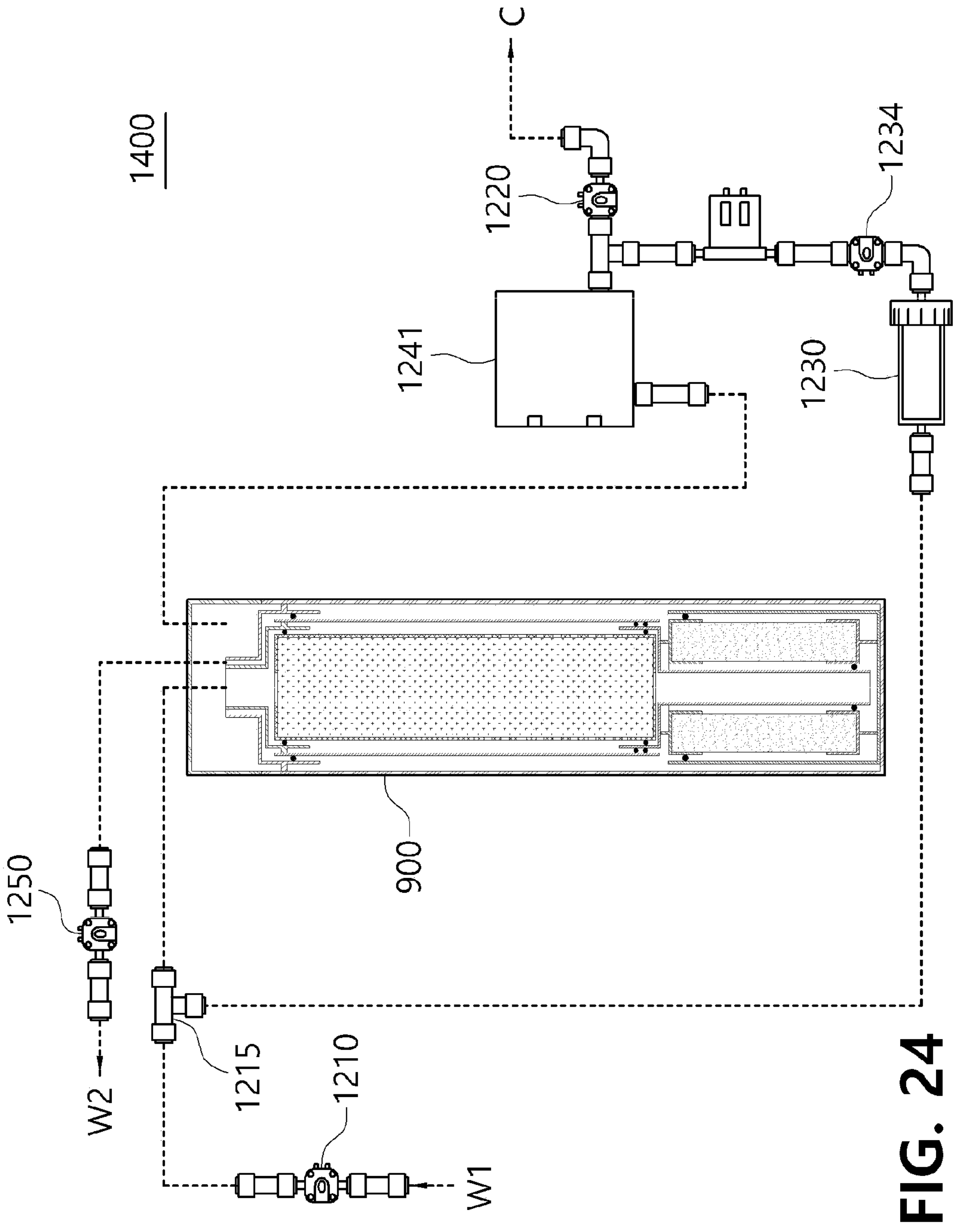
FIG. 24 is a configuration diagram schematically showing a water purifier according to still another exemplary embodiment of the present invention.

FIG. 24 is a configuration diagram schematically showing a water purifier according to still another exemplary embodiment of the present invention.

As illustrated in FIG. 24, the water purifier 1400 according to still another exemplary embodiment of the present invention includes a raw water supply unit 1210, a composite filter 900, a purified water discharge unit 1220, a purified water storage tank 1241 and a washing module. 1230, and the descriptions of components that are identical or similar to those of the above-described exemplary embodiment are replaced with the foregoing descriptions, and it will be described by focusing on the purified water storage tank 1241 and the washing module 1230. The purified water storage tank 1241 is disposed between the composite filter 900 and the purified water discharge unit 1220 and is connected to the purified water discharge unit 1220. The purified water (C) filtered by the composite filter 900 is supplied to the purified water storage tank 1241. Then, the purified water (C) is extracted to the outside by the control of the purified water discharge unit 1220.

In addition, as illustrated in FIG. 24, in the water purifier 1400 according to still another exemplary embodiment of the present invention, the washing module 1230 includes a washing water control valve 1234 that controls the supply of the washing water (W2) by using purified water supplied from the purified water storage tank 1241. When the washing water control valve 1234 opens a flow path through which the purified water (C) is moved, the purified water (C) is moved to the washing module 1230 and used as the washing water (W2). In this case, a control valve 801*a* is provided in the flow path through which the raw water (W1) is moved. The washing water (W2) that has passed through the washing module 1230 is moved to the control valve 1215 which is disposed in the flow path through which the raw water (W1) is moved. The control valve 1215 controls the washing water (W2) to be supplied to the composite filter 900 while stopping the supply of the raw water (W1), and conversely, it may stop the supply of the washing water (W2) while controlling the raw water (W1) to be supplied to the composite filter 900.

In addition, with reference to FIG. 24, the process of extracting purified water and the process of washing the composite filter 900 will be described. First of all, for purified water extraction, the raw water supply unit 1210 opens a flow path of the raw water (W1) such that the raw water (W1) is supplied to the composite filter 900. In this case, the control valve 1215 opens the flow path of the raw water (W1) to control the raw water (W1) to be moved to the composite filter 900, and the flow path through which the washing water (W2) is moved the composite filter 900 is closed. In addition, as the raw water (W1) passes through the composite filter 900, the composite filter 900 produces the purified water (C). In addition, after the purified water (C) is stored in the purified water storage tank 1241, it is extracted to the outside according to the control of the purified water discharge unit 1220. In this case, the washing water control valve 1234 and the washing water discharge valve 1250 close the flow path of the washing water (W2), thereby securing the stability of the operation of purified water extraction.

Next, in order to wash the composite filter 900, the purified water discharge unit 1220 closes a flow path of the purified water (C) such that the purified water (C) is not discharged to the outside. In this case, the washing water control valve 1234 opens a flow path of the washing water (W2) and controls the purified water (C) to be moved to the washing module 1230. In addition, the washing module 1230 supplies the washing water (W2) to the control valve 1215. In this case, the control valve 1215 closes the flow path of the raw water (W1) and opens the flow path through which the washing water (W2) is moved to the composite filter 900. As the washing water (W2) passes through the composite filter 900, the composite filter 900 is washed by the washing water (W2). In addition, the washing water (W2) is discharged to the outside through the washing water discharge valve 1250. As the purified water (C) is used as the washing water (W2) in this way, the washing efficiency of the composite filter 900 is improved.

As described above, the preferred exemplary embodiments according to the present invention have been reviewed, and the fact that the present invention can be embodied in other specific forms without departing from the spirit or scope of the present invention in addition to the above-described exemplary embodiments is apparent to those skilled in the art. Therefore, the exemplary embodiments described above are to be regarded as illustrative rather than restrictive, and accordingly, the present invention is not limited to the above description, but may vary within the scope of the appended claims and their equivalents.

The invention claimed is:

1. A composite filter, comprising:

a housing part which is provided with a raw water inlet port through which raw water is introduced, a purified water outlet port through which filtered purified water is discharged, and a washing water discharge port through which washing water is discharged; and a filtering unit which is provided with a first filter member that filters the raw water to produce first purified water, and a second filter member that filters the first purified water to produce second purified water and is disposed to surround the first filter member, wherein the housing part comprises:

a head member which is provided with a first partition wall that prevents the raw water and the washing water from mixing, and a second partition wall that prevents the second purified water and the washing water from mixing; and a case member which extends from the head member and has the filtering unit disposed therein, and wherein the filtering unit comprises:

a body member which is disposed between the first filter member and the second filter member;

a first upper cap member wherein the first filter member that is disposed inside the body member is disposed below;

a second upper cap member wherein the first upper cap member is disposed below; and a third upper cap member wherein the second filter member that is disposed outside the body member is disposed below, and the third upper cap member is disposed above the second upper cap member.

2. The composite filter of claim 1, wherein after washing the first filter member, the washing water is moved to the washing water discharge port via a first discharge passage formed between the first filter member and the body member.

3. The composite filter of claim 1, wherein the filtering unit further comprises a lower cap member which is coupled to a lower side of the second filter member, and wherein the lower cap member includes a support guide which is disposed to extend upward so as to be coupled to the second filter member.

4. The composite filter of claim 1, wherein a plurality of discharge holes communicating with the first discharge passage are formed on a side surface of the first filter member, wherein the washing water that has washed the first filter member is moved to the first discharge passage through the plurality of discharge holes, wherein a second discharge passage communicating with the first discharge passage is formed between the first upper cap member and the second upper cap member, and wherein the second discharge passage communicates with the washing water discharge port.

5. A water purifier, comprising:

the composite filter of claim 1;

a raw water supply unit which controls the supply of raw water such that raw water is supplied to the composite filter;

a purified water discharge unit which controls the discharge of purified water filtered by the composite filter; and a washing module which is provided between the raw water supply unit and the composite filter, and controls the supply of washing water to the composite filter, wherein the raw water and the washing water are selectively supplied to the composite filter.

6. The water purifier of claim 5, wherein the washing module washes the composite filter by using raw water supplied from the raw water supply unit.

7. A composite filter, comprising:

a housing part which is provided with a raw water inlet port through which raw water is introduced, a purified water outlet port through which filtered purified water is discharged, and a washing water discharge port through which washing water is discharged; and a filtering unit which is provided with a first filter member that filters the raw water to produce first purified water, and a second filter member that filters the first purified water to produce second purified water and is stacked on top of the first filter member, wherein the housing part comprises:

a head member which is provided with a first partition wall that prevents the second purified water and the washing water from mixing, and a second partition wall that prevents the raw water and the washing water from mixing; and a case member which extends from the head member and has the filtering unit disposed therein, and wherein the filtering unit comprises:

a first upper cap member wherein the first filter member is disposed below;

a second upper cap member wherein the first upper cap member is disposed below, and has a hole through which the washing water moves;

a third upper cap member wherein the second filter member is disposed below;

a fourth upper cap member wherein the third upper cap member is disposed below; and a fifth upper cap member wherein the fourth upper cap member is disposed below.

8. The composite filter of claim 7, wherein the filtering unit further comprises a lower cap member which is coupled to a lower side of the second filter member, and wherein the lower cap member comprises a lower cap guide which is disposed to extend upward so as to be coupled to the second filter member.

9. The composite filter of claim 7, wherein the first upper cap member comprises a first upward guide which is disposed to extend upward such that the first purified water flows into the second filter member, wherein the second upper cap member comprises a second upward guide which is disposed to extend upward such that the washing water is discharged from the first filter member, wherein the third upper cap member comprises an upper cap guide which is disposed to extend downward to be coupled to the second filter member, wherein the fourth upper cap member comprises a fourth upward guide which is disposed to extend upward such that the second purified water is discharged to the outside from the second filter member, and wherein the fifth upper cap member comprises a fifth upward guide which is disposed to extend upward such that the washing water is discharged to the outside.

10. The composite filter of claim 8, wherein after washing the first filter member, the washing water is moved to the washing water discharge port via a first discharge passage formed between the first filter member and the second upper cap member, wherein a plurality of discharge holes communicating with the first discharge passage are formed on a side surface of the first filter member, and wherein the washing water that has washed the first filter member is moved to the first discharge passage through the plurality of discharge holes.

11. The composite filter of claim 10, wherein a second discharge passage communicating with the first discharge passage is formed between the fourth upper cap member and the fifth upper cap member, and wherein the second discharge passage communicates with the washing water discharge port.

12. A water purifier, comprising:

the composite filter of claim 7;

a raw water supply unit which controls the supply of raw water such that raw water is supplied to the composite filter;

a purified water discharge unit which controls the discharge of purified water filtered by the composite filter; and a washing module which is provided between the raw water supply unit and the composite filter and controls the supply of washing water to the composite filter, wherein the raw water and the washing water are selectively supplied to the composite filter.

13. The water purifier of claim 12, wherein the washing module washes the composite filter by using raw water supplied from the raw water supply unit.

14. A composite filter, comprising:

a housing part which is provided with a raw water inlet port through which raw water is introduced, a purified water outlet port through which filtered purified water is discharged, and a washing water discharge port through which washing water is discharged; and a filtering unit which is provided with a first filter member that filters the raw water to produce first purified water, and a second filter member that filters the first purified water to produce second purified water and is stacked below the first filter member, wherein the housing part comprises:

a head member which is provided with a first partition wall that prevents the raw water and the washing water from mixing, and a second partition wall that prevents the purified water and the washing water from mixing; and a case member which extends from the head member and has the filtering unit disposed therein, and wherein the filtering unit comprises:

a first body member which surrounds the first filter member;

a first upper cap member wherein the first filter member is disposed below;

a second upper cap member wherein the first upper cap member is disposed below, and the first body member is disposed below;

a first lower cap member wherein the first filter member is disposed above and penetrates the second filter member;

a second body member which surrounds the second filter member; and a third upper cap member wherein the second filter member is disposed below.

15. The composite filter of claim 14, wherein the filtering unit further comprises a second lower cap member which is coupled to a lower side of the second filter member, and wherein the second lower cap member comprises a second lower cap guide which is disposed to extend upward so as to be coupled to the second filter member.

16. The composite filter of claim 14, wherein the first upper cap member comprises a first upward guide which is disposed to extend upward such that the raw water flows into the second filter member, wherein the second upper cap member comprises a second upward guide which is disposed to extend upward such that the washing water is discharged from the first filter member, wherein the first lower cap member comprises a first lower cap guide which is disposed to extend downwardly to penetrate the second filter member, and wherein the third upper cap member comprises an upper cap guide which is disposed to extend downward to be coupled to the second filter member.

17. The composite filter of claim 14, wherein after washing the first filter member, the washing water is moved to the washing water discharge port via a first discharge passage formed between the first filter member and the first body member, wherein a plurality of discharge holes communicating with the first discharge passage are formed on a side surface of the first filter member, and wherein the washing water that has washed the first filter member is moved to the first discharge passage through the plurality of discharge holes.

18. The composite filter of claim 17, wherein a second discharge passage communicating with the first discharge passage is formed between the first upper cap member and the second upper cap member, and wherein the second discharge passage communicates with the washing water discharge port.

19. A water purifier, comprising:

the composite filter of claim 14;

a raw water supply unit which controls the supply of raw water;

a purified water discharge unit which controls the discharge of purified water filtered by the composite filter such that raw water is supplied to the composite filter; and a washing module which is provided between the raw water supply unit and the composite filter, and controls the supply of washing water to the composite filter, wherein the raw water and the washing water are selectively supplied to the composite filter.

20. The water purifier of claim 19, wherein the washing module washes the composite filter by using raw water supplied from the raw water supply unit.

* * * * *